US010216957B2

(12) United States Patent
Jung et al.

(10) Patent No.: US 10,216,957 B2
(45) Date of Patent: *Feb. 26, 2019

(54) METHODS AND SYSTEMS FOR MANAGING DATA AND/OR SERVICES FOR DEVICES

(71) Applicant: Elwha LLC, Bellevue, WA (US)

(72) Inventors: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/781,194

(22) Filed: Feb. 28, 2013

(65) Prior Publication Data
US 2014/0123324 A1 May 1, 2014

Related U.S. Application Data

(63) Continuation-in-part of application No. 13/731,641, filed on Dec. 31, 2012, now Pat. No. 9,626,503, and
(Continued)

(51) Int. Cl.
*G06F 21/62* (2013.01)
*H04L 29/06* (2006.01)
(Continued)

(52) U.S. Cl.
CPC ........ *G06F 21/6254* (2013.01); *H04L 63/108* (2013.01); *H04W 12/02* (2013.01); *H04W 12/08* (2013.01)

(58) Field of Classification Search
CPC ..................................................... G06F 2/6209
(Continued)

(56) References Cited

U.S. PATENT DOCUMENTS 6,029,175 A  2/2000 Chow et al.
6,122,520 A  9/2000 Want et al.
(Continued)

FOREIGN PATENT DOCUMENTS

EP  1818807 A  8/2007
WO  WO 01/28273 A1  4/2001

OTHER PUBLICATIONS

Zhou, Yajin et al., "Taming Information-Stealing Smartphone Applications (on Android)," Proceedings of the 4th International Conference on Trust and Trustworthy Computing, Pittsburgh, PA, Jun. 2011, 15 pages.

(Continued)

*Primary Examiner* — Khalil Naghdali

(57) ABSTRACT

Computationally implemented methods and systems include acquiring data regarding an application configured to access one or more protected portions of a particular device, said application configured to provide one or more services, detecting that the application has completed at least one of the one or more services and that the application maintains access to the one or more protected portions of the particular device, presenting information indicating that the one or more services are completed and that the application maintains access to the one or more protected portions of the particular device, and circuitry for facilitating presentation of an option to discontinue the access of the application to the one or more protected portions of the particular device. In addition to the foregoing, other aspects are described in the claims, drawings, and text.

42 Claims, 35 Drawing Sheets

Related U.S. Application Data a continuation-in-part of application No. 13/731,947, filed on Dec. 31, 2012, now Pat. No. 9,619,497, and a continuation-in-part of application No. 13/731,624, filed on Dec. 31, 2012, now Pat. No. 9,886,458, and a continuation-in-part of application No. 13/731,968, filed on Dec. 31, 2012, and a continuation-in-part of application No. 13/732,305, filed on Dec. 31, 2012, now Pat. No. 9,749,206, and a continuation-in-part of application No. 13/732,326, filed on Dec. 31, 2012, now Pat. No. 10,069,703, and a continuation-in-part of application No. 13/732,127, filed on Dec. 31, 2012, and a continuation-in-part of application No. 13/731,960, filed on Dec. 31, 2012, and a continuation-in-part of application No. 13/692,829, filed on Dec. 3, 2012, now Pat. No. 9,736,004, and a continuation-in-part of application No. 13/692,882, filed on Dec. 3, 2012, and a continuation-in-part of application No. 13/685,609, filed on Nov. 26, 2012, and a continuation-in-part of application No. 13/685,613, filed on Nov. 26, 2012, and a continuation-in-part of application No. 13/685,612, filed on Nov. 26, 2012, and a continuation-in-part of application No. 13/685,491, filed on Nov. 26, 2012, now Pat. No. 9,948,492, and a continuation-in-part of application No. 13/685,485, filed on Nov. 26, 2012, now Pat. No. 9,825,800, and a continuation-in-part of application No. 13/685,488, filed on Nov. 26, 2012, now Pat. No. 9,755,884.

(51) Int. Cl.
 *H04W 12/02* (2009.01)
 *H04W 12/08* (2009.01)

(58) Field of Classification Search
 USPC .......................................................... 726/27
 See application file for complete search history.

(56) References Cited

U.S. PATENT DOCUMENTS

| | | | |
|---|---|---|---|
| 6,509,830 B1 | 1/2003 | Elliott | |
| 6,810,321 B1 | 10/2004 | Cook | |
| 6,871,277 B1 | 3/2005 | Keronen | |
| 7,178,034 B2 | 2/2007 | Cihula et al. | |
| 7,203,752 B2 | 4/2007 | Rice et al. | |
| 7,216,263 B2 | 5/2007 | Takaoka et al. | |
| 7,269,853 B1 | 9/2007 | Dunn | |
| 7,496,652 B2 | 2/2009 | Pezzutti | |
| 7,647,164 B2 | 1/2010 | Reeves | |
| 7,680,889 B2 | 3/2010 | Blumenau et al. | |
| 7,685,238 B2 | 3/2010 | Etelapera | |
| 7,849,311 B2 * | 12/2010 | Donlin et al. | 713/164 |
| 7,860,807 B2 | 12/2010 | Kaneko et al. | |
| 7,873,957 B2 | 1/2011 | Nallipogu et al. | |
| 7,913,312 B2 | 3/2011 | de Jong | |
| 7,917,154 B2 | 3/2011 | Fortescue et al. | |
| 7,996,682 B2 * | 8/2011 | Schutz et al. | 713/182 |
| 8,175,794 B1 | 5/2012 | Szybalski | |
| 8,364,389 B2 | 1/2013 | Dorogusker et al. | |
| 8,387,155 B2 | 2/2013 | Gregg et al. | |
| 8,504,729 B2 | 8/2013 | Pezzutti | |
| 8,554,608 B1 | 10/2013 | O'Connor | |
| 8,578,483 B2 | 11/2013 | Seshadri et al. | |
| 8,630,494 B1 | 1/2014 | Svendsen | |
| 8,756,321 B2 | 6/2014 | Clark et al. | |
| 8,838,751 B1 | 9/2014 | Scofield et al. | |
| 9,047,648 B1 | 6/2015 | Lekutai et al. | |
| 2001/0025316 A1 | 9/2001 | Oh | |
| 2002/0032798 A1 | 3/2002 | Xu | |
| 2003/0023726 A1 | 1/2003 | Rice et al. | |
| 2003/0045308 A1 | 3/2003 | Sidhu et al. | |
| 2003/0130893 A1 | 7/2003 | Farmer | |
| 2003/0145229 A1 | 7/2003 | Cohen et al. | |
| 2003/0191877 A1 | 10/2003 | Zaudtke et al. | |
| 2004/0002902 A1 | 1/2004 | Muehlhaeuser | |
| 2004/0036611 A1 | 2/2004 | Kidney et al. | |
| 2004/0122956 A1 | 6/2004 | Myers et al. | |
| 2004/0128500 A1 | 7/2004 | Cihula et al. | |
| 2004/0214576 A1 | 10/2004 | Myers et al. | |
| 2004/0230835 A1 | 11/2004 | Goldfeder et al. | |
| 2005/0162699 A1 | 7/2005 | Fukunaga et al. | |
| 2005/0182825 A1 | 8/2005 | Eytchison | |
| 2005/0272445 A1 | 12/2005 | Zellner | |
| 2005/0278342 A1 | 12/2005 | Abdo et al. | |
| 2006/0010047 A1 | 1/2006 | Minor | |
| 2006/0031337 A1 | 2/2006 | Kim | |
| 2006/0229778 A1 | 10/2006 | Obradovich et al. | |
| 2007/0006321 A1 | 1/2007 | Bantz et al. | |
| 2007/0044143 A1 | 2/2007 | Zhu et al. | |
| 2007/0113079 A1 * | 5/2007 | Ito et al. | 713/166 |
| 2007/0136466 A1 | 6/2007 | Etelapera | |
| 2007/0142727 A1 * | 6/2007 | Zhang | A61B 5/0031 600/486 |
| 2007/0232268 A1 | 10/2007 | Park et al. | |
| 2007/0273583 A1 | 11/2007 | Rosenberg | |
| 2008/0046886 A1 | 2/2008 | Brown et al. | |
| 2008/0076451 A1 | 3/2008 | Sheha et al. | |
| 2008/0102856 A1 | 5/2008 | Fortescue et al. | |
| 2008/0126541 A1 | 5/2008 | Rosenberg et al. | |
| 2008/0153670 A1 | 6/2008 | McKirdy et al. | |
| 2008/0189793 A1 | 8/2008 | Kirkup et al. | |
| 2008/0207232 A1 | 8/2008 | Rice et al. | |
| 2008/0229389 A1 | 9/2008 | Singh et al. | |
| 2008/0242311 A1 | 10/2008 | Craine et al. | |
| 2009/0077085 A1 | 3/2009 | Olivieri et al. | |
| 2009/0160970 A1 | 6/2009 | Fredlund et al. | |
| 2009/0248833 A1 | 10/2009 | Frazier | |
| 2009/0287837 A1 | 11/2009 | Felsher | |
| 2010/0015993 A1 | 1/2010 | Dingler et al. | |
| 2010/0024020 A1 * | 1/2010 | Baugher et al. | 726/7 |
| 2010/0035596 A1 | 2/2010 | Nachman et al. | |
| 2010/0070475 A1 | 3/2010 | Chen | |
| 2010/0082237 A1 | 4/2010 | Black | |
| 2010/0094458 A1 | 4/2010 | Sagady et al. | |
| 2010/0107225 A1 | 4/2010 | Spencer et al. | |
| 2010/0151842 A1 | 6/2010 | De Vries | |
| 2010/0238985 A1 | 9/2010 | Traywick et al. | |
| 2010/0324819 A1 | 12/2010 | Nurminen et al. | |
| 2010/0325239 A1 | 12/2010 | Khedouri et al. | |
| 2011/0018759 A1 | 1/2011 | Bennett et al. | |
| 2011/0022468 A1 | 1/2011 | Muster et al. | |
| 2011/0059693 A1 | 3/2011 | O'Sullivan | |
| 2011/0093941 A1 | 4/2011 | Liu et al. | |
| 2011/0099040 A1 | 4/2011 | Felt et al. | |
| 2011/0125866 A1 * | 5/2011 | Williams | G06F 19/3418 709/217 |
| 2011/0128568 A1 | 6/2011 | Bhogal et al. | |
| 2011/0136472 A1 | 6/2011 | Rector et al. | |
| 2011/0145089 A1 | 6/2011 | Khunger et al. | |
| 2011/0153189 A1 | 6/2011 | Chiang et al. | |
| 2011/0173681 A1 | 7/2011 | Qureshi et al. | |
| 2011/0179366 A1 | 7/2011 | Chae | |
| 2011/0190009 A1 | 8/2011 | Gerber, Jr. et al. | |
| 2011/0205965 A1 | 8/2011 | Sprigg et al. | |
| 2011/0209221 A1 | 8/2011 | Hanson et al. | |
| 2011/0231092 A1 | 9/2011 | Kuo et al. | |
| 2011/0243553 A1 | 10/2011 | Russell | |
| 2011/0274011 A1 | 11/2011 | Stuempert et al. | |
| 2011/0295899 A1 | 12/2011 | James et al. | |
| 2011/0313804 A1 | 12/2011 | Camp et al. | |
| 2011/0313880 A1 | 12/2011 | Paul et al. | |
| 2012/0016951 A1 | 1/2012 | Li et al. | |
| 2012/0017252 A1 | 1/2012 | Li et al. | |
| 2012/0036345 A1 | 2/2012 | Chen et al. | |
| 2012/0054841 A1 * | 3/2012 | Schultz et al. | 726/6 |
| 2012/0084247 A1 | 4/2012 | Aguera y Arcas et al. | |
| 2012/0089465 A1 | 4/2012 | Froloff | |
| 2012/0096080 A1 * | 4/2012 | Levesque et al. | 709/203 |
| 2012/0101952 A1 | 4/2012 | Raleigh et al. | |
| 2012/0117232 A1 | 5/2012 | Brown et al. | |

(56) References Cited

U.S. PATENT DOCUMENTS

| | | | |
|---|---|---|---|
| 2012/0143662 A1 | 6/2012 | Heath | |
| 2012/0179764 A1 | 7/2012 | Erdal | |
| 2012/0185912 A1 | 7/2012 | Lee et al. | |
| 2012/0197852 A1 | 8/2012 | Dutta et al. | |
| 2012/0209923 A1 | 8/2012 | Mathur et al. | |
| 2012/0222083 A1 | 8/2012 | Vaha-Sipila et al. | |
| 2012/0252498 A1 | 10/2012 | Trinchero et al. | |
| 2012/0291101 A1* | 11/2012 | Ahlstrom et al. | 726/4 |
| 2012/0293465 A1 | 11/2012 | Nandu et al. | |
| 2012/0296455 A1* | 11/2012 | Ohnemus | G06F 19/3481 700/91 |
| 2012/0317565 A1 | 12/2012 | Carrara et al. | |
| 2013/0014212 A1 | 1/2013 | Cohen | |
| 2013/0046632 A1 | 2/2013 | Grigg et al. | |
| 2013/0054139 A1 | 2/2013 | Bodin et al. | |
| 2013/0059698 A1* | 3/2013 | Barton | A63B 71/0622 482/63 |
| 2013/0110854 A1 | 5/2013 | Lockhart et al. | |
| 2013/0124546 A1 | 5/2013 | Wormley et al. | |
| 2013/0179244 A1 | 7/2013 | Laffoon et al. | |
| 2013/0179988 A1* | 7/2013 | Bekker et al. | 726/27 |
| 2013/0218704 A1 | 8/2013 | Duncan et al. | |
| 2013/0219461 A1 | 8/2013 | Esaki et al. | |
| 2013/0232573 A1 | 9/2013 | Saidi et al. | |
| 2013/0263000 A1 | 10/2013 | Lucas et al. | |
| 2013/0263206 A1 | 10/2013 | Nefedov et al. | |
| 2013/0268378 A1 | 10/2013 | Yovin | |
| 2013/0282227 A1 | 10/2013 | Chen et al. | |
| 2013/0290359 A1 | 10/2013 | Eronen et al. | |
| 2013/0318627 A1 | 11/2013 | Lundkvist et al. | |
| 2013/0339234 A1 | 12/2013 | Prakash et al. | |
| 2014/0006616 A1 | 1/2014 | Aad et al. | |
| 2014/0031959 A1 | 1/2014 | Glode et al. | |
| 2014/0040978 A1* | 2/2014 | Barton | H04L 63/20 726/1 |
| 2014/0047062 A1 | 2/2014 | Krueger et al. | |
| 2014/0059695 A1 | 2/2014 | Parecki et al. | |
| 2014/0074570 A1 | 3/2014 | Hope et al. | |
| 2014/0078304 A1 | 3/2014 | Othmer | |
| 2014/0122890 A1* | 5/2014 | Prot | 713/176 |
| 2014/0123300 A1 | 5/2014 | Jung et al. | |
| 2014/0195349 A1 | 7/2014 | Muster et al. | |
| 2015/0222641 A1 | 8/2015 | Lu et al. | |

OTHER PUBLICATIONS

PCT International Search Report; International App. No. PCT/US14/19562; dated Jun. 10, 2014; pp. 1-2.

Reddy et al.; "Biketastic: Sensing and Mapping for Better Biking"; CHI 2010; Apr. 10-15, 2010; pp. 1-4; ACM; located at http://research.cens.ucla.edu/people/estrin/resources/conferences/2010apr-Reddy-Shilton-Biketastic.pdf.

Extended European Search Report; European App. No. EP 14 75 7393; dated Oct. 13, 2016 (received by our Agent on Oct. 14, 2016); pp. 1-8.

Holder, Joseph; "BlackBerry 101—Application permissions"; bearing a date of Dec. 31, 2010; printed on Sep. 28, 2016; pp. 1-6.

Tasker; "Total Automation for Android"; User Guide, Jul. 5, 2012; 14 pages; located at: http://tasker.dinglisch.net/.

Beresfod et al.; "MockDroid: trading privacy for application functionality on smartphones"; Hotmobile '11; Mar. 1-3, 2011; pp. 49-54.

Hildenbrand, Jerry; "Android app permissions—How Google gets it right . . . "; bearing a date of Feb. 2012; printed on Apr. 1, 2017; pp. 1-22; located at: http://www.androidcentral.com/android-permissions-privacy-security.

* cited by examiner

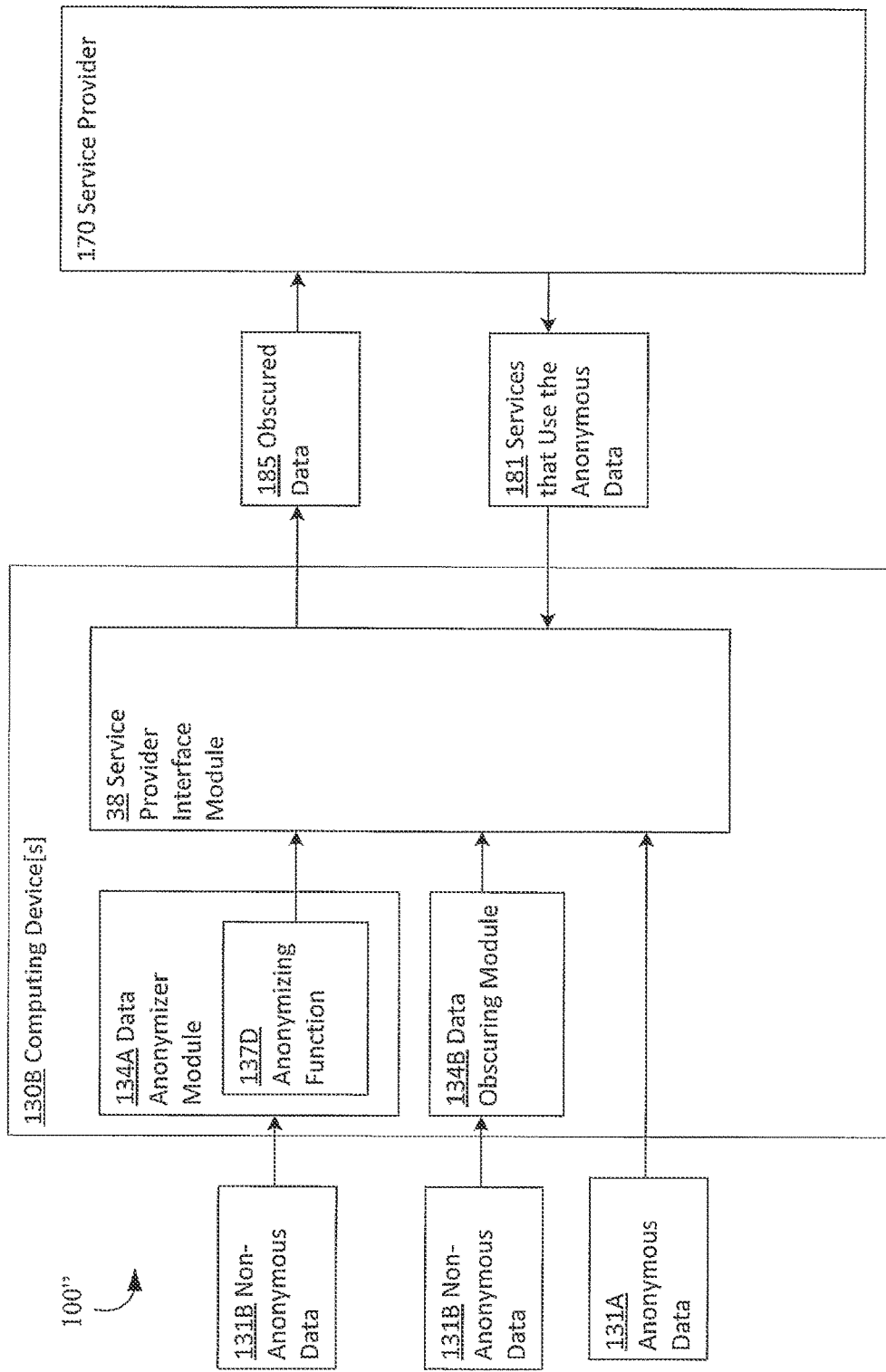

152 Data Regarding Agent That Is Configured To Provide One Or More Services And To Selectively Access One Or More Particular Device Protected Portions Obtaining Module

| 202 Data Regarding Presence Of The Agent That Is Configured To Provide One Or More Services And To Selectively Access One Or More Particular Device Protected Portions Obtaining Module | 204 Data Regarding Installation Status Of Agent That Is Configured To Provide One Or More Services And To Selectively Access One Or More Particular Device Protected Portions Obtaining Module | 206 Data Regarding User Activation Of Agent That Is Configured To Provide One Or More Services And To Selectively Access One Or More Particular Device Protected Portions Obtaining Module | 208 Data Regarding Agent That Is Configured To Provide One Or More Services Requiring Access To One Or More Particular Device Protected Portions And To Selectively Access The One Or More Particular Device Protected Portions Obtaining Module 210 Data Regarding Bicycle Efficiency Monitoring Agent That Is Configured To Provide One Or More Cycling Efficiency Displaying Services Requiring Access To One Or More Particular Device Protected Portions And To Selectively Access The One Or More Particular Device Protected Portions Obtaining Module | 212 Data Regarding Agent That Is Configured To Provide One Or More Services And To Selectively Access One Or More Particular Device Protected Portions Receiving From The Particular Device Module | 214 Data Regarding Agent That Is Configured To Provide One Or More Services And To Selectively Access One Or More Particular Device Protected Portions Obtaining By Scanning The Particular Device Module |

| Fig. 2A | Fig. 2B | Fig. 2C |

152 Data Regarding Agent That Is Configured To Provide One Or More Services And To Selectively Access One Or More Particular Device Protected Portions Obtaining Module 216 Data Regarding Agent That Is Configured To Provide One Or More Services And To Selectively Access One Or More Particular Device Protected Portions Obtaining From Operating System Module 218 Data Regarding Agent That Is Configured To Provide One Or More Services And To Selectively Access One Or More Particular Device Protected Portions Monitoring Via One Or More Transmissions To And/or From The One Or More Particular Device Protected Portions Module 220 Data From One Or More Particular Device Logs Regarding Agent That Is Configured To Provide One Or More Services And To Selectively Access One Or More Particular Device Protected Portions Obtaining Module 222 Detectable Indicator That The Agent Has Carried One Or More Services And Continues Access To One Or More Particular Device Protected Portions Detecting Module

Fig. 2

| Fig. 2A | Fig. 2B | Fig. 2C |

FIG. 2B

152 Data Regarding Agent That Is Configured To Provide One Or More Services And To Selectively Access One Or More Particular Device Protected Portions Obtaining Module 224 Detectable Indicator That The Agent Has Terminated Activity Directed To Carrying One Or More Services And Continues Access To One Or More Particular Device Protected Portions After Terminated Activity Detecting Module

| 226 Detectable Indicator That The Agent Has Terminated Activity Directed To Carrying One Or More Services And Continues Access To One Or More Particular Device Protected Portions After Terminated Activity Detecting By Analyzing At Least A Portion Of The Particular Device Module | 228 Detectable Indicator That The Agent Has Terminated Activity Directed To Carrying One Or More Services And Continues Access To One Or More Particular Device Protected Portions After Terminated Activity Detecting At Least Partially Using A Report Issued By The Particular Device Module | 230 Detectable Indicator That The Agent Has Terminated Activity Directed To Carrying One Or More Services And Continues Access To One Or More Particular Device Protected Portions After Terminated Activity Detecting By Analyzing Data Flow Of The One Or More Particular Device Protected Portions Module | 232 Detectable Indicator That The Agent Has Terminated Activity Directed To Carrying One Or More Services And Continues Access To One Or More Particular Device Protected Portions After Terminated Activity Detecting At Least Partially Using A Report Issued By A Monitoring Agent For The One Or More Particular Device Protected Portions Module |

234 Detectable Indicator That The Agent Has Terminated Activity Directed To Carrying One Or More Services And Continues Access To One Or More Particular Device Protected Portions After Terminated Activity Detecting At Least Partially Using A Report Issued By A Kernel-based Monitoring Agent For The One Or More Particular Device Protected Portions Module

Fig. 2

| Fig. 2A | Fig. 2B | Fig. 2C |

FIG. 2C

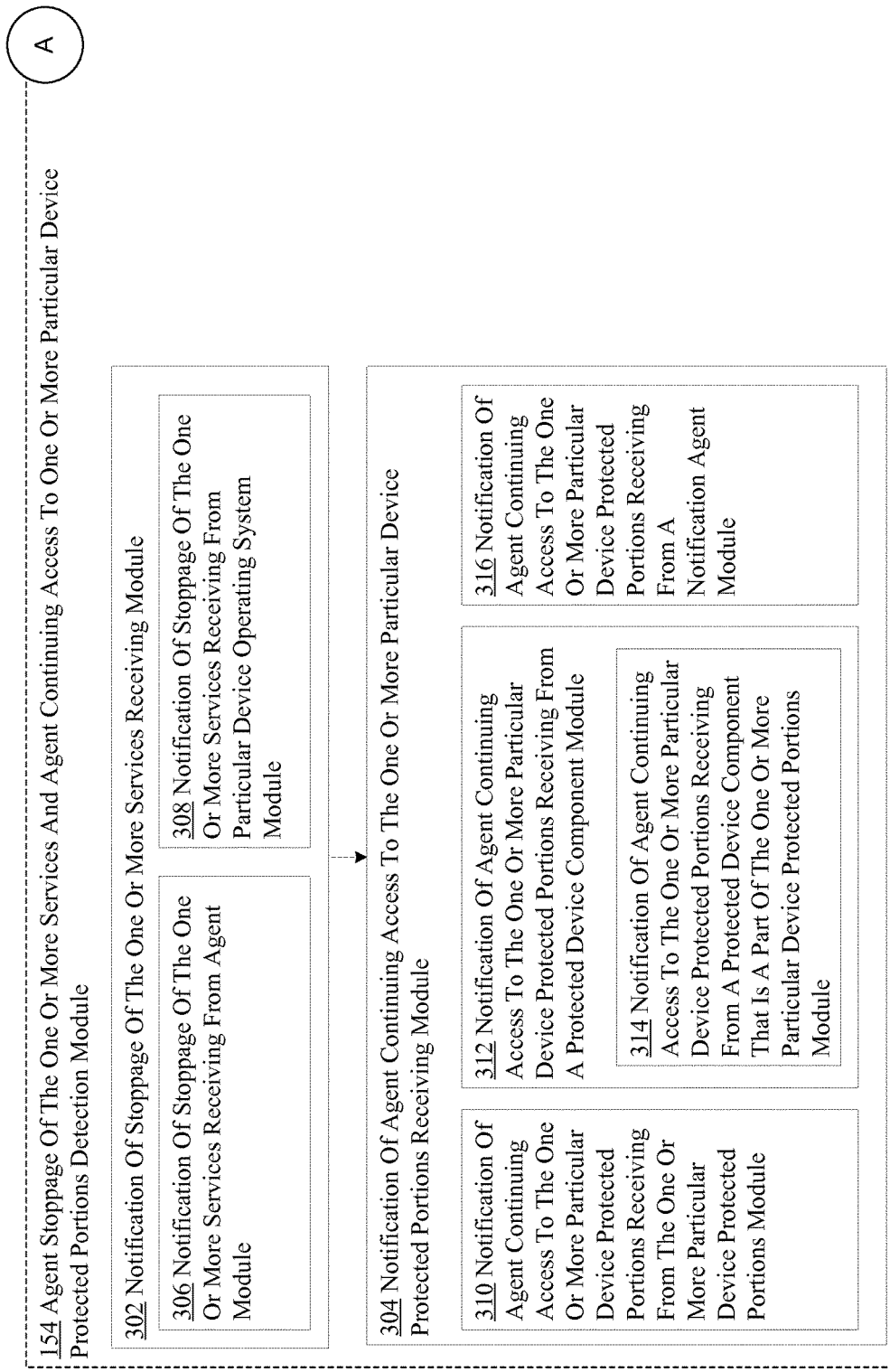

(E)

154 Agent Stoppage Of The One Or More Services And Agent Continuing Access To One Or More Particular Device Protected Portions Detection Module 326 Indicator Of Agent Stoppage Of The One Or More Services Obtaining Module 328 Indicator Of Agent Continuing Access To One Or More Particular Device Protected Portions Obtaining Module

| 330 Indicator Of Agent Continuing Access To One Or More Particular Device Protected Portions Obtaining By Monitoring Particular Device State Monitoring Module | 332 Indicator Of Agent Continuing Access To One Or More Particular Device Protected Portions Obtaining By Monitoring Agent Access Level Data Module | 334 Indicator Of Agent Continuing Access To One Or More Particular Device Protected Portions Obtaining By Monitoring Particular Device Access Data Module | 336 Indicator Of Agent Continuing Access To One Or More Particular Device Protected Portions Obtaining By Monitoring Attempts To Access The One Or More Particular Device Protected Portions Module | 338 Indicator Of Agent Continuing Access To One Or More Particular Device Protected Portions Obtaining By Carrying Out Agent Analysis Module |

| Fig. 3A | Fig. 3B | Fig. 3C | Fig. 3D |

FIG. 3C

156 Indicator Of Continued Agent Access To One Or More Particular Device Protected Portions And Stoppage Of The One Or More Services Presenting Module 402 Visual Representation Of Continued Agent Access To One Or More Particular Device Protected Portions And Stoppage Of The One Or More Services Presenting On A Particular Device Output Component Module 404 Visual Representation Of Continued Agent Access To A Tablet Device Positioning Sensor And Stoppage Of The One Or More Services Presenting On A Particular Device Output Component Module 406 Visual Representation Of Continued Agent Access To A Tablet Device Positioning Sensor And Stoppage Of A Child's Road Trip Assistance Service Presenting On A Particular Device Output Component Module 408 Indicator Of Continued Agent Access To One Or More Particular Device Protected Portions And Stoppage Of The One Or More Services Presenting, To An Entity Related To The Particular Device, Module 410 Notification Of Continued Agent Access To One Or More Particular Device Protected Portions And Stoppage Of The One Or More Services Presenting Module 412 Visual Notification Of Continued Agent Access To One Or More Particular Device Protected Portions And Stoppage Of The One Or More Services Displaying Via The Particular Device Module 414 Notification Icon Of Continued Agent Access To One Or More Particular Device Protected Portions And Stoppage Of The One Or More Services Displaying Via A Particular Device Screen Module

Fig. 4

| Fig. 4A | Fig. 4B | Fig. 4C |

FIG. 4A

156 Indicator Of Continued Agent Access To One Or More Particular Device Protected Portions And Stoppage Of The One Or More Services Presenting Module

| 416 List Of One Or More Agents That Have Continued Agent Access To One Or More Particular Device Protected Portions And One Or More Indicators Of One Or More Of The One Or More Agents That Have Stopped The One Or More Services Presenting Module | 418 Report Describing Continued Agent Access To One Or More Particular Device Protected Portions And The Report Indicating Whether The One Or More Services Have Been Stopped Obtaining Module | 420 Instructing The Particular Device To Present The Indicator Of Continued Agent Access To One Or More Particular Device Protected Portions And Stoppage Of The One Or More Services Module |

| 422 Altering An Agent Presentation To Indicate Continued Agent Access To One Or More Particular Device Protected Portions And Stoppage Of The One Or More Services Module | |
|---|---|
| 424 Changing A Color Of A Visual Representation Of The Agent To Indicate Continued Agent Access To One Or More Particular Device Protected Portions And Stoppage Of The One Or More Services Module | 426 Altering One Or More Steps To Be Carried Out For A User To Select An Agent To Indicate Continued Agent Access To One Or More Particular Device Protected Portions And Stoppage Of The One Or More Services Module |
| | 428 Adding One Or More Steps Required To Be Carried Out By The User To Select An Agent To Indicate Continued Agent Access To One Or More Particular Device Protected Portions And Stoppage Of The One Or More Services Module |

| Fig. 4A | Fig. 4B | Fig. 4C |

156 Indicator Of Continued Agent Access To One Or More Particular Device Protected Portions And Stoppage Of The One Or More Services Presenting Module 430 Relative Location Within An Operating System Of An Agent Presentation Altering To Indicate Continued Agent Access To One Or More Particular Device Protected Portions And Stoppage Of The One Or More Services Module

Fig. 4

| Fig. 4A | Fig. 4B | Fig. 4C |

FIG. 4C (A)

158 Presentation Of An Optional Choice For Discontinuation Of Agent Access To The One Or More Particular Device Protected Portions Facilitation Module

502 Presentation Of An Optional Choice For Discontinuation Of Agent Access To The One Or More Particular Device Protected Portions Device Instruction Module

504 Presentation Of An Optional Choice For Instructing A Module Of The Particular Device To Discontinue Agent Access To The One Or More Particular Device Protected Portions Device Instruction Module

506 Presentation Of An Optional User-selectable Choice For Instructing A Module Of The Particular Device To Discontinue Agent Access To The One Or More Particular Device Protected Portions Device Instruction Module

508 Optional Choice For Discontinuation Of Agent Access To The One Or More Particular Device Protected Portions Presenting Module

510 Optional Choice For Discontinuation Of Agent Access To The One Or More Particular Device Protected Portions Presenting To A Protected Portion Access Control Portion Of The Particular Device Module (B)

| Fig. 5A | Fig. 5B | Fig. 5C | Fig. 5D |

158 Presentation Of An Optional Choice For Discontinuation Of Agent Access To The One Or More Particular Device Protected Portions Facilitation Module 512 Presentation Of An Optional Choice For A User Setting That Instructs The Device To Discontinue Agent Access To The One Or More Particular Device Protected Portions Facilitating Module 514 Presentation, Prior To Agent Operation, Of An Optional Choice For A User Setting That Instructs The Device To Discontinue Agent Access To The One Or More Particular Device Protected Portions Facilitating Module 516 Presentation, Prior To Agent Acquisition, Of An Optional Choice For A User Setting That Instructs The Device To Discontinue Agent Access To The One Or More Particular Device Protected Portions Facilitating Module 518 Presentation, To An Entity Related To The Particular Device, Of An Optional Choice For Discontinuation Of Agent Access To The One Or More Particular Device Protected Portions Facilitation Module

| Fig. 5A | Fig. 5B | Fig. 5C | Fig. 5D |

158 Presentation Of An Optional Choice For Discontinuation Of Agent Access To The One Or More Particular Device Protected Portions Facilitation Module 520 Selectable Choice For Discontinuation Of Agent Access To The One Or More Particular Device Protected Portions Displaying Module 524 Selectable Choice For Discontinuation Of Access Of Multiple Agents, Including The Agent, To The One Or More Particular Device Protected Portions Displaying Module 522 Agent Access To The One Or More Particular Device Protected Portions Terminating Module 526 Class Of One Or More Agents, Including The Agent, Access To The One Or More Particular Device Protected Portions Terminating Module 528 Each Of One Or More Agents Access To The One Or More Particular Device Protected Portions Terminating Module 530 Presentation Of An Optional Choice For Discontinuation Of Agent Access To The One Or More Particular Device Protected Portions By Disabling The Agent Facilitation Module 532 Presentation Of An Optional Choice For Discontinuation Of Agent Access To The One Or More Particular Device Protected Portions By Removing The Agent Facilitation Module

Fig. 5

| Fig. 5A | Fig. 5B | Fig. 5C | Fig. 5D |

FIG. 5C

158 Presentation Of An Optional Choice For Discontinuation Of Agent Access To The One Or More Particular Device Protected Portions Facilitation Module 534 Presentation Of An Optional Choice For Establishing Limitations For Agent Access To The One Or More Particular Device Protected Portions Facilitation Module 536 Presentation Of An Optional Choice For Requiring Explicit Grant Of Access For Reestablishment Of Agent Access To The One Or More Particular Device Protected Portions Facilitation Module 538 Presentation Of An Optional Choice For Setting A Limit On A Number Of Times The Agent Is Permitted To Reestablish Access To The One Or More Particular Device Protected Portions Facilitation Module 540 Presentation Of An Optional Choice For Setting A Limit On A Number Of Times During A Particular Time Period That The Agent Is Permitted To Reestablish Access To The One Or More Particular Device Protected Portions Facilitation Module 542 Presentation Of An Optional Choice For Establishing Prerequisite Conditions For Allowing Reestablishment Of Agent Access To The One Or More Particular Device Protected Portions Facilitation Module 544 Presentation Of An Optional Choice For Establishing A Particular Location As A Prerequisite Condition For Allowing Reestablishment Of Agent Access To The One Or More Particular Device Protected Portions Facilitation Module 546 Presentation Of An Optional Choice For Requiring An Anonymization Of Data Used For Continued Agent Access To The One Or More Particular Device Protected Portions Facilitation Module

| Fig. 5A | Fig. 5B | Fig. 5C | Fig. 5D |

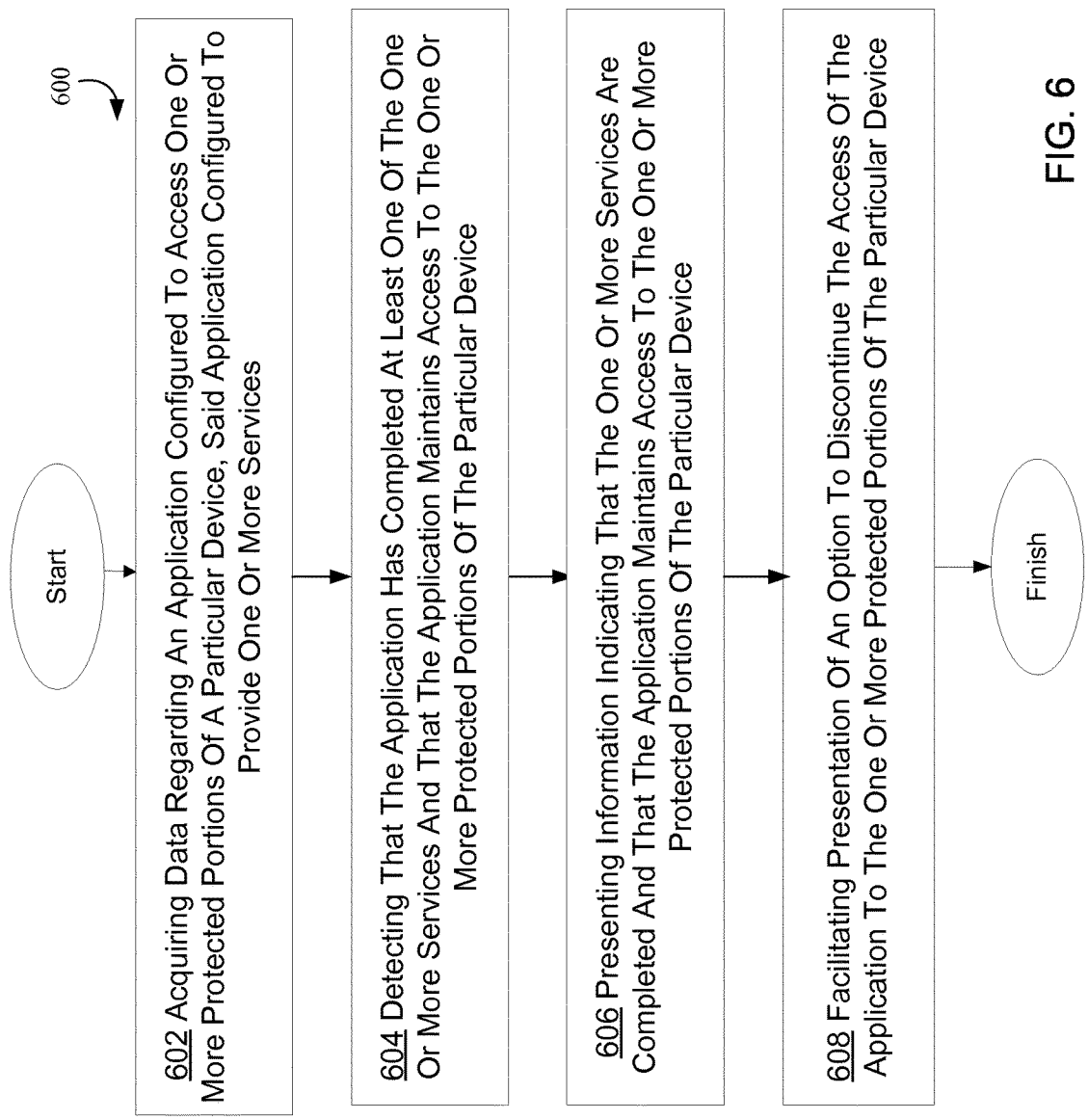

FIG. 9C

606 Presenting Information Indicating That The One Or More Services Are Completed And That The Application Maintains Access To The One Or More Protected Portions Of The Particular Device 930 Changing A Relative Location Within An Operating System Of One Or More Icons That Represent The Application, Indicating That The One Or More Services Are Completed And That The Application Maintains Access To The One Or More Protected Portions Of The Particular Device

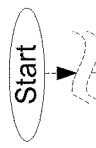
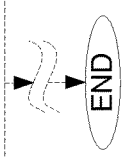

FIG. 10A

608 Facilitating Presentation Of An Option To Discontinue The Access Of The Application To The One Or More Protected Portions Of The Particular Device

1002 Facilitating Presentation Of One Or More Options For Payment For The One Or More Services, Wherein At Least One Of The Options For Payment Is In A Form Of A Request For Access To The Particular Portion Of The Device

1004 Instructing The Particular Device To Present The Option To Instruct The Particular Device To Discontinue The Access Of The Application To The One Or More Protected Portions Of The Particular Device

1006 Instructing The Particular Device To Present The Option, Selectable By A User Of The Device, To Instruct A Portion Of The Particular Device That Controls Access To The One Or More Protected Portions Of The Particular Device, To Discontinue The Access Of The Application To The One Or More Protected Portions Of The Particular Device

1008 Presenting An Option To Discontinue The Access Of The Application To The One Or More Protected Portions Of The Particular Device

1010 Presenting The Option, To A Portion Of The Particular Device That Controls Access To The One Or More Protected Portions Of The Particular Device, To Discontinue The Access Of The Application To The One Or More Protected Portions Of The Particular Device

1012 Facilitating Presentation Of A Setting Configurable By A User Of The Device That Discontinues Access Of The Application To The One Or More Protected Portions Of The Particular Device After Completion Of The One Or More Services

1014 Facilitating Presentation Of A Setting Configurable By A User Of The Device, Prior To Operating The Application, That Discontinues Access Of The Application To The One Or More Protected Portions Of The Particular Device After Completion Of The One Or More Services

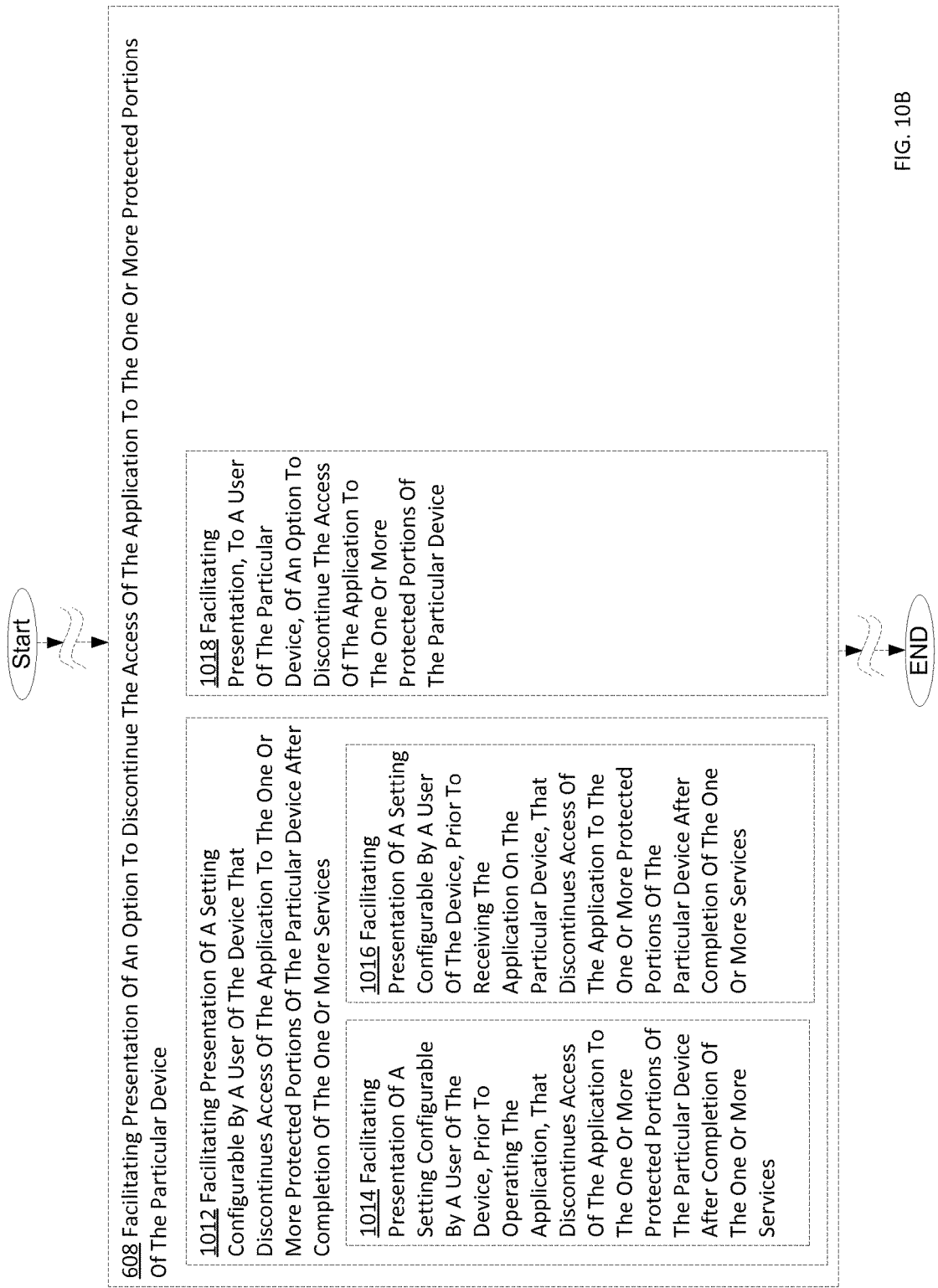

FIG. 10D

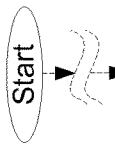
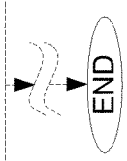

608 Facilitating Presentation Of An Option To Discontinue The Access Of The Application To The One Or More Protected Portions Of The Particular Device

1034 Facilitating Presentation Of An Option To Implement One Or More Limitations Regarding Access Of The Application To The One Or More Protected Portions Of The Particular Device

1036 Facilitating Presentation Of An Option To Require An Explicit Grant Of Access To The One Or More Protected Portions Of The Particular Device When The Application Attempts To Access The One Or More Protected Portions Of The Particular Device

1038 Facilitating Presentation Of An Option To Limit A Number Of Times That The Application Is Permitted To Access The One Or More Protected Portions Of The Particular Device

1040 Facilitating Presentation Of An Option To Limit A Number Of Times That The Application Is Permitted To Access The One Or More Protected Portions Of The Particular Device During A Particular Time Period

1042 Facilitating Presentation Of An Option To Set One Or More Conditions Regarding When The Application Is Permitted To Access The One Or More Protected Portions Of The Particular Device

1044 Facilitating Presentation Of An Option To Limit A Number Of Times That The Application Is Permitted To Access The One Or More Protected Portions Of The Particular Device When The Particular Device Is Located At A Particular Location

1046 Facilitating Presentation Of An Option To Require The Application To Anonymize Data Retrieved From The One Or More Protected Portions Of The Particular Device, In Order To Maintain Access To The One Or More Protected Portions Of The Particular Device

METHODS AND SYSTEMS FOR MANAGING DATA AND/OR SERVICES FOR DEVICES

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application claims benefit of priority of U.S. Provisional Patent Application No. 61/720,245 titled METHODS AND SYSTEMS FOR DATA SERVICES, naming Edward K. Y. Jung, Royce A. Levien, Richard T. Lord, Robert W. Lord, and Mark A. Malamud as inventors, filed 30 Oct. 2012, which was filed within the twelve months preceding the filing date of the present application or is an application of which a application is entitled to the benefit of the filing date.

For purposes of the USPTO extra-statutory requirements, the present application claims benefit of priority of U.S. Provisional Patent Application No. 61/720,874 titled METHODS AND SYSTEMS FOR DATA SERVICES, naming Edward K. Y. Jung, Royce A. Levien, Richard T. Lord, Robert W. Lord, and Mark A. Malamud as inventors, filed 31 Oct. 2012, which was filed within the twelve months preceding the filing date of the present application or is an application of which a application is entitled to the benefit of the filing date.

For purposes of the USPTO extra-statutory requirements, the present application constitutes a continuation-in-part of U.S. patent application Ser. No. 13/685,485, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,609, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,488, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,612, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,491, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,613, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/692,829, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 3 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/692,882, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 3 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/731,624, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 31 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/731,947, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 31 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/731,641, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 31 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/731,960, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 31 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/731,968, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 31 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/732,127, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 31 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/732,305, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 31 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/732,326, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 31 Dec. 2012, which is currently co-pending or is an application of which a currently co-pending application is entitled to the benefit of the filing date.

RELATED APPLICATIONS

U.S. patent application Ser. No. 13/731,624, entitled METHODS AND SYSTEMS FOR MANAGING ONE OR MORE SERVICES AND/OR DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,947, entitled METHODS AND SYSTEMS FOR MANAGING ONE OR MORE SERVICES AND/OR DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,641, entitled METHODS AND SYSTEMS FOR MANAGING SERVICES AND DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,960, entitled METHODS AND SYSTEMS FOR MANAGING SERVICES AND DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,968, entitled METHODS AND SYSTEMS FOR MANAGING SERVICES AND DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/732,127, entitled METHODS AND SYSTEMS FOR MANAGING DATA AND/OR SERVICES FOR DEVICES, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/732,305, entitled METHODS AND SYSTEMS FOR MONITORING AND/OR MANAGING DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/732,326, entitled METHODS AND SYSTEMS FOR MONITORING AND/OR MANAGING DEVICE DATA, naming Edward K. Y. Jung, Royce A. Levien, Richard T. Lord, Robert W. Lord, and Mark A. Malamud as inventors, filed 31 Dec. 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to data services.

SUMMARY

In one or more various aspects, a method includes but is not limited to acquiring data regarding an application configured to access one or more protected portions of a particular device, said application configured to provide one or more services, detecting that the application has completed at least one of the one or more services and that the application maintains access to the one or more protected portions of the particular device, presenting information indicating that the one or more services are completed and that the application maintains access to the one or more protected portions of the particular device, and facilitating presentation of an option to discontinue the access of the application to the one or more protected portions of the particular device. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for acquiring data regarding an application configured to access one or more protected portions of a particular device, said application configured to provide one or more services, means for detecting that the application has completed at least one of the one or more services and that the application maintains access to the one or more protected portions of the particular device, means for presenting information indicating that the one or more services are completed and that the application maintains access to the one or more protected portions of the particular device, and means for facilitating presentation of an option to discontinue the access of the application to the one or more protected portions of the particular device. In addition to the foregoing, other system aspects are described in the claims, drawings, and text forming a part of the disclosure set forth herein.

In one or more various aspects, a system includes, but is not limited to, circuitry for acquiring data regarding an application configured to access one or more protected portions of a particular device, said application configured to provide one or more services, circuitry for detecting that the application has completed at least one of the one or more services and that the application maintains access to the one or more protected portions of the particular device, circuitry for presenting information indicating that the one or more services are completed and that the application maintains access to the one or more protected portions of the particular device, and facilitating presentation of an option to discontinue the access of the application to the one or more protected portions of the particular device. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for acquiring data regarding an application configured to access one or more protected portions of a particular device, said application configured to provide one or more services, one or more instructions for detecting that the application has completed at least one of the one or more services and that the application maintains access to the one or more protected portions of the particular device, and one or more instructions for presenting information indicating that the one or more services are completed and that the application maintains access to the one or more protected portions of the particular device, and one or more instructions for facilitating presentation of an option to discontinue the access of the application to the one or more protected portions of the particular device. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for acquiring data regarding an application configured to access one or more protected portions of a particular device, said application configured to provide one or more services, one or more interchained physical machines ordered for detecting that the application has completed at least one of the one or more services and that the application maintains access to the one or more protected portions of the particular device, one or more interchained physical machines ordered for presenting information indicating that the one or more services are completed and that the application maintains access to the one or more protected portions of the particular device, and one or more interchained physical machines ordered for facilitating presentation of an option to discontinue the access of the application to the one or more protected portions of the particular device.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1D shows a high-level block diagram of a personal device 120 and a computing device 130B operating in an exemplary embodiment 100", according to an embodiment.

FIG. 2, including FIGS. 2A-2C, shows a particular perspective of a data regarding agent that is configured to provide one or more services and to selectively access one or more particular device protected portions obtaining module 152 of processing module 150 of personal device 120 of FIG. 1B, according to an embodiment.

FIGS. 3A-3D, shows a particular perspective of an agent stoppage of the one or more services and agent continuing access to one or more particular device protected portions detection module 154 of processing module 150 of personal device 120 of FIG. 1B, according to an embodiment.

FIG. 4, including FIGS. 4A-4C, shows a particular perspective of an indicator of continued agent access to one or more particular device protected portions and stoppage of the one or more services presenting module 156 of processing module 150 of personal device 120 of FIG. 1B, according to an embodiment.

FIG. 5, including FIGS. 5A-5D, shows a particular perspective of a presentation of an optional choice for discontinuation of agent access to the one or more particular device protected portions facilitation module 158 of processing module 150 of personal device 120 of FIG. 1B, according to an embodiment.

FIG. 6 is a high-level logic flowchart of a process, e.g., operational flow 600, according to an embodiment.

FIG. 9C is a high-level logic flow chart of a process depicting alternate implementations of a presenting information operation 606, according to one or more embodiments.

FIG. 10A is a high-level logic flow chart of a process depicting alternate implementations of facilitating presentation operation 608, according to one or more embodiments.

FIG. 10B is a high-level logic flow chart of a process depicting alternate implementations of facilitating presentation operation 608, according to one or more embodiments.

FIG. 10D is a high-level logic flow chart of a process depicting alternate implementations of facilitating presentation operation 608, according to one or more embodiments.

DETAILED DESCRIPTION

Figure 1A:
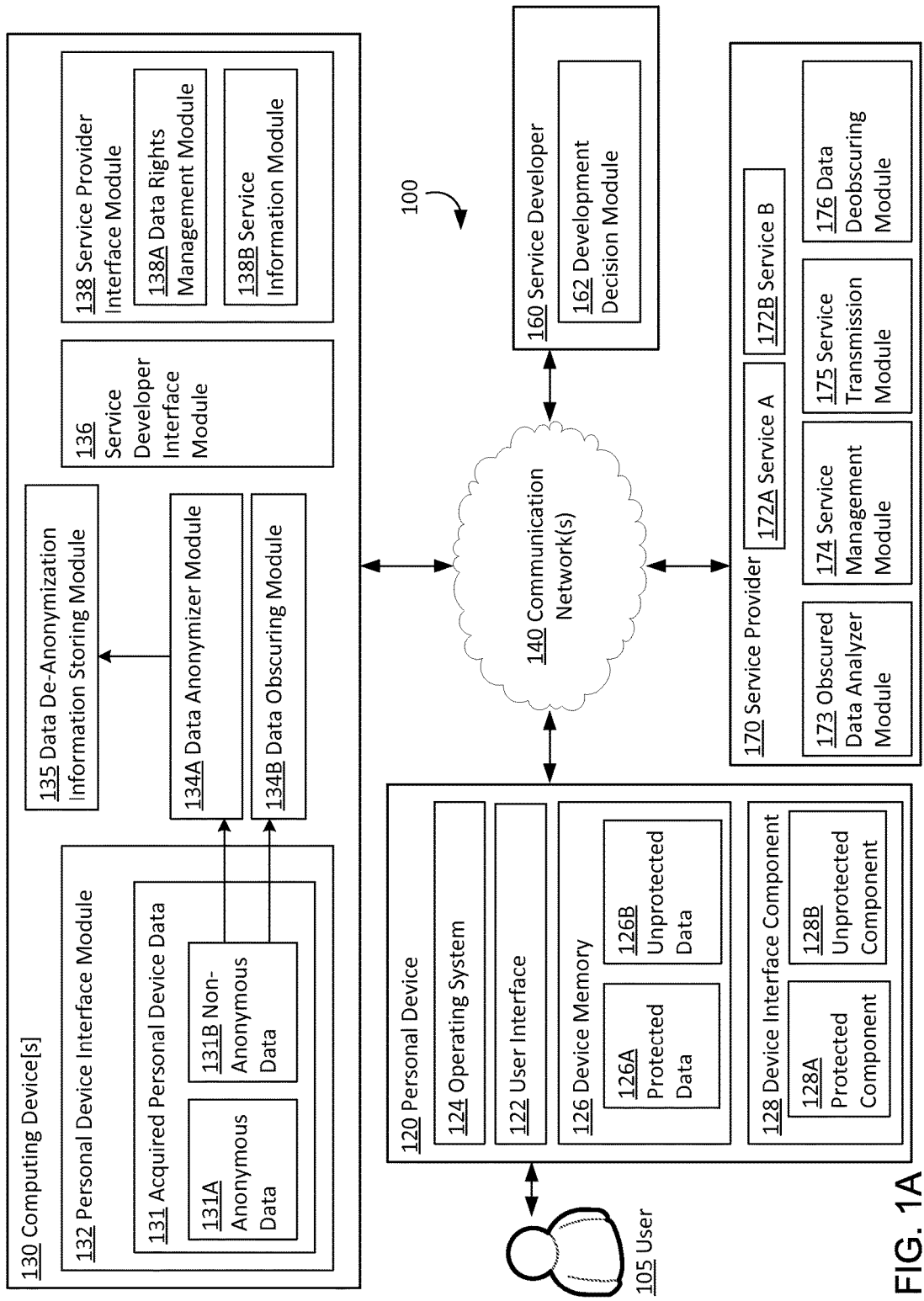
FIG. 1A shows a high-level block diagram of an exemplary environment 100, according to an embodiment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for acquiring data regarding an application configured to access one or more protected portions of a particular device, said application configured to provide one or more services, detecting that the application has completed at least one of the one or more services and that the application maintains access to the one or more protected portions of the particular device, presenting information indicating that the one or more services are completed and that the application maintains access to the one or more protected portions of the particular device, and facilitating presentation of an option to discontinue the access of the application to the one or more protected portions of the particular device.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies.

See, e.g., Wikipedia, High-level programming language, http://en.wikipedia.org/wiki/High-levelprogramming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructionsper_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 105 is shown/described herein, e.g., in FIG. 1, and other places, as a single illustrated figure, those skilled in the art will appreciate that user 105 may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In known systems, devices that are associated with one or more users, e.g., phones, tablets, laptops, desktops, cars, game systems, appliances, and the like, may collect data regarding the user. This data may be desired by third parties. The following describes, among other implementations, methods and systems of managing user data collected by one or more devices that may also be useful to entities that are not the user, and which entities may not necessarily have access to the data.

Referring now to FIG. 1, FIG. 1 illustrates an example environment 100 in which the methods, systems, circuitry, articles of manufacture, and computer program products and architecture, in accordance with various embodiments, may be implemented by one or more personal devices 120. As shown in FIG. 1A, one or more personal devices 120, one or more service providers 170, one or more service developers 160, and one or more computing devices 30 may communicate via one or more communication networks 140. In an embodiment, service provider 170 may have one or more services that personal device 120 may want. In an embodiment, computing device 130, which may be a remote or local server, or distributed set of servers, may manage data that is gathered, stored, controlled, accessed, restricted, monitored, under the control of, checked, examined, verified, authenticated, authorized, manipulated, updated, altered, filtered, or otherwise acted upon, whether passively or actively, by personal device 120. In an embodiment, as described in more detail herein, computing device 130 may have access to some or all of the data on personal device 120. In another embodiment, computing device 130 may have access to only a portion of the data on personal device 120. In still another embodiment, computing device 130 may have access to a modified version of the data on personal device 120. Specifically, in an embodiment, computing device 130 may have access to the data stored on personal device 120, but in anonymous form.

In an embodiment, computing device 130 may offer one or more services to personal device 120. In an embodiment, the offer of one or more services may be conditional on a grant of access to part or all of the data stored and/or collected by personal device 120. In an embodiment, computing device 30 may receive one or more services from service provider 170 and/or service developer 160, and may select one or more of the received services for presentation to the personal device 120. In an embodiment, the data from personal device 120 may be shared with one or more of service provider 170 and service developer 160. In an embodiment, the data from personal device 120 may be anonymized prior to sharing with service developer 160 and/or service developer 170.

Referring again to FIG. 1A, FIG. 1A shows a personal device 120. Personal device 120 may be any electronic device, portable or not, that may be operated by or associated with one or more users. Personal device 120 is shown as interacting with a user 105. As set forth above, user 105 may be a person, or a group of people, or another entity that mimics the operations of a user. In some embodiments, user 105 may be a computer or a computer-controlled device. Personal device 120 may be, but is not limited to, a cellular phone, a network phone, a smartphone, a tablet, a music player, a walkie-talkie, a radio, a USB drive, a portable solid state drive, a portable disc-type hard drive, an augmented reality device (e.g., augmented reality glasses and/or headphones), earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like.

Referring again to FIG. 1A, personal device 120 may include an operating system 124. In this context, operating system 124 refers to any hardware, software, firmware, and combination thereof which is considered at the core or baseline of a device. For example, applications that interact directly with hardware may be considered to be part of an operating system. In some embodiments, operating system 124 may be an FPGA, printed circuit board, or other wired device. In an embodiment, operating system 124 may include one or more of Google's Android, Apple's iOS, Microsoft's Windows, various implementations of Linux, and the like. In some embodiments, operating system 124 may include a root menu for one or more televisions, stereo systems, media players, and the like. In some embodiments, operating system 124 may be a "home" screen of a device.

Referring again to FIG. 1A, in an embodiment, personal device 120 may include a user interface 123. User interface 123 may include any hardware, software, firmware, and combination thereof that allow a user 105 to interact with a personal device 120, and for a personal device 120 to interact with a user 105. In some embodiments, user interface 123 may include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, and the like.

Referring again to FIG. 1A, in some embodiments, personal device 120 may include a device memory 126. In some embodiments, device memory 126 may include memory, random access memory ("RAM"), read only memory ("ROM"), flash memory, hard drives, disk-based media, disc-based media, magnetic storage, optical storage, volatile memory, nonvolatile memory, and any combination thereof. In some embodiments, device memory 126 may be separated from the device, e.g., available on a different device on a network, or over the air. For example, in a networked system, there may be many personal devices 120 whose device memory 126 is located at a central server that may be a few feet away or located across an ocean.

Referring again to FIG. 1A, in some embodiments, device memory 126 may include one or more of protected data 126A and unprotected data 126B. Not all embodiments include each or both of these, but protected data 126A and unprotected data 126B may be present in one or more embodiments. Protected data 126A may include any data, including data stored on personal device 120, data for which personal device 120 maintains at least partial control of, data for which personal device 120 monitors or provides the ability to monitor, and the like, for which some form of authorization is required to access the data. The authorization may take any form and relate to any sub-unit, including both internally and externally to the device. For example, in an embodiment, protected data 126A may include data which is not available to at least one application running on a computing device. For another example, in an embodiment, protected data 126A may be available to one application at any time, and to another application at specific times, or at times when the first application is not using the data. In an embodiment, protected data 126A includes data for which an application must be authenticated (e.g., a Microsoft operating system certification, or a user flag set to true) in order to access the protected data 126A.

In an embodiment, protected data 126A includes data that a user, e.g., user 105, cannot view until the user 105 verifies their identity, e.g., through a password input or biometric identification. In an embodiment, protected data 126A is limited to the device, and is not transmitted to any other system not under the direct control of the personal device 120. In an embodiment, protected data 126A is limited to the personal device 120, and only applications originating at the personal device 120, or originating with the user 105, are allowed to read protected data 126A. In an embodiment, personal device 120 modifies or directs to be modified protected data 126A, so at least a portion of the protected data 126A is altered or obscured. In an embodiment, personal device 120 allows protected data 126A to be transmitted to an external entity under the condition that the external entity will alter or obscure at least a portion of the protected data 126A.

Referring again to FIG. 1A, in an embodiment, personal device 120 may include device memory 126, which, in some embodiments, may include unprotected data 26B. In an embodiment, unprotected data 126B may have no protections or limitations. In another embodiment, unprotected data 126B may have protections and limitations, but be less protected and/or less limited than protected data 126B. In an embodiment, unprotected data 126B is broadcasted or otherwise transmitted upon request. In an embodiment, unprotected data 126B cannot be accessed by an entity external to personal device 120 due to device design or other factors, but there is no specific protection on unprotected data 126B from access by one or more entities external to personal device 20.

Referring again to FIG. 1A, in an embodiment, personal device 120 may include device interface component 128. In an embodiment, device interface component 128 includes any component that allows the device to interact with its environment. For example, in an embodiment, device interface component 128 includes one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, and the like. In an embodiment, device interface component 128 also may include one or more user interface components, e.g., user interface 122 (e.g., although they are drawn separately, in some embodiments, user interface 122 may be a type of device interface component 128), and in some embodiments including one or more user input receiving components and output presenting components.

Referring again to FIG. 1A, in an embodiment, device interface component 128 may include protected component 128A. Protected component 128A may include any device interface component 128, of which some non-limiting examples previously were enumerated, for which some form of authorization and/or authentication is required to access the data. The authorization may take any form and relate to any sub-unit, including both internally and externally to the device. In an embodiment, protected component 128A is similar to protected data 126A. For example, in an embodiment, a personal device 120, e.g., a smart phone, may have twelve applications running on the smartphone. In an embodiment, six of those applications may have access to a protected component 128A, e.g., a positioning sensor, and the other six may not. In some embodiments, data collected by a protected component 128A is part of the protected component 128A. In some embodiments, data collected by a protected component 128A becomes protected data 126A. In some embodiments, data collected by a protected component 128A becomes protected data 126A some of the time, or none of the time. In some embodiments, data collected by a protected component 128A may be part of protected component 128A for a particular amount of time, e.g., two weeks, and then may transition to unprotected data or data that is not considered protected or unprotected. In some embodiments, a protected component 128A may be accessible to everyone at particular times and/or circumstances. For example, a protected component 128A, e.g., a wireless radio, may be accessible to any entity between the hours of 7 and 8 pm, and only accessible to specific entities and/or applications at other times. In some embodiments, a protected component 128A, e.g., an image capturing component, may be accessible to any entity when one or more conditions are met, which conditions may or may not be related to the protected component 128A or the personal device 120, e.g., when the personal device 120 is at a particular location.

Referring again to FIG. 1A, in some embodiments, computing device 30 may include personal device interface module 132. In some embodiments, personal device interface module 132 may communicate with one or more personal devices 120. In some embodiments, personal device interface module 132 may receive data 131 received from a personal device 120. Acquired personal device data 131 may include any data gathered from personal device 120, in any manner. In some embodiments, computing device 30 may request data from personal device 120. In some embodiments, computing device 30 may receive data from personal device 120 on a schedule. In some embodiments, computing device 130 may retrieve data from personal device 120 when certain conditions are met. In some embodiments, personal device 120 is broadcasting data, and computing device 130 gathers the broadcasted data. In some embodiments, personal device 120 broadcasts data that only computing device 130 can use (e.g., decrypt, interpret, or the like). In some embodiments, personal device 120 may transmit acquired personal device data 131 to computing device 30 using one or more communication networks 140, which will be described in more detail herein.

Referring again to FIG. 1A, in some embodiments, the acquired personal device data 131 may be anonymous data 131A. In an embodiment, anonymous data refers to data from which the origin of the data cannot be uniquely identified. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification. It is noted that, in some embodiments, the device may be able to recognize the origin of the data, e.g., an identity of personal device 120, that is transmitting the data due to the nature of the data transmission, but be unable to deduce the origin of the data through the data itself, in which case, in some embodiments, this data is still considered anonymous data 131A.

Anonymous data 131A may include data for which uniquely identifying information has been removed, or data for which uniquely identifying information has been concealed, obscured, made uncertain, made ambiguous, screened, camouflaged, masked, veiled, shrouded, hidden, encoded, encrypted, or otherwise altered. In some embodiments, the received anonymous data 131A never included uniquely identifying information. In some embodiments, anonymous data 131A may partially or non-uniquely identify its origin, e.g., the user 105 or the personal device 120 from which the anonymous data came. In some embodiments, uniquely identifying information may be extracted from anonymous data 131A using additional information, e.g., a lookup table, hash, or other known algorithm. In some embodiments, uniquely identifying information may be deduced from anonymous data 131A without additional information. In some embodiments, uniquely identifying information may not be retrieved from anonymous data 131A once the data is in its anonymous format.

In an embodiment, acquired personal device data 131 may include non-anonymous data 131B. In some embodiments, non-anonymous data 131B may identify, either explicitly or implicitly, the origin of the data. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification.

Referring to FIGS. 1A-1D, data anonymization systems and methods are illustrated. Although these systems and methods are illustrated as part of computing device 130, this is merely for convenience of drawing. In an embodiment, one or more of data de-anonymization information storing module 135, data anonymizer module 134A, and data obscuring module 134B may be located within personal device 120. In an embodiment, these modules may interact directly with device memory 126. In an embodiment, as pictured in FIG. 1A, computing device 130 may include a data anonymizer module 134A that converts non-anonymous data 131B into anonymized data, in a process described in more detail with respect to FIGS. 1C and 1D. In an embodiment, depending on the type of anonymization, there may be additional data that can be used to return the anonymized data into non-anonymous data, e.g., a lookup table. In some such embodiments, the additional data, e.g., de-anonymization data, may be stored in data de-anonymization information storing module 135.

Referring again to FIGS. 1A-1D, in an embodiment, computing device 130 may include a data obscuring module 134B. For example, in an embodiment, data obscuring module 134B may obscure the non-anonymous data 131B, similarly to the data anonymizer module 134A. For example, in an embodiment, data obscuring module 134B may apply data masking. In an embodiment, data obscuring module 134B may obscure by addition, e.g., by adding false identification information to the true identification information, so that the false identification information may not be distinguished from the true identification information. Data de-anonymization information storing module 135, data anonymizer module 134A, and data obscuring module 134B may be absent in some embodiments.

Referring again to FIG. 1A, in an embodiment, computing device 130 may include service developer interface module 136. Service developer interface module 136 may communicate with service developer 160, e.g., via communication network 140. Specifically, in an embodiment, service developer interface module 136 may provide limited information regarding the acquired personal device data 131. In an embodiment, for example, service developer interface module 136 may provide information to service developer 160 regarding the type of data collected. In an embodiment, for example, service developer interface module 136 may provide information to service developer 160 regarding an aggregate synopsis of the data collected. In an embodiment, service developer 160 may receive such information and make a decision about what types of services to develop, e.g., using development decision module 162.

Referring again to FIG. 1A, in an embodiment, computing device 130 may include service provider interface module 138. In an embodiment, service provider interface module 138 may communicate with service provider 170, e.g., via communication network 140.

In an embodiment, service provider interface module 138 may include data rights management module 138A. In an embodiment, data rights management module 138A may keep track of which services have rights to which personal device data. For example, in an embodiment, service 172A may have rights to certain anonymous data 131A. For another example, in an embodiment, service 172B may have rights to data that has been processed through the data anonymizer 134A.

Referring again to FIG. 1A, in an embodiment, service provider interface module 138 may include service information module 138B. Service information module 138B may include a list of services that are provided from service provider 170, so that such information may be delivered to personal device 120, in an embodiment. In an embodiment, computing device 130 may present one or more of the services listed in service information module 138B to personal device 120, either upon request, or upon detecting that personal device 120 may be interested in one or more of the services.

Referring again to FIG. 1A, in an embodiment, service provider 170 may provide services to a personal device 120. In an embodiment, these services may be delivered to directly to personal device 120. In an embodiment, service provider 170 has limited or no communication with personal device 120, and communication is handled through an intermediary, e.g., computing device 130. In an embodiment, computing device 130 handles the delivery of services and data between service provider 170 and personal device 120 such that protected data 126A and protected component 128A are protected from service provider 170, but that service provider 170 can still provide services, e.g., service 172A and service 172B, to personal device 120. In an embodiment, service provider 170 includes a list of services management module 174 that maintains a list of services to present to computing device 130, e.g., to allow service information module 138B of computing device 130 to maintain information about various services.

In various embodiments, the communication network 140 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 140 may be wired, wireless, or a combination of wired and wireless networks. It is noted that "communication network" as used herein and in the drawings refers to one or more communication networks, which may or may not interact with each other and which, in some embodiments, may work in concert, wittingly or unwittingly, to facilitate communication between one or more entities.

Figure 1B:
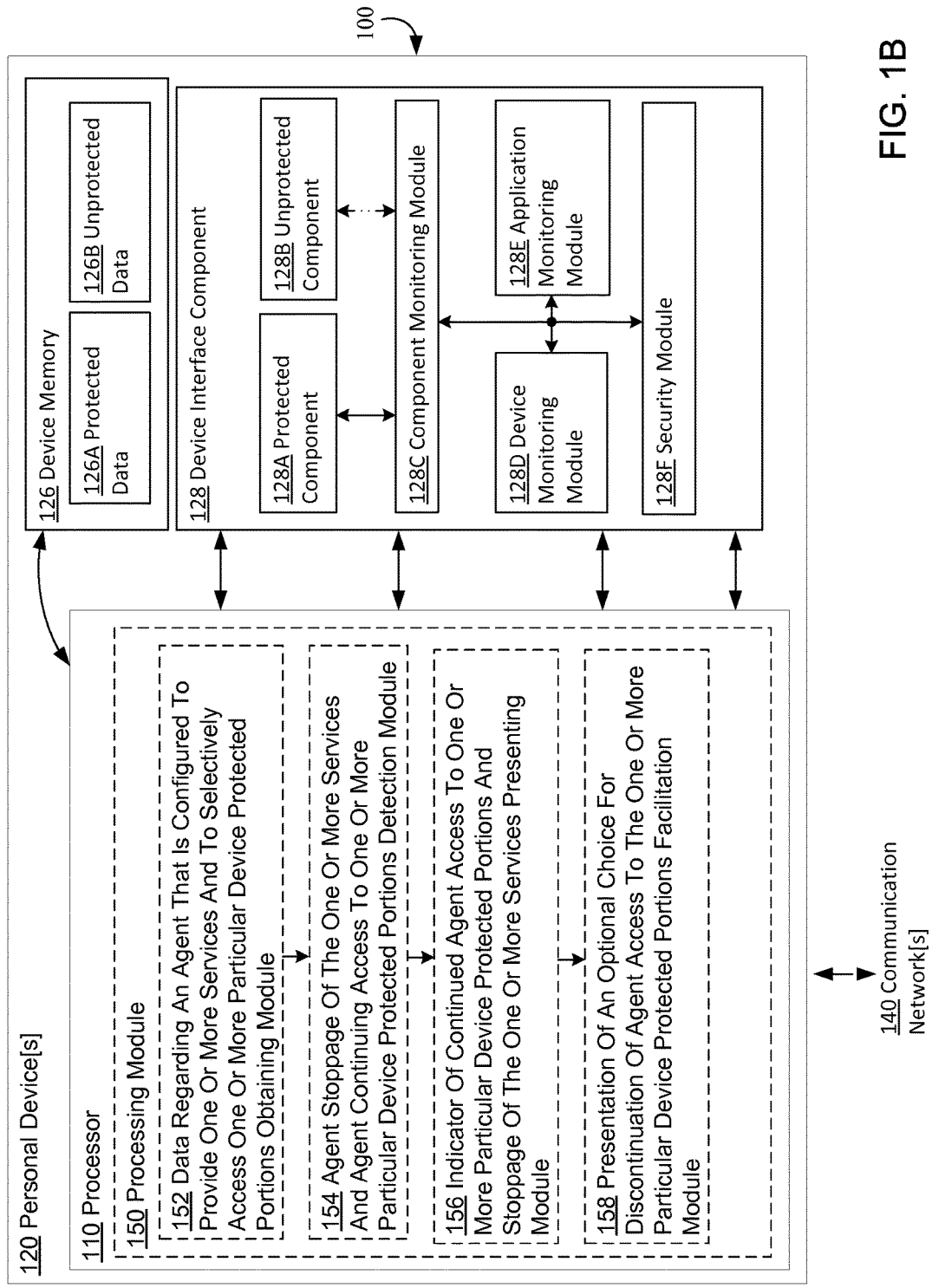
FIG. 1B shows a high-level block diagram of a personal device 120 operating in an exemplary environment 100, according to an embodiment.
Figure 1C:
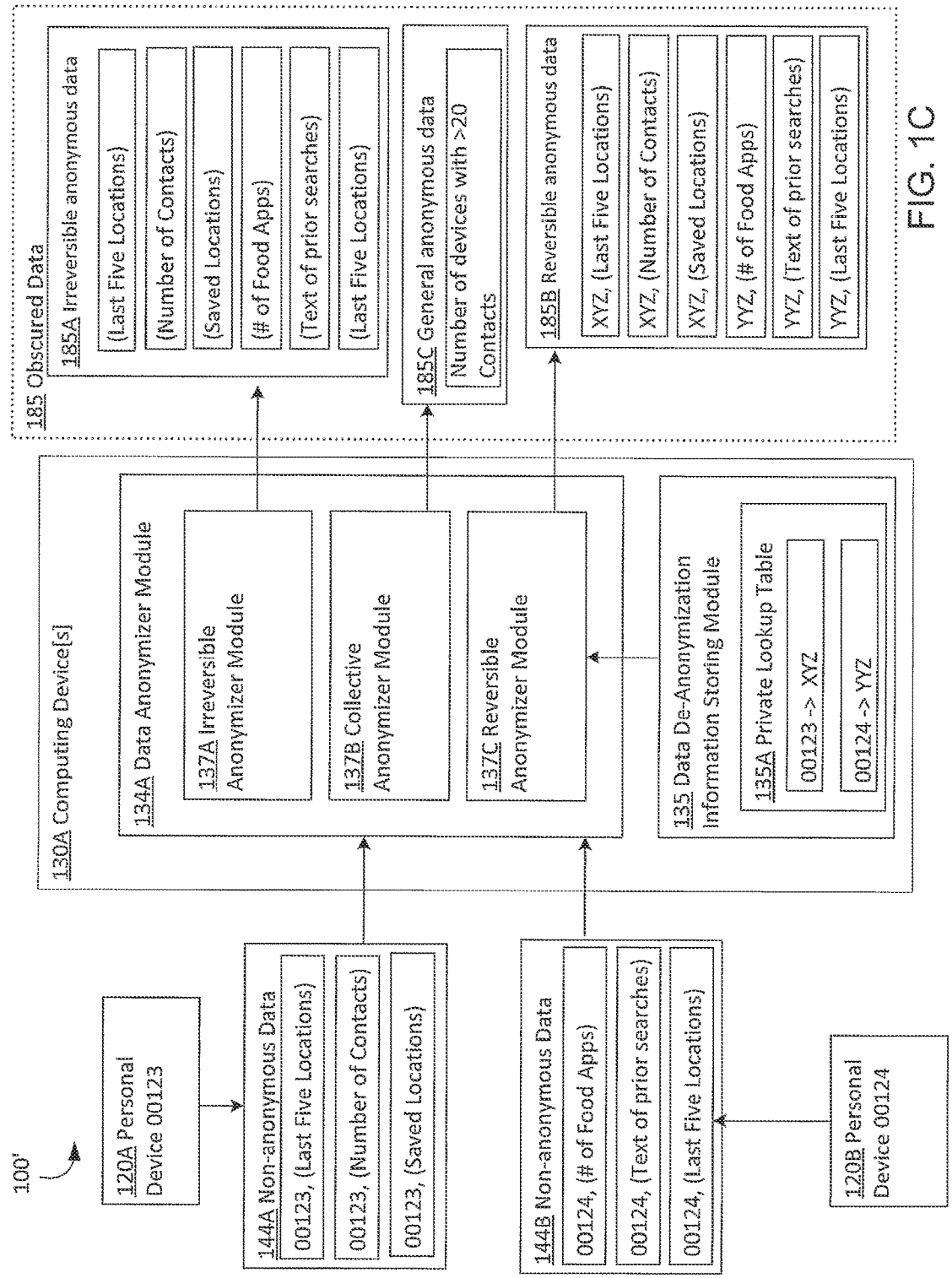
FIG. 1C shows a high level block diagram of a personal device 120 and a computing device 130A operating in an exemplary embodiment 100', according to an embodiment.

Referring now to FIG. 1C, an embodiment may include a personal device 120A and a personal device 120B. Personal device 120A may generate non-anonymous data 144A, and personal device 120B may generate non-anonymous data 144B. Non anonymous data 144A and non-anonymous data 144B may be transmitted to computing device 130A, which may be a non-exclusive and non-limiting example of computing device 130. In an embodiment, computing device 130A may include a data anonymizer module 134A. In an embodiment, data anonymizer module 134A may include irreversible anonymizer module 137A, which generates anonymous data that is irreversible, e.g., in an example, the identifying data has been removed. In an embodiment, data anonymizer module 134A may include collective anonymizer module 137B, which may take the non-anonymous data 144A and the non-anonymous data 144B and create an aggregated, general anonymous data, as shown FIG. 1C. In an embodiment, data anonymizer module 134A may include reversible anonymizer module 137C, which may use a private lookup table 135A to convert the non-anonymous data into anonymous data. In an embodiment, that private lookup table 135A may be stored in the data-deanonymization information storing module 135.

Referring now to FIG. 1D, in an embodiment, a computing device 130B may have a data anonymizer 134A that may apply an anonymizing function 132A, as shown in FIG. 1D. For example, an anonymizing function may use a cryptographic method, a perturbation method, a DataFly algorithm, top-down specialization, and/or Mondarian multidimensional k-anonymity, as non-limiting and non-exclusive examples. In another embodiment, a data obscuring module 134B obscures the non-anonymous data. In an embodiment, the obscuring may be accomplished by adding similar-looking and plausible "false" data to the actual identifying data, so that later, the true data cannot be determined merely by looking at the data. In an embodiment, the obscured data 185 may be used by the service provider interface module 38 to give data to the service provider 170, either to carry out a portion of a service, e.g., services 181, or to determine which services may be useful to one or more personal devices 120.

The examples shown in FIGS. 1C and 1D are merely examples of how a data anonymizer might be implemented, and are not intended to be limiting or exclusive. There are many other techniques for anonymizing the data, some of which will be mentioned herein.

Figure 1E:
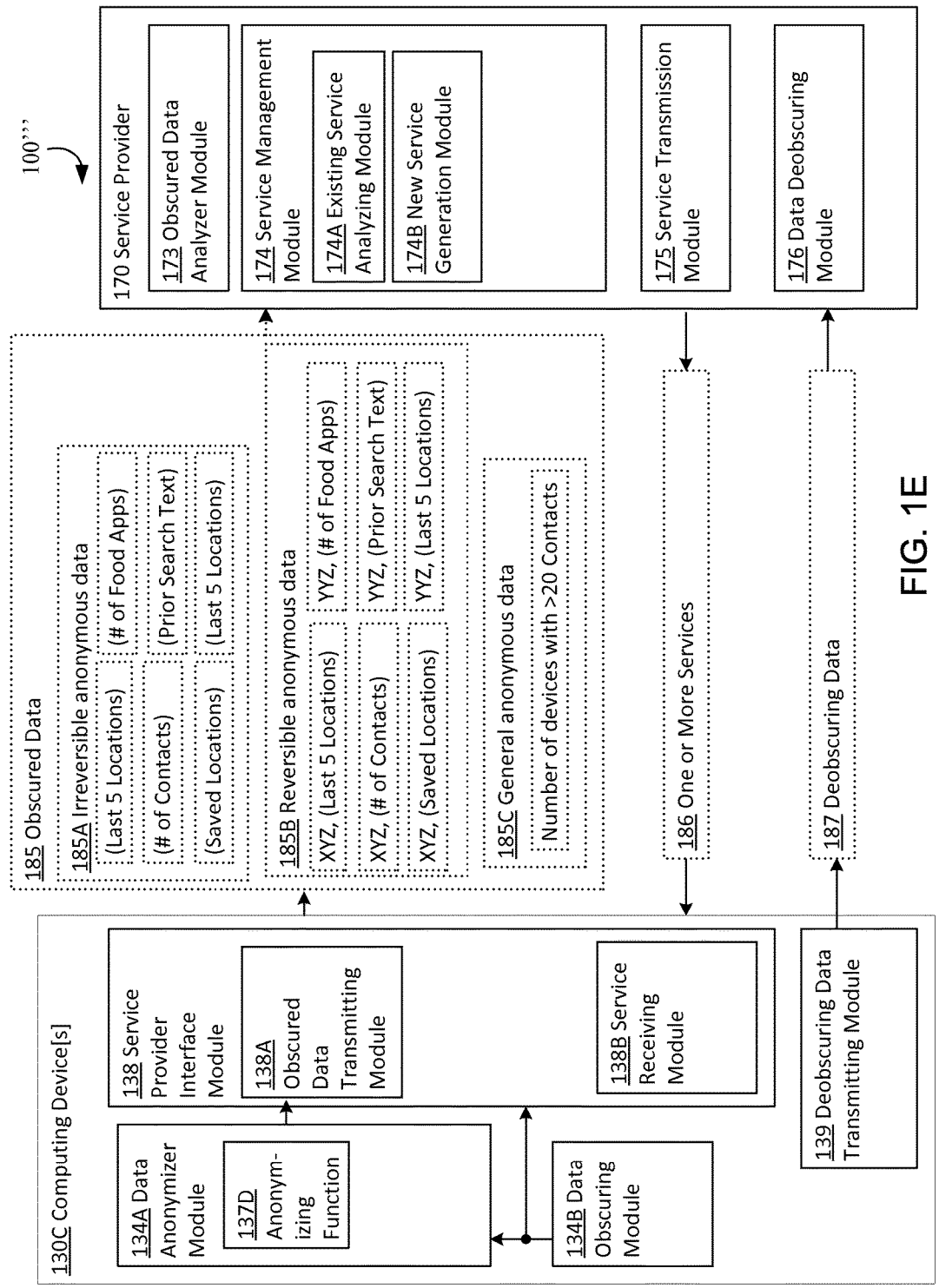
FIG. 1E shows a high-level block diagram of a personal device 120 and a computing device 130C operating in an exemplary embodiment 100''', according to an embodiment.

Referring now to FIG. 1E, FIG. 1E shows an embodiment of the invention focusing on a service provider 170 and a computing device 130C. Computing device 130C may receive data from one or more devices, and that data may be anonymized already, or may not be anonymized, or may already be obscured. In an embodiment, computing device 130C may generate obscured data from the data received from one or more devices, whether received directly from the one or more devices, or indirectly from another source. In an embodiment, Computing device 130C may obscure received data, even if the received data is already anonymized. In another embodiment, computing device 130C may not perform additional steps on previously anonymized or obscured data.

Referring again to FIG. 1E, in an embodiment, computing device 130C may request one or more services 190 that may be executed on one or more devices. The one or more services may be performed independently by the one or more devices, or may be performed with facilitation of one or more portions of the services by computing device 130C. Computing device 130C may request that service provider 170 provide one or more services that can be presented to the one or more devices. In an embodiment, computing device 130C may transmit obscured data 185 to service provider 170. This transmission may take place via any form of network, e.g., communication network 140 (not pictured in FIG. 1E). In an embodiment, service provider 170 may be integral with computing device 130C. In an embodiment, service provider 170 and computing device 130C may be under the control of a single entity.

Referring again to FIG. 1E, in an embodiment, service provider 170 may receive the obscured data 185. The obscured data 185 may be in any format, as described in several examples herein. The examples illustrated in FIG. 1E and in the following figures are intended for ease of understanding only, and should not be considered an exhaustive or an exclusive enumeration of ways that data may be obscured. For example, in an embodiment, irreversible anonymous data 185A may be obscured by deleting the device origin information from the data, such that the data cannot be recovered using the irreversible anonymous data 185A. In order to obtain the original device information that formed the irreversible anonymous data 185A, a copy of the original data may be retrieved. For example, in an embodiment, computing device 130C may store a separate copy of the data that resulted in the irreversible anonymous data 185A, with uniquely identifying device information present in the copy kept by computing device 130C.

In an embodiment, obscured data 185 may include reversible anonymous data 185B. Data 185B is not limited to a particular type of format, but a simple example is shown. In the example, the device identifiers of the one or more personal devices 120A and 120B, e.g., 00123 and 00124, are converted to new identifiers XYZ and YYZ (e.g., as shown in FIG. 1C), which, in an embodiment, may prevent service provider 170 from learning the identity of devices 00123 and 00124. In an embodiment, reversible anonymous data 185B may be converted into data that uniquely identifies one or more devices, through the providing of one or more algorithms, lookup tables, keys, encryption keys, hash functions, and the like.

In an embodiment, obscured data 185 may include general anonymous data 185C. In an embodiment, this type of data may include any format of aggregated data which gives information about one or more devices, but does not particularly identify the one or more devices that led to the aggregate information. For example, general anonymous data 185C may include such data as "thirty-five devices with more than twenty contacts in a contact list found," or more specific data, such as "thirty-five smartphones, e.g., Apple iPhone 4S running iOS 6.0, with more than 2.0 gigabytes of space remaining, with more than twenty contacts in a contact list found."

Referring again to FIG. 1E, in an embodiment, service provider 170 may receive obscured data 185, as shown in FIG. 1E. In an embodiment, service provider 170 may include an obscured data analyzer module 173. Obscured data analyzer module 173 may receive the obscured data 185 and use the obscured data 185 to determine one or more services or types of services that may be useful to the devices referenced in the obscured data 185. Obscured data analyzer module 173 may be completely automated, or may have some human intervention in the process. In an embodiment, obscured data analyzer 173 may obtain obscured data 185 from several different computing devices 130C, which may allow service provider 170 to provide one or more services more efficiently. In an embodiment, service provider 170 may include service management module 174. Service management module 174 may include existing service analyzing module 174A and new service generation module 174B. Existing service analyzing module 174A and new service generation module 174B may work together or separately, and with or without obscured data analyzer module 173, to determine if a service exists that meets the needs determined based on the received obscured data. If such a service does not exist, then new service generation module 174B may generate a new service, either by requesting from a third party, requesting human intervention, e.g., human programming of a new service, or may generate a new service automatically.

In an embodiment, service provider 170 may include a service transmission module 175, which may transmit one or more services 186 back to the computing device 130C, e.g., to service receiving module 138B, which, in an embodiment, may be a portion of service provider interface module 138. In various embodiments, once one or more actions are taken with respect to receiving the one or more services 186, deobscuring data 187, which may be data that can deobscure the obscured data 185, may be transmitted to the service provider 170, e.g., to data deobscuring module 176 of service provider 170. In an embodiment, deobscuring data 187 is combined with obscured data 185 to result in deobscured data. In another embodiment, deobscuring data 187 does not need to be combined with obscured data 185 in order to result in the deobscured data. In an embodiment, deobscuring data 187 may be transmitted upon receipt of one or more services 186. In another embodiment, one or more actions related to one or more services 186, e.g., proposing the one or more services to one or more devices, may be carried out prior to transmitting the deobscuring data 187. In an embodiment, if a particular number of users do not use one or more services 186, then computing device 130C may not transfer deobscuring data 187.

Figure 1F:
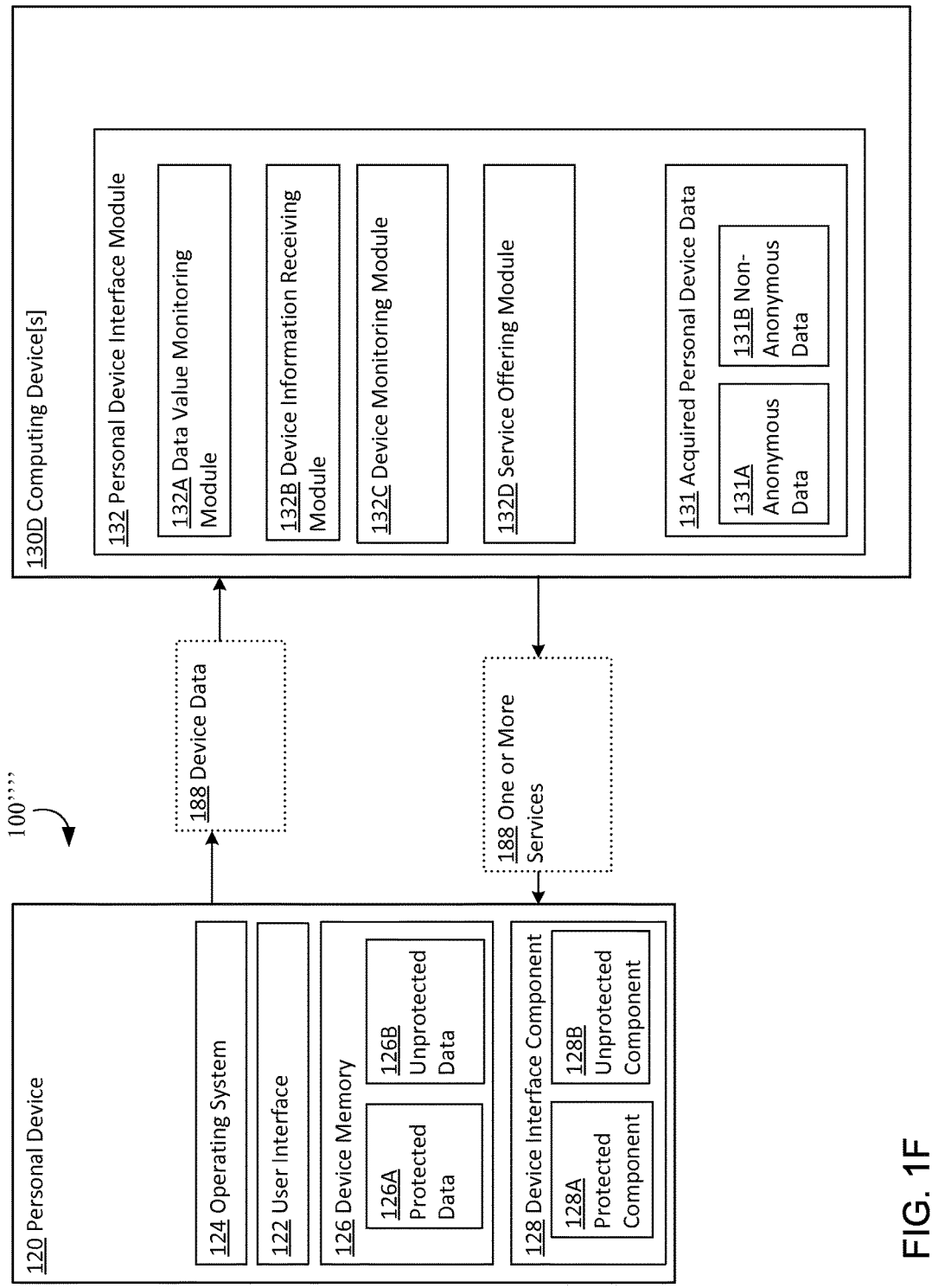
FIG. 1F shows a high-level block diagram of a personal device 120 and a computing device 130D operating in an exemplary embodiment 100'''', according to an embodiment.

Referring now to FIG. 1F, FIG. 1F shows an embodiment of the invention as shown in exemplary embodiment 100"". For example, FIG. 1F shows computing device 130D interacting with personal device 120. In an embodiment, computing device 130D receives device data 188 from personal device 120. Although FIG. 1F shows this transfer as coming directly from personal device 120, in an embodiment, computing device 130D may receive device data 188 from any source, including a third device, a communication network, a social networking site, a device manufacturer, and the like. In an embodiment, computing device 130D monitors one or more personal devices 120 for device data 188. In an embodiment, computing device 130D monitors one or more other sources for device data 188 regarding personal devices 120.

In an embodiment, device data 188 may include data that personal device 120 has collected. In an embodiment, the device data 188 may be modified to obscure an identity of the device 120 or a user of the device 120. In an embodiment, the device data 188 is not obscured. In an embodiment, device data 188 may be about data that is stored on device 120 or otherwise under the control of personal device 120, rather than being the actual data under the control of personal device 120. For example, as shown in FIG. 1F, personal device 120 may include protected data 126A, which, in an embodiment, may include the last thirty locations visited by personal device 120. In an embodiment, device data 188 may include the last thirty locations visited by personal device 120. In another embodiment, device data 188 may include an indication that personal device 120 has thirty device locations stored in its memory. In an embodiment, device data 188 may include an indication that personal device 120 has thirty device locations stored in its memory, and 20 of those locations are locations for which an interest has been expressed by an entity in communication with computing device 130D.

Referring again to FIG. 1F, in an embodiment, computing device 130D may include personal device interface module 132. Personal device interface module 132 may include data value monitoring module 132A. In an embodiment, data value monitoring module 132A may receive information regarding which types of data are valuable (e.g., location data, or location data indicating that a device is inside Times Square on New Years' Eve, and the like), and may monitor one or more devices and other locations for one or more indications that a personal device 120 has data estimated to be valuable, and whether that data is protected. In an embodiment, personal device interface module may include device information receiving module 132B configured to receive device data 188. Device data 188 may have any number of formats, as described above, and as shown by way of non-limiting example in the examples given further herein.

Referring again to FIG. 1F, in an embodiment, computing device 130D may include device monitoring module 132C. In an embodiment, device monitoring module 132C may monitor one or more personal devices 120 through any monitoring technique. In an embodiment, device monitoring module 132C may include software, hardware, or firmware associated with personal device 120, that may be configured to report back to device monitoring module 132C at particular intervals. In an embodiment, device monitoring module 132C may monitor personal device 120 through one or more communication networks 140 (not pictured), and may communicate directly with personal device 120. In an embodiment, device monitoring module 132C may monitor personal device 120 through indirect means, e.g., through other devices or systems that may be used by personal device 120.

Referring again to FIG. 1F, in an embodiment, personal device interface module 132 may include service offering module 132D. For example, as described previously, computing device 130D may acquire one or more services. These services may be presented to personal device 120, either for presentation to a user, or for an automated decision regarding whether to accept the services. In an embodiment, the one or more services 188 may require access to protected data, e.g., protected data 126A of the personal device 120, or one or more protected components, e.g., protected component 128A of personal device 120, or both. In an embodiment, computing device 130D may facilitate the presentation of the one or more services to a user 105 of the personal device 120, via the personal device 120.

Referring again to FIG. 1B, FIG. 1B shows a more detailed description of personal device 120. In an embodiment, personal device 120 may include a processor 110. Processor 110 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 110 may be a server. In some embodiments, processor 110 may be a distributed-core processor. Although processor 110 is as a single processor that is part of a single personal device 120, processor 110 may be multiple processors distributed over one or many devices 120, which may or may not be configured to operate together. Processor 110 is illustrated as being configured to execute computer readable instructions in order to execute one or more operations described above, and as illustrated in FIGS. 6, 7A-7C, 8A-8D, 9A-9C, and 10A-10D. In some embodiments, processor 110 is designed to be configured to operate as processing module 150, which may include one or more of data regarding agent that is configured to provide one or more services and to selectively access one or more particular device protected portions obtaining module 152, agent stoppage of the one or more services and agent continuing access to one or more particular device protected portions detection module 154, indicator of continued agent access to one or more particular device protected portions and stoppage of the one or more services presenting module 156, and presentation of an optional choice for discontinuation of agent access to the one or more particular device protected portions facilitation module 158.

Referring again to FIG. 1B, in an embodiment, personal device 120 may include a device memory 126. In some embodiments, memory 126 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 126 may be located at a single network site. In some embodiments, memory 126 may be located at multiple network sites, including sites that are distant from each other.

Referring again to FIG. 1B, in an embodiment, personal device 120 may include protected component 128A and unprotected component 128B, as also referenced in FIG. 1A. Referring again to FIG. 1B, protected component 128A may include one or more components, and each component may be hardware, software, firmware, data structure, class, API, data in any format, links, pointers, or references to other data or locations, interfaces, or any combination of the foregoing and the like. Similarly, unprotected component 128B may include one or more components. In an embodiment, interface component 128 also may include one or more optional components, including component monitoring module 128C, device monitoring module 128D, application monitoring module 128E, and/or security module 128F. These optional modules may be present or absent, depending on embodiments. Their presence is not required. For example, in an embodiment, a component monitoring module 128C may be present, and may track which entities are accessing various protected components 128A. In another embodiment, component monitoring module 128C may be omitted.

Referring again to FIG. 1B, in an embodiment, interface component 128 may include device monitoring module 128D. Device monitoring module 128D may monitor one or more conditions of the device, e.g., which applications are loaded in memory, which resources of the device are being used by which applications, or may track usage statistics, utilization statistics, and the like. Device monitoring module 128D may monitor the device at various levels of detail, e.g., at the whole-device level, at the application level, at the process level, at the resource level, or at the interface level, or any combination of those or similar levels of detail.

Referring again to FIG. 1B, in an embodiment, interface component 128 may include application monitoring module 128E. Application monitoring module 128E may be part of an application, part of an operating system, hard-coded or hard-wired into the device, or may be a separate application that runs in the foreground or in the background of the device. Application monitoring module 128E may monitor one application, a set of applications, or all applications on the device. Application monitoring module 128E may monitor various aspects of one or more applications, e.g., usage, utilization, resources used, and the like.

Referring again to FIG. 1B, in an embodiment, interface component 128 may include security module 128F. Security module 128F may monitor one or more access levels of various portions of the device, e.g., applications, components, interfaces, memory blocks, modules, and the like. In an embodiment, security module 128F may monitor security levels only and report. In another embodiment, security module 128F may perform other functions, such as modifying security levels or removing security access to one or more portions or from one or more portions.

Each of component monitoring module 128C, device monitoring module 128D, application monitoring module 128E, and security module 128F may be included individually or in any combination, or may be excluded entirely, in various embodiments.

Referring now to FIG. 2, FIG. 2 illustrates an exemplary implementation of the data regarding agent that is configured to provide one or more services and to selectively access one or more particular device protected portions obtaining module 152. As illustrated in FIG. 2, the data regarding agent that is configured to provide one or more services and to selectively access one or more particular device protected portions obtaining module 152 may include one or more sub-logic modules in various alternative implementations and embodiments. For example, as shown in FIG. 2, e.g., FIG. 2A, in some embodiments, module 152 may include one or more of data regarding presence of the Agent that is configured to provide one or more services and to selectively access one or more particular device protected portions obtaining module 202, data regarding installation status of Agent that is configured to provide one or more services and to selectively access one or more particular device protected portions obtaining module 204, data regarding user activation of Agent that is configured to provide one or more services and to selectively access one or more particular device protected portions obtaining module 206, data regarding agent that is configured to provide one or more services requiring access to one or more particular device protected portions and to selectively access the one or more particular device protected portions obtaining module 208 (e.g., which, in some embodiments, may include data regarding bicycle efficiency monitoring agent that is configured to provide one or more cycling efficiency displaying services requiring access to one or more particular device protected portions and to selectively access the one or more particular device protected portions obtaining module 210), data regarding Agent that is configured to provide one or more services and to selectively access one or more particular device protected portions receiving from the particular device module 212, and data regarding Agent that is configured to provide one or more services and to selectively access one or more particular device protected portions obtaining by scanning the particular device module 214.

Referring again to FIG. 2, e.g., FIG. 2B, in some embodiments, module 152 may include one or more of data regarding Agent that is configured to provide one or more services and to selectively access one or more particular device protected portions obtaining from operating system module 216, data regarding Agent that is configured to provide one or more services and to selectively access one or more particular device protected portions monitoring via one or more transmissions to and/or from the one or more particular device protected portions module 218, data from one or more particular device logs regarding Agent that is configured to provide one or more services and to selectively access one or more particular device protected portions obtaining module 220, and detectable indicator that the agent has carried one or more services and continues access to one or more particular device protected portions detecting module 222.

Referring again to FIG. 2, e.g., FIG. 2C, as described above, in some embodiments, module 152 may include detectable indicator that the agent has terminated activity directed to carrying one or more services and continues access to one or more particular device protected portions after terminated activity detecting module 224. In some embodiments, module 224 may include one or more of detectable indicator that the agent has terminated activity directed to carrying one or more services and continues access to one or more particular device protected portions after terminated activity detecting by analyzing at least a portion of the particular device module 226, detectable indicator that the agent has terminated activity directed to carrying one or more services and continues access to one or more particular device protected portions after terminated activity detecting at least partially using a report issued by the particular device module 228, detectable indicator that the agent has terminated activity directed to carrying one or more services and continues access to one or more particular device protected portions after terminated activity detecting by analyzing data flow of the one or more particular device protected portions module 230, and detectable indicator that the agent has terminated activity directed to carrying one or more services and continues access to one or more particular device protected portions after terminated activity detecting at least partially using a report issued by a monitoring agent for the one or more particular device protected portions module 232. In some embodiments, module 232 may include detectable indicator that the agent has terminated activity directed to carrying one or more services and continues access to one or more particular device protected portions after terminated activity detecting at least partially using a report issued by a kernel-based monitoring agent for the one or more particular device protected portions module 234.

Figure 3:
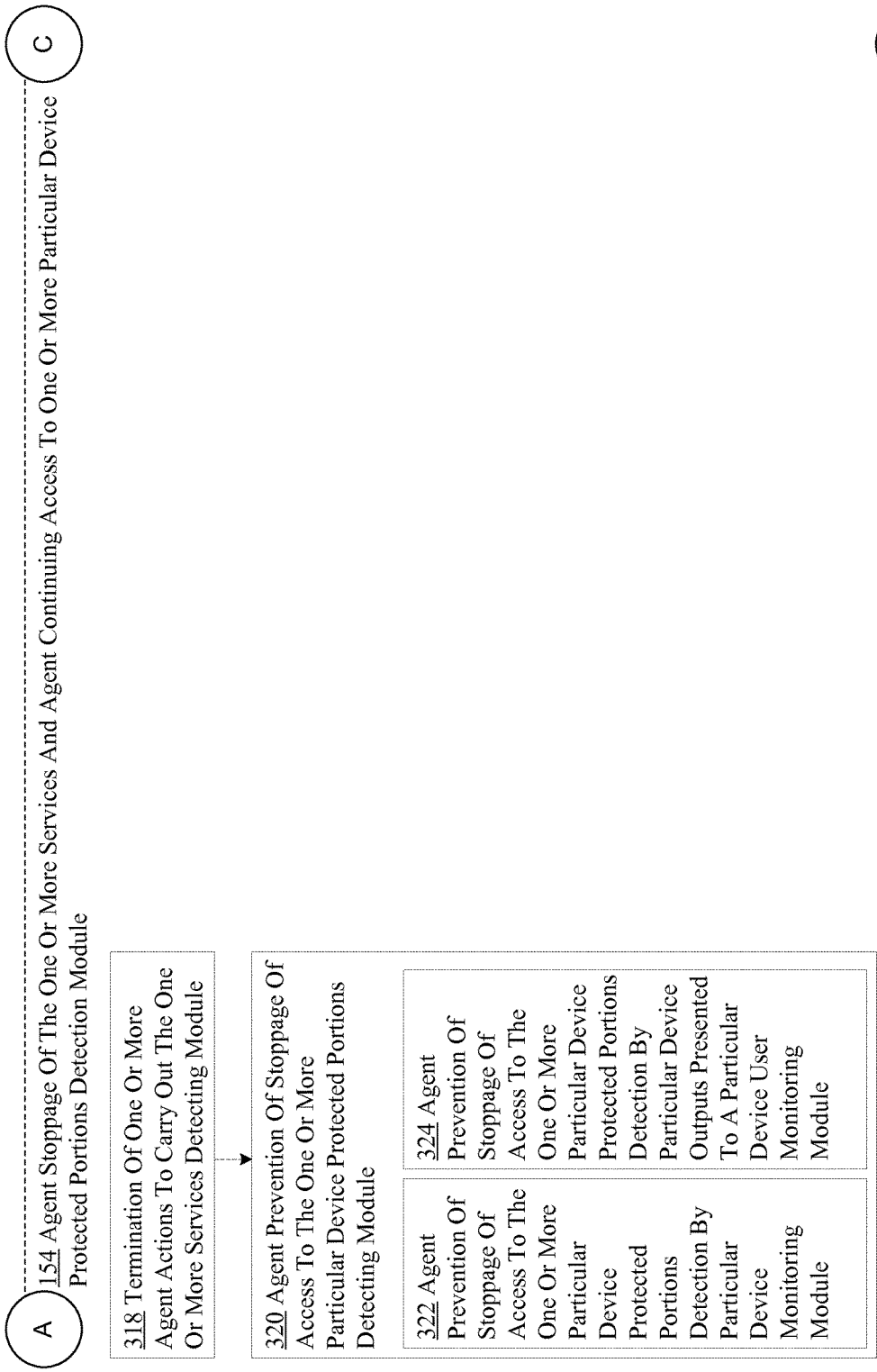
FIG. 3, including

Referring now to FIG. 3, FIG. 3 illustrates an exemplary implementation of agent stoppage of the one or more services and agent continuing access to one or more particular device protected portions detection module 154. As illustrated in FIG. 3, the agent stoppage of the one or more services and agent continuing access to one or more particular device protected portions detection module 154 may include one or more sub-logic modules in various alternative implementations and embodiments. For example, as shown in FIG. 3 (e.g., FIG. 3A), in some embodiments, module 154 may include one or more of notification of stoppage of the one or more services receiving module 302 and notification of agent continuing access to the one or more particular device protected portions receiving module 304. In some embodiments, module 302 may include one or more of notification of stoppage of the one or more services receiving from agent module 306 and notification of stoppage of the one or more services receiving from particular device operating system module 308. In some embodiments, module 304 may include one or more of notification of agent continuing access to the one or more particular device protected portions receiving from the one or more particular device protected portions module 310, notification of agent continuing access to the one or more particular device protected portions receiving from a protected device component module 312, and notification of agent continuing access to the one or more particular device protected portions receiving from a notification agent module 316. In some embodiments, module 312 may include notification of agent continuing access to the one or more particular device protected portions receiving from a protected device component that is a part of the one or more particular device protected portions module 314.

Referring again to FIG. 3, e.g., FIG. 3B, in some embodiments, module 154 may include one or more of termination of one or more agent actions to carry out the one or more services detecting module 318 and agent prevention of stoppage of access to the one or more particular device protected portions detecting module 320. In some embodiments, module 320 may include one or more of agent prevention of stoppage of access to the one or more particular device protected portions detection by particular device monitoring module 3222 and agent prevention of stoppage of access to the one or more particular device protected portions detection by particular device outputs presented to a particular device user monitoring module 324.

Referring again to FIG. 3, e.g., FIG. 3C, in some embodiments, module 154 may include one or more of indicator of agent stoppage of the one or more services obtaining module 326 and indicator of agent continuing access to one or more particular device protected portions obtaining module 328. In some embodiments, module 328 may include one or more of indicator of agent continuing access to one or more particular device protected portions obtaining by particular device state monitoring module 330, indicator of agent continuing access to one or more particular device protected portions obtaining by monitoring agent access level data module 332, indicator of agent continuing access to one or more particular device protected portions obtaining by monitoring particular device access data module 334, indicator of agent continuing access to one or more particular device protected portions obtaining by monitoring attempts to access the one or more particular device protected portions module 336, and indicator of agent continuing access to one or more particular device protected portions obtaining by carrying out agent analysis module 338.

Figure 3D:
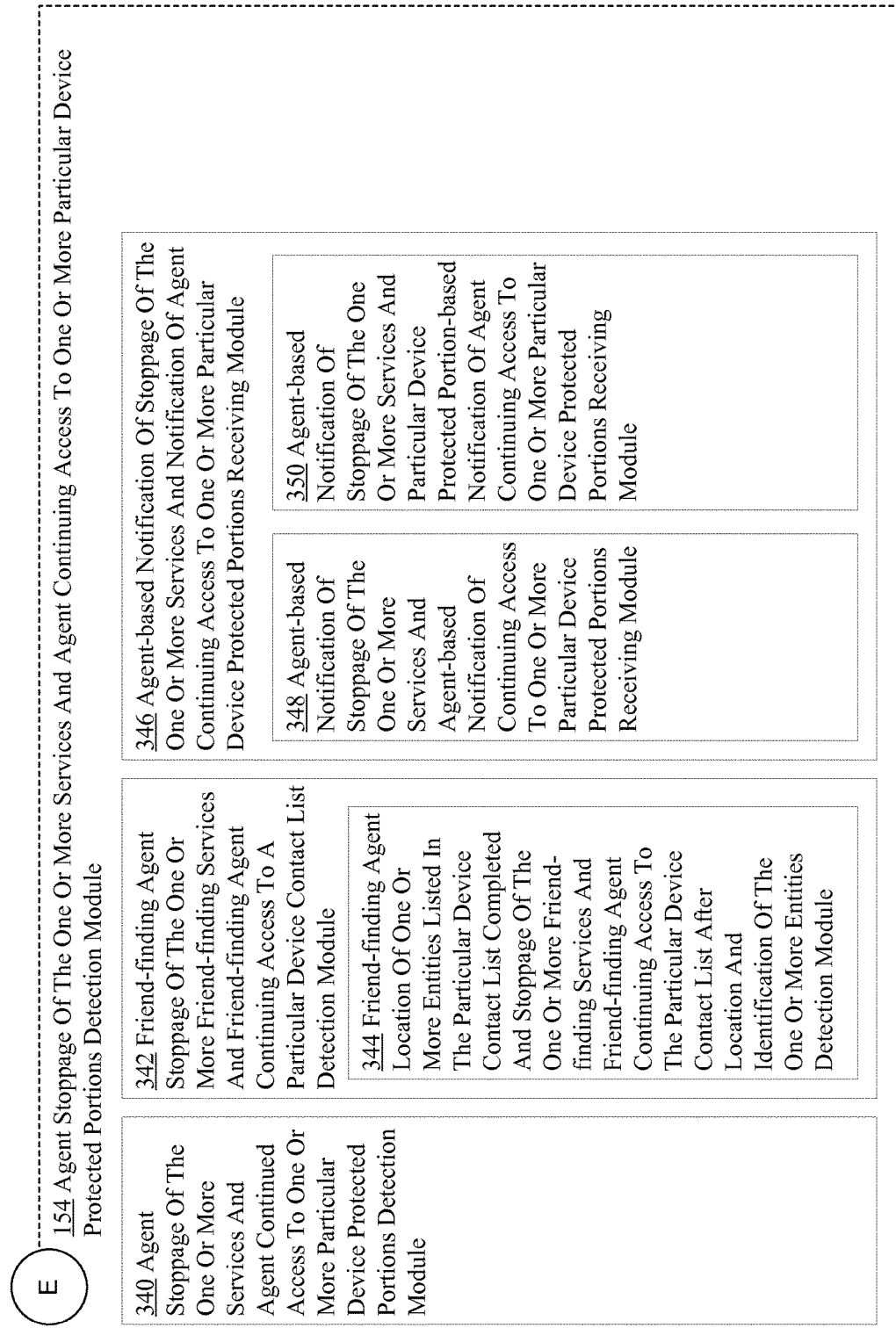

Referring again to FIG. 3, e.g., FIG. 3D, in some embodiments, module 154 may include one or more of agent stoppage of the one or more services and agent continued access to one or more particular device protected portions detection module 340, friend-finding agent stoppage of the one or more friend-finding services and friend-finding agent continuing access to a particular device contact list detection module 342, and agent-based notification of stoppage of the one or more services and notification of agent continuing access to one or more particular device protected portions receiving module 346. In some embodiments, module 342 may include friend-finding agent location of one or more entities listed in the particular device contact list completed and stoppage of the one or more friend-finding services and friend-finding agent continuing access to the particular device contact list after location and identification of the one or more entities detection module 344. In some embodiments, module 346 may include one or more of agent-based notification of stoppage of the one or more services and agent-based notification of continuing access to one or more particular device protected portions receiving module 348 and agent-based notification of stoppage of the one or more services and particular device protected portion-based notification of agent continuing access to one or more particular device protected portions receiving module 350.

Referring now to FIG. 4, FIG. 4 illustrates an exemplary implementation of indicator of continued agent access to one or more particular device protected portions and stoppage of the one or more services presenting module 156. As illustrated in FIG. 4, the indicator of continued agent access to one or more particular device protected portions and stoppage of the one or more services presenting module 156 may include one or more sub-logic modules in various alternative implementations and embodiments. For example, as shown in FIG. 4, e.g., FIG. 4A, in some embodiments, module 156 may include one or more of visual representation of continued agent access to one or more particular device protected portions and stoppage of the one or more services presenting on a particular device output component module 402, indicator of continued agent access to one or more particular device protected portions and stoppage of the one or more services presenting, to an entity related to the particular device, module 408, notification of continued agent access to one or more particular device protected portions and stoppage of the one or more services presenting module 410, and visual notification of continued agent access to one or more particular device protected portions and stoppage of the one or more services displaying via the particular device module 412. In some embodiments, module 402 may include visual representation of continued agent access to a tablet device positioning sensor and stoppage of the one or more services presenting on a particular device output component module 404. In some embodiments, module 404 may include visual representation of continued agent access to a tablet device positioning sensor and stoppage of a child's road trip assistance service presenting on a particular device output component module 406. In some embodiments, module 412 may include notification icon of continued agent access to one or more particular device protected portions and stoppage of the one or more services displaying via a particular device screen module 414.

Referring again to FIG. 4, e.g., FIG. 4B, in some embodiments, module 156 may include one or more of list of one or more agents that have continued agent access to one or more particular device protected portions and one or more indicators of one or more of the one or more agents that have stopped the one or more services presenting module 416, report describing continued agent access to one or more particular device protected portions and the report indicating whether the one or more services have been stopped obtaining module 418, instructing the particular device to present the indicator of continued agent access to one or more particular device protected portions and stoppage of the one or more services module 420, and altering an agent presentation to indicate continued agent access to one or more particular device protected portions and stoppage of the one or more services module 422. In some embodiments, module 422 may include one or more of changing a color of a visual representation of the agent to indicate continued agent access to one or more particular device protected portions and stoppage of the one or more services module 424 and altering one or more steps to be carried out for a user to select an agent to indicate continued agent access to one or more particular device protected portions and stoppage of the one or more services module 426. In some embodiments, module 426 may include adding one or more steps required to be carried out by the user to select an agent to indicate continued agent access to one or more particular device protected portions and stoppage of the one or more services module 428.

Referring again to FIG. 4, e.g., FIG. 4C, in some embodiments, module 156 may include relative location within an operating system of an agent presentation altering to indicate continued agent access to one or more particular device protected portions and stoppage of the one or more services module 430.

Referring now to FIG. 5, FIG. 5 illustrates an exemplary implementation of agent stoppage of the one or more services and agent continuing access to one or more particular device protected portions detection module 158. As illustrated in FIG. 5, the agent stoppage of the one or more services and agent continuing access to one or more particular device protected portions detection module 158 may include one or more sub-logic modules in various alternative implementations and embodiments. For example, as shown in FIG. 5, e.g., FIG. 5A, in some embodiments, module 158 may include one or more of presentation of an optional choice for discontinuation of agent access to the one or more particular device protected portions device instruction module 502 and optional choice for discontinuation of agent access to the one or more particular device protected portions presenting module 508. In some embodiments, module 502 may include presentation of an optional choice for instructing a module of the particular device to discontinue agent access to the one or more particular device protected portions device instruction module 504. In some embodiments, module 504 may include presentation of an optional user-selectable choice for instructing a module of the particular device to discontinue agent access to the one or more particular device protected portions device instruction module 506. In some embodiments, module 508 may include optional choice for discontinuation of agent access to the one or more particular device protected portions presenting to a protected portion access control portion of the particular device module 510.

Referring again to FIG. 5, e.g., FIG. 5B, in some embodiments, module 158 may include one or more of presentation of an optional choice for a user setting that instructs the device to discontinue agent access to the one or more particular device protected portions facilitating module 512 and presentation, to an entity related to the particular device, of an optional choice for discontinuation of agent access to the one or more particular device protected portions facilitation module 518. In some embodiments, module 512 may include one or more of presentation, prior to agent operation, of an optional choice for a user setting that instructs the device to discontinue agent access to the one or more particular device protected portions facilitating module 514 and presentation, prior to agent acquisition, of an optional choice for a user setting that instructs the device to discontinue agent access to the one or more particular device protected portions facilitating module 516.

Referring again to FIG. 5, e.g., FIG. 5C, in some embodiments, module 158 may include one or more of selectable choice for discontinuation of agent access to the one or more particular device protected portions displaying module 520, agent access to the one or more particular device protected portions terminating module 522, presentation of an optional choice for discontinuation of agent access to the one or more particular device protected portions by disabling the agent facilitation module 530, and presentation of an optional choice for discontinuation of agent access to the one or more particular device protected portions by removing the agent facilitation module 532. In some embodiments, module 520 may include selectable choice for discontinuation of access of multiple agents, including the agent, to the one or more particular device protected portions displaying module 524. In some embodiments, module 522 may include one or more of class of one or more agents, including the agent, access to the one or more particular device protected portions terminating module 526 and each of one or more agents access to the one or more particular device protected portions terminating module 528.

Referring again to FIG. 5, e.g., FIG. 5D, in some embodiments, module 158 may include one or more of presentation of an optional choice for establishing limitations for agent access to the one or more particular device protected portions facilitation module 534 and presentation of an optional choice for requiring an anonymization of data used for continued agent access to the one or more particular device protected portions facilitation module 546. In some embodiments, module 534 may include one or more of presentation of an optional choice for requiring explicit grant of access for reestablishment of agent access to the one or more particular device protected portions facilitation module 536, presentation of an optional choice for setting a limit on a number of times the agent is permitted to reestablish access to the one or more particular device protected portions facilitation module 538, and presentation of an optional choice for establishing prerequisite conditions for allowing reestablishment of agent access to the one or more particular device protected portions facilitation module 542. In some embodiments, module 538 may include presentation of an optional choice for setting a limit on a number of times during a particular time period that the agent is permitted to reestablish access to the one or more particular device protected portions facilitation module 540. In some embodiments, module 542 may include presentation of an optional choice for establishing a particular location as a prerequisite condition for allowing reestablishment of agent access to the one or more particular device protected portions facilitation module 544.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Further, in FIG. 6 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 6-10 as well as the other operations to be described herein may be performed by at least one of a machine, an article of manufacture, or a composition of matter.

The following examples are provided merely as illustrations of how various embodiments may be implemented. None of the following examples are intended to be limiting, and all of the examples listed herein may be combined with portions of other examples listed herein, to the extent such combinations are not logically inconsistent. Because of space limitations, each example is not written out each time it is possible to implement that example. Therefore, unless explicitly otherwise stated, each example should be understood to encompass every other example listed both before and after the instant example, and can be combined with any or all portions of other examples. Each example is not intended to be limited to a single claim or set of claims, but is rather exemplary of how one or more embodiments may be carried out. Nothing in the following should be interpreted as limiting any claim or enumerating an exhaustive list of how one or more claimed embodiments can be carried out.

Referring now to FIG. 6, FIG. 6 shows operation 600, which may include operation 602 depicting acquiring data regarding an application configured to access one or more protected portions of a particular device, said application configured to provide one or more services. For example, FIG. 1, e.g., FIG. 1B, shows data regarding agent that is configured to provide one or more services and to selectively access one or more particular device protected portions obtaining module 152 acquiring (obtaining, receiving, calculating, selecting from a list or other data structure, receiving, retrieving, or receiving information regarding, performing calculations to find out, retrieving data that indicates, receiving notification, receiving information that leads to an inference, whether by human or automated process, or being party to any action or transaction that results in informing, inferring, or deducting, including but not limited to circumstances without absolute certainty, including more-likely-than-not and/or other thresholds) data regarding (e.g., a name of an application, a type of application, any characteristic or attribute of an application, whether defined by the application, the device, or a third party, whether universal or local, and the like) an application (e.g., a collection of one or more of hardware, software, firmware, APIs, networked resources, libraries, and the like) configured to access (e.g., one or more of sending and receiving commands to, receiving data from, viewing data flowing to and from, and the like) one or more protected portions (e.g., any structure, whether virtual, physical, relative, absolute, dynamically or statically defined, programmable, changeable, and the like, for which there is a requirement imposed on at least one entity in order to access the portion, regardless of whether the requirement is onerous or taxing, and regardless of whether the requirement is consistently applied, always applied, or applied in a particular pattern) of a particular device (e.g., a cellular phone, smart phone, IP phone, VOIP phone, handset, microphone, camera (e.g., video camera, still camera, digital camera, and the like), headphone, earpiece, screen, monitor, television, game system, receiver (e.g., an audio/visual receiver), media player (e.g., DVD player, Blu-ray player, CD player, MP3 player, cassette tape player), tablet device, netbook computer, notebook computer, router, wireless router, bridge, network equipment, server, desktop computer, personal computer, personal computer component (e.g., RAM, hard drive, video card, and the like), personal navigation system, vehicle navigation system, motor vehicle, motor vehicle stereo, motor vehicle control system, motor vehicle communication system (e.g., OnStar), appliance, security system (e.g., a home security system), electronic safety device (e.g., an electronic safe, a door security system, a door locking system), stereo system, speaker, remote control (e.g., a universal remote control, or a device remote control), radio, two-way radio, walkie-talkie, ham radio, a metal detector, a radar detector, a weather station, a robot (e.g., a Roomba), a vacuum cleaner, wearable items, personal items, augmented reality items, "smart" clothing, glasses with augmented reality, and the like) said application configured to provide (e.g., take one or more steps that assist in at least a portion of the carrying out of) one or more services (e.g., any task, or any portion of any task, or any combination of tasks, that can be carried out by a device, or by a device in communication with another device, which may include human interaction, or may not include human interaction, and which may require one or more resources, either locally to the device, or remotely from the device, and which may include one or more of hardware, software, firmware, data stored in or manipulated by any component, module, part, or portion of the device, including, but not limited to, hardware, software, applications, Application Programming Interfaces ("APIs"), one or more virtual machines, one or more Dynamically Loaded Libraries ("DLLs"), one or more relational databases, one or more GUI frameworks, one or more COM structured storages, or any portion of any other device that is under control of a device, e.g., a cloud resource, and the like).

Referring again to FIG. 6, operation 600 may include operation 604 depicting detecting that the application has completed at least one of the one or more services and that the application maintains access to the one or more protected portions of the particular device. For example, FIG. 1, e.g., FIG. 1B, shows agent stoppage of the one or more services and agent continuing access to one or more particular device protected portions detection module 154 detecting that the application (e.g., a collection of one or more of hardware, software, firmware, APIs, networked resources, libraries, and the like) has completed (e.g., the application has reached a point at which an observer would conclude that at least one task has been carried to completion, with assistance from the application, either in whole or in part) at least one of the one or more services and that the application maintains (e.g., the application's access level does not change upon the aforementioned completion) access to the one or more protected portions (e.g., any structure, whether virtual, physical, relative, absolute, dynamically or statically defined, programmable, changeable, and the like, for which there is a requirement imposed on at least one entity in order to access the portion, regardless of whether the requirement is onerous or taxing, and regardless of whether the requirement is consistently applied, always applied, or applied in a particular pattern) of the particular device.

Referring again to FIG. 6, operation 600 may include operation 606 depicting presenting information indicating that the one or more services are completed and that the application maintains access to the one or more protected portions of the particular device. For example. FIG. 1, e.g., FIG. 1B, shows indicator of continued agent access to one or more particular device protected portions and stoppage of the one or more services presenting module 156 presenting (e.g., displaying, or facilitating the displaying of, in any media, not necessarily visual, that engages one or more senses of a user, or, interfaces with a nonhuman entity) information indicating that the one or more services are completed and that the application maintains access to the one or more protected portions of the particular device.

Referring again to FIG. 6, operation 600 may include operation 608 depicting facilitating presentation of an option to discontinue the access of the application to the one or more protected portions of the particular device. For example. FIG. 1, e.g., FIG. 1B, shows presentation of an optional choice for discontinuation of agent access to the one or more particular device protected portions facilitation module 158 facilitating (e.g., performing one or more actions that assist in the execution or completion of) presentation (e.g., show, through any combination of visual and non-visual interfaces) of an option (e.g., a nonrequired selectable interface) to discontinue (e.g., stop, or being the process of stopping, or attempting to stop, regardless of the success, regardless of whether said stop is temporary or permanent) the access of the application to the one or more protected portions of the particular device.

Figure 7A:
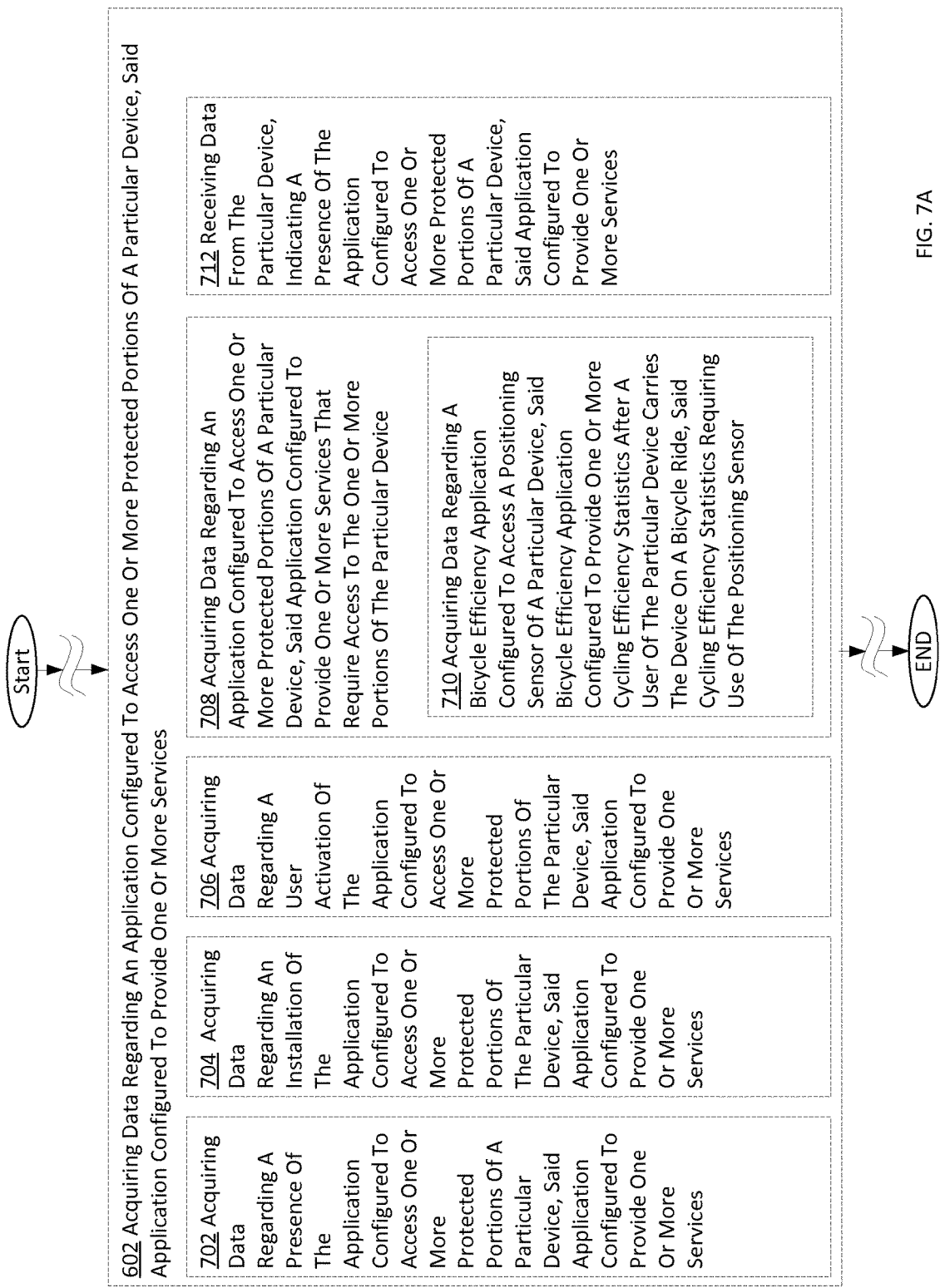
FIG. 7A is a high-level logic flow chart of a process depicting alternate implementations of an acquiring data operation 602, according to one or more embodiments.
Figure 7B:
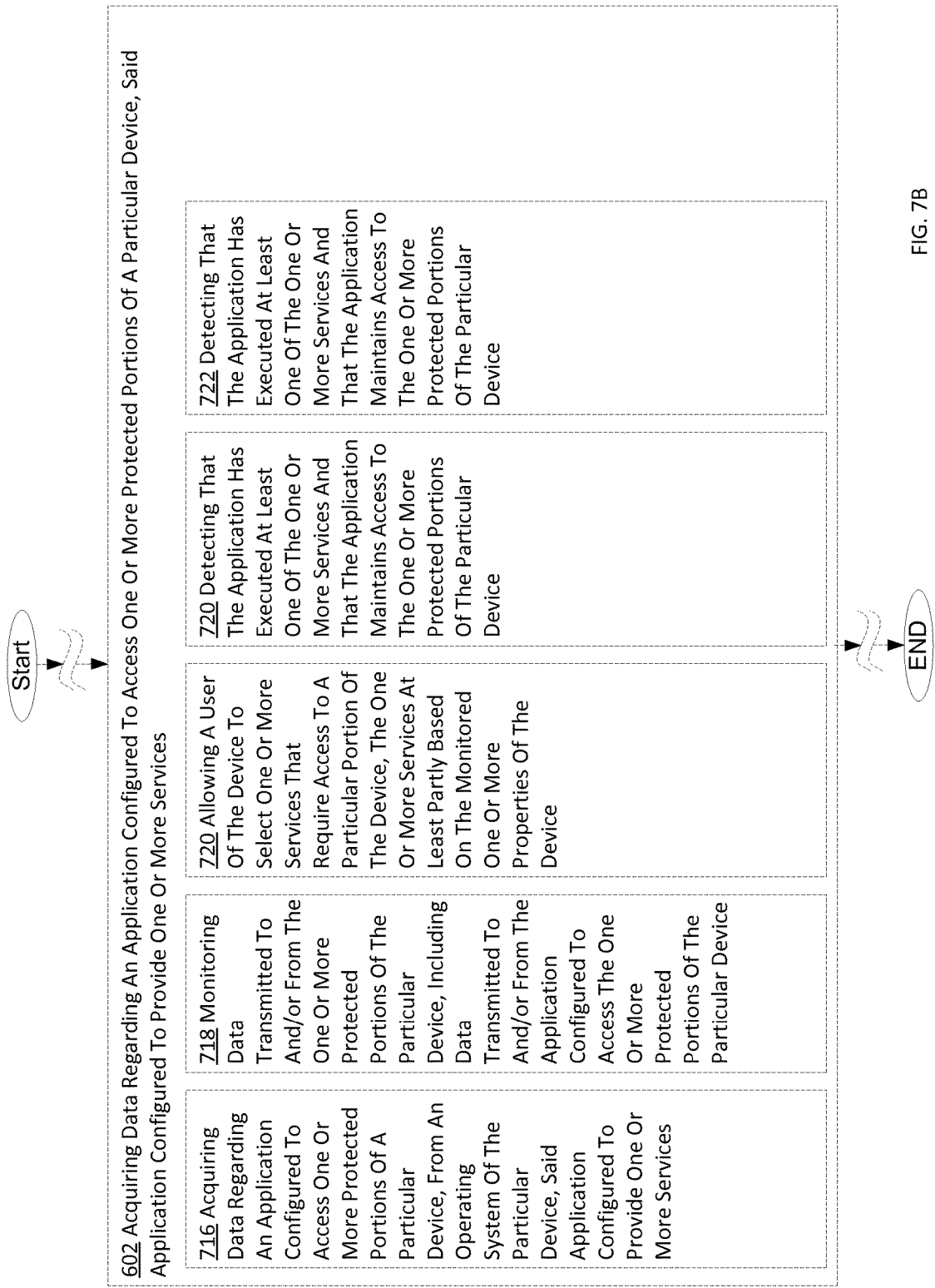
FIG. 7B is a high-level logic flow chart of a process depicting alternate implementations of an acquiring data operation 602, according to one or more embodiments.
Figure 7C:
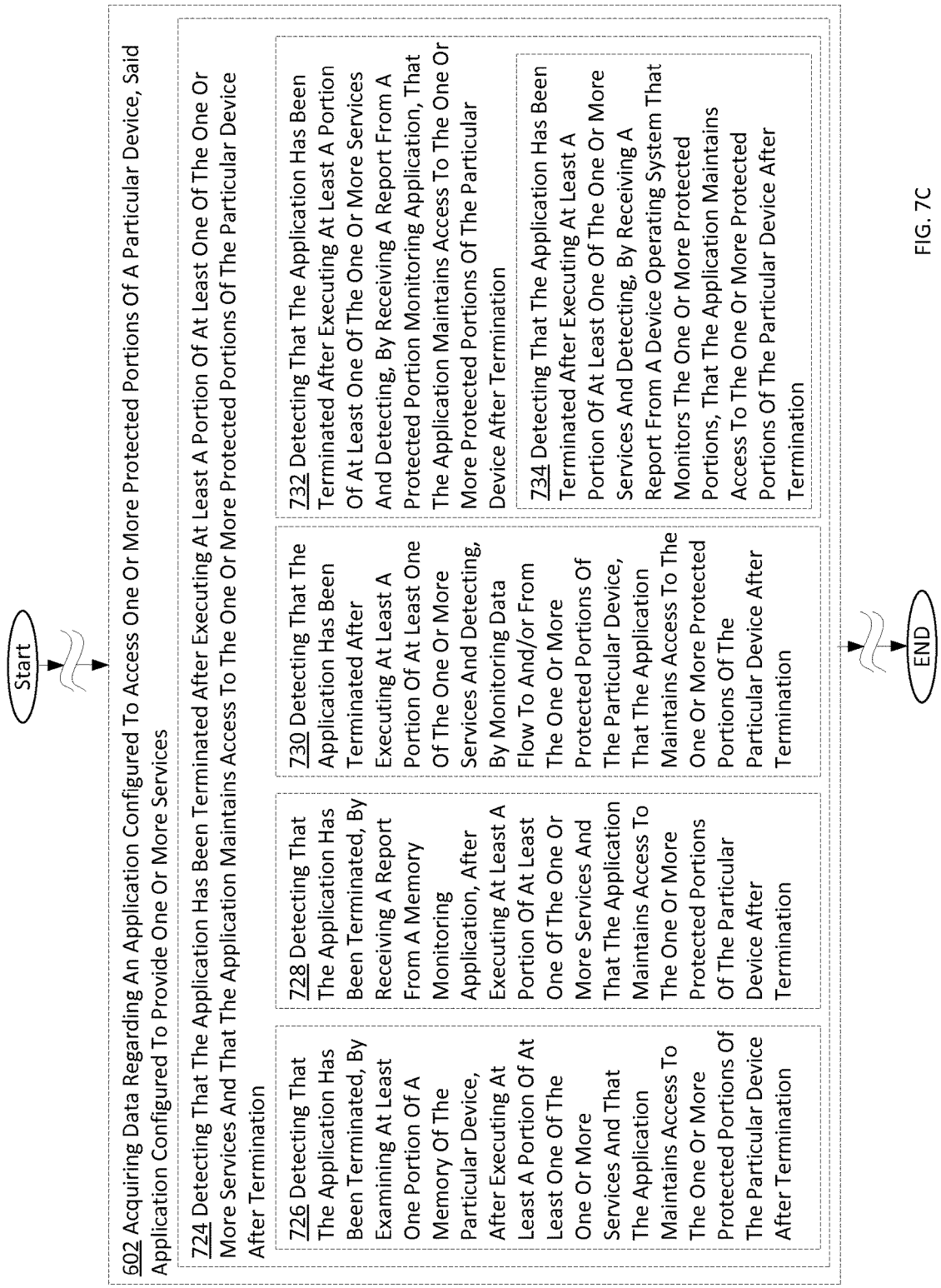
FIG. 7C is a high-level logic flow chart of a process depicting alternate implementations of an acquiring data operation 602, according to one or more embodiments.

FIGS. 7A-7C depict various implementations of operation 602, depicting acquiring data regarding an application configured to access one or more protected portions of a particular device, said application configured to provide one or more services according to embodiments. Referring now to FIG. 7A, operation 602 may include operation 702 depicting acquiring data regarding a presence of the application configured to access one or more protected portions of a particular device, said application configured to provide one or more services. For example, FIG. 2, e.g., FIG. 2A, shows data regarding presence of an agent that is configured to provide one or more services and to selectively access one or more particular device protected portions obtaining module 202 acquiring data regarding a presence of the application (e.g., a report from the device operating system) configured to access one or more protected portions (e.g., picture data) of a particular device (e.g., a network-enabled digital camera), said application configured to provide one or more services (e.g., a picture tagging service).

Referring again to FIG. 7A, operation 602 may include operation 704 depicting acquiring data regarding an installation of the application configured to access one or more protected portions of the particular device, said application configured to provide one or more services. For example, FIG. 2, e.g., FIG. 2A, shows data regarding installation status of agent that is configured to provide one or more services and to selectively access one or more particular device protected portions obtaining module 204 acquiring data regarding an installation (e.g., a storage of the application on a memory of the device, whether remote or local, or a building of an interface between the device operating system and the application, e.g., providing a mechanism for which a user can activate the application, e.g., when a user selects a downloadable application from an application store) configured to access one or more protected portions (e.g., a blood sugar monitor) of the particular device (e.g., a smart watch worn by a user), said application configured to provide one or more services (e.g., monitoring blood glucose levels).

Referring again to FIG. 7A, operation 602 may include operation 706 depicting acquiring data regarding a user activation of the application configured to access one or more protected portions of the particular device, said application configured to provide one or more services. For example, FIG. 2, e.g., FIG. 2A, shows data regarding user activation of agent that is configured to provide one or more services and to selectively access one or more particular device protected portions obtaining module 206 acquiring data regarding a user activation (e.g., a user executing, e.g., a user giving an instruction to an operating system of a device, e.g., a smart television, to run the program, e.g., an internet usage monitoring service) of the application (an internet usage application) configured to access one or more protected portions (e.g., the network communication component) of the particular device (e.g., the smart television), said application configured to provide one or more services (e.g., a service that monitors content that is viewed online).

Referring again to FIG. 7A, operation 602 may include operation 708 depicting acquiring data regarding an application configured to access one or more protected portions of a particular device, said application configured to provide one or more services that require access to the one or more protected portions of the particular device. For example, FIG. 2, e.g., FIG. 2A, shows data regarding agent that is configured to provide one or more services requiring access to one or more particular device protected portions and to selectively access the one or more particular device protected portions obtaining module 208 acquiring data regarding an application (e.g., a picture uploading application) configured to access one or more protected portions (e.g., a picture depository stored in cloud network storage) of a particular device (e.g., a smartphone, and the picture depository is a part of the particular device because the particular device has control over it, e.g., the ability to perform one or more of viewing, modifying, altering, adding to, subtracting from, and deleting one or more files that are part of the depository), said application configured to provide one or more services (e.g., a picture uploading service) that require access to the one or more protected portions of the particular device.

Referring again to FIG. 7A, operation 708 may include operation 710 depicting acquiring data regarding a bicycle efficiency application configured to access a positioning sensor of a particular device, said bicycle efficiency application configured to provide one or more cycling efficiency statistics after a user of the particular device carries the device on a bicycle ride, said cycling efficiency statistics requiring use of the positioning sensor. For example, FIG. 2, e.g., FIG. 2A, shows data regarding bicycle efficiency monitoring agent that is configured to provide one or more cycling efficiency displaying services requiring access to one or more particular device protected portions and to selectively access the one or more particular device protected portions obtaining module 210 acquiring data (e.g., acquiring a location in memory at which the application is loaded) regarding a bicycle efficiency application configured to access a positioning sensor of a particular device (e.g., a monitoring device that gets strapped to the handlebars of a bicycle), said bicycle efficiency application configured to provide one or more cycling efficiency statistics (e.g., elevation change per hour) after a use of the particular device carries the device (e.g., rides a bicycle to which the device is attached) on a bicycle ride, said cycling efficiency statistics requiring use of the positioning sensor (e.g., the device may be able to use three-dimensional triangulation, and it is noted that there may be other ways of measuring elevation changes, e.g., through an altimeter, but the device may not have an altimeter, or may choose to use three-dimensional position triangulation).

Referring again to FIG. 7A, operation 602 may include operation 712 depicting receiving data from the particular device, indicating a presence of the application configured to access one or more protected portions of the particular device, said application configured to provide one or more services. For example, FIG. 2, e.g., FIG. 2A, shows data regarding agent that is configured to provide one or more services and to selectively access one or more particular device protected portions receiving from the particular device module 212 receiving data (e.g., an indicator generated by the device operating system that the application is consuming one or more device resources, e.g., processor power, fixed or random access memory, network resources, or use of one or more sensors and/or input/output interfaces) from the particular device (e.g., a cellular smartphone), indicating a presence of the application (e.g., an existence of the application, or a link or other relative indicator of the application) configured to access one or more protected portions of a particular device (e.g., a list of numbers called by the device's telephone function in the last seven days), said application configured to provide one or more services (e.g., a usage graph generator service).

Referring again to FIG. 7A, operation 602 may include operation 714 depicting scanning the particular device to determine an identity of an application configured to access one or more protected portions of the particular device, said application configured to provide one or more services. For example, FIG. 2, e.g., FIG. 2B, shows data regarding Agent that is configured to provide one or more services and to selectively access one or more particular device protected portions obtaining by scanning the particular device module 214 scanning (e.g., performing any type of analysis on one or more portions of the device, including memory, whether fixed or removable, and other scans, e.g., of circuitry, sensors, input/output interfaces, and the like, and also including scans of data collected about the device, e.g., registry files, or remote log files) the particular device to determine an identity (e.g., a name of, or information about, or an internal designator, e.g., a process identification number) of an application (e.g., a picture enhancement service) configured to access one or more protected portions (e.g., a particular directory of pictures designated by the user as "private") of a particular device (e.g., a Wi-Fi enabled video camera), said application configured to provide one or more services (e.g., picture color enhancement).

Referring now to FIG. 7B, operation 602 may include operation 716 depicting acquiring data regarding an application configured to access one or more protected portions of the particular device, from an operating system of the particular device, said application configured to provide one or more services. For example, FIG. 2, e.g., FIG. 2B, shows data regarding Agent that is configured to provide one or more services and to selectively access one or more particular device protected portions obtaining from operating system module 216 acquiring data regarding an application (e.g., an ATM finding application) configured to access one or more protected portions of a particular device (e.g., a tablet device, e.g., an iPad), from an operating system (e.g., iOS) of the particular device (e.g., the tablet, e.g., the iPad), said application configured to provide one or more services (e.g., find the nearest ATM to the user's current location).

Referring again to FIG. 7B, operation 602 may include operation 718 depicting monitoring data transmitted to and/or from the one or more protected portions of the particular device, including data transmitted to and/or from the application configured to access the one or more protected portions of the particular device. For example, FIG. 2, e.g., FIG. 2B, shows data regarding Agent that is configured to provide one or more services and to selectively access one or more particular device protected portions monitoring via one or more transmissions to and/or from the one or more particular device protected portions module 218 monitoring (e.g., receiving all or a portion of, e.g., one data packet out of every ten, for example) data transmitted to and/or from the one or more protected portions (e.g., the GPS positioning tracker) of the particular device (e.g., a vehicle-mounted navigation system), including data transmitted to and/or from the application (e.g., a gas station gasoline price comparing application) configured to access the one or more protected portions of the particular device (e.g., the vehicle-mounted navigation system).

Referring again to FIG. 7B, operation 602 may include operation 720 depicting receiving one or more usage logs of the particular device that include usage information regarding one or more applications configured to access the one or more protected portions of the particular device. For example, FIG. 2, e.g., FIG. 2B, shows data from one or more particular device logs regarding Agent that is configured to provide one or more services and to selectively access one or more particular device protected portions obtaining module 220 receiving one or more usage logs (e.g., a log of each time that a friend-finder application accessed a device contact list) of the particular device (e.g., a user's smartphone) that include usage information regarding one or more applications (e.g., logs of how often a friend finder application, as well as zero or more other applications that may be associated with the device, was used, and/or how often the friend finder application accessed various parts of the user's smartphone, e.g., the contact list stored on the smartphone or accessible to the smartphone) configured to access the one or more protected portions (e.g., the user's contact list) of the particular device (e.g., the user's smartphone).

Referring again to FIG. 7B, operation 602 may include operation 722 depicting detecting that the application has executed at least one of the one or more services and that the application maintains access to the one or more protected portions of the particular device. For example, FIG. 2, e.g., FIG. 2B, shows detectable indicator that the agent has carried one or more services and continues access to one or more particular device protected portions detecting module 222 detecting that the application (e.g., a voice synthesizing application) has executed at least one of the one or more services (e.g., disguising a user's voice while communicating with a telephone device) and that the application maintains access to the one or more protected portions (e.g., the microphone of the device) of the particular device (e.g., a VoIP-enabled telephone system).

Referring now to FIG. 7C, operation 602 may include operation 724 depicting detecting that the application has been terminated after executing at least a portion of at least one of the one or more services and that the application maintains access to the one or more protected portions of the particular device after termination. For example, FIG. 2, e.g., FIG. 2B, shows detectable indicator that the agent has terminated activity directed to carrying one or more services and continues access to one or more particular device protected portions after terminated activity detecting module 224 detecting that the application (e.g., an internet usage monitoring service) has been terminated (e.g., stopped, either temporarily or until reactivated, and the like) after executing at least a portion of at least one of the one or more services (e.g., an internet usage monitoring service installed on a home computer to keep an eye on what the children are looking at online) and that the application (e.g., the internet usage monitoring service) maintains access to the one or more protected portions (e.g., a listing of the websites visited by a browser operating on the computer) of the particular device (e.g., the home computer) after termination.

Referring again to FIG. 7C, operation 724 may include operation 726 depicting detecting that the application has been terminated, by examining at least one portion of a memory of the particular device, after executing at least a portion of at least one of the one or more services and that the application maintains access to the one or more protected portions of the particular device after termination. For example, FIG. 2, e.g., FIG. 2B, shows detectable indicator that the agent has terminated activity directed to carrying one or more services and continues access to one or more particular device protected portions after terminated activity detecting by analyzing at least a portion of the particular device module 226 detecting that the application (e.g., a calories consumed tracker) has been terminated, by examining at least one portion of a memory (e.g., a portion of the memory where running applications reside) of the particular device (e.g., a home computer), after executing at least a portion of the one or more services (e.g., allowing a user to enter in a meal eaten) and that the application maintains access to the one or more protected portions (e.g., a database of how many calories are in various foods) of the particular device after termination.

Referring again to FIG. 7C, operation 724 may include operation 728 depicting detecting that the application has been terminated, by receiving a report from a memory monitoring application, after executing at least a portion of at least one of the one or more services and that the application maintains access to the one or more protected portions of the particular device after termination. For example, FIG. 2, e.g., FIG. 2C, shows detectable indicator that the agent has terminated activity directed to carrying one or more services and continues access to one or more particular device protected portions after terminated activity detecting at least partially using a report issued by the particular device module 228 detecting that the application has been terminated, by receiving a report form a memory monitoring application, after executing at least a portion of at least one of the one or more services (e.g., a soda pop vending machine locating service) and that the application maintains access to the one or more protected portions (e.g., positioning sensor) of the particular device after termination.

Referring again to FIG. 7C, operation 724 may include operation 730 depicting detecting that the application has been terminated after executing at least a portion of at least one of the one or more services and detecting, by monitoring data flow to and/or from the one or more protected portions of the particular device, that the application maintains access to the one or more protected portions of the particular device after termination. For example, FIG. 2, e.g., FIG. 2C, shows detectable indicator that the agent has terminated activity directed to carrying one or more services and continues access to one or more particular device protected portions after terminated activity detecting by analyzing data flow of the one or more particular device protected portions module 230 detecting that the application has been terminated after executing at least a portion of at least one of the one or more services and detecting, by monitoring data flow to and/or from the one or more protected portions of the particular device, that the application maintains access to the one or more protected portions of the particular device (e.g., a user's tablet device) after termination.

Referring again to FIG. 7C, operation 724 may include operation 732 depicting detecting that the application has been terminated after executing at least a portion of at least one of the one or more services and detecting, by receiving a report from a protected portion monitoring application, that the application maintains access to the one or more protected portions of the particular device after termination. For example, FIG. 2, e.g., FIG. 2C, shows detectable indicator that the agent has terminated activity directed to carrying one or more services and continues access to one or more particular device protected portions after terminated activity detecting at least partially using a report issued by a monitoring agent for the one or more particular device protected portions module 232 detecting that the application (e.g., an application that collects concert information and selects concerts a user of a device might be interested in, based on music listened to by a user of a device, e.g., a media player, or a device that includes a media player) has been terminated after executing at least a portion of at least one of the one or more services (e.g., selecting concerts a user of a device might be interested in, based on music listened to by a user of a device) and detecting, by receiving a report from a protected portion monitoring application (e.g., which may be a part of the operating system, or may be a separate application), that the application maintains access to the one or more protected portions (e.g., a music playlist created by the user) of the particular device (e.g., a media player, or a computer or other device operating a music playing application) after termination.

Referring again to FIG. 7C, operation 732 may include operation 734 depicting detecting that the application has been terminated after executing at least a portion of at least one of the one or more services and detecting, by receiving a report from a device operating system that monitors the one or more protected portions, that the application maintains access to the one or more protected portions of the particular device after termination. For example, FIG. 2, e.g., FIG. 2C, shows detectable indicator that the agent has terminated activity directed to carrying one or more services and continues access to one or more particular device protected portions after terminated activity detecting at least partially using a report issued by a kernel-based monitoring agent for the one or more particular device protected portions module 234 detecting that the application has been terminated after executing at least a portion of at least one of the one or more services (e.g., a service that monitors body conditions to detect medical emergencies) and detecting, by receiving a report from a device operating system (e.g., an Android operating system, modified by a device vendor, running on a device manufactured by that vendor) that monitors the one or more protected portions, that the application maintains access to the one or more protected portions of the particular device after termination.

Figure 8A:
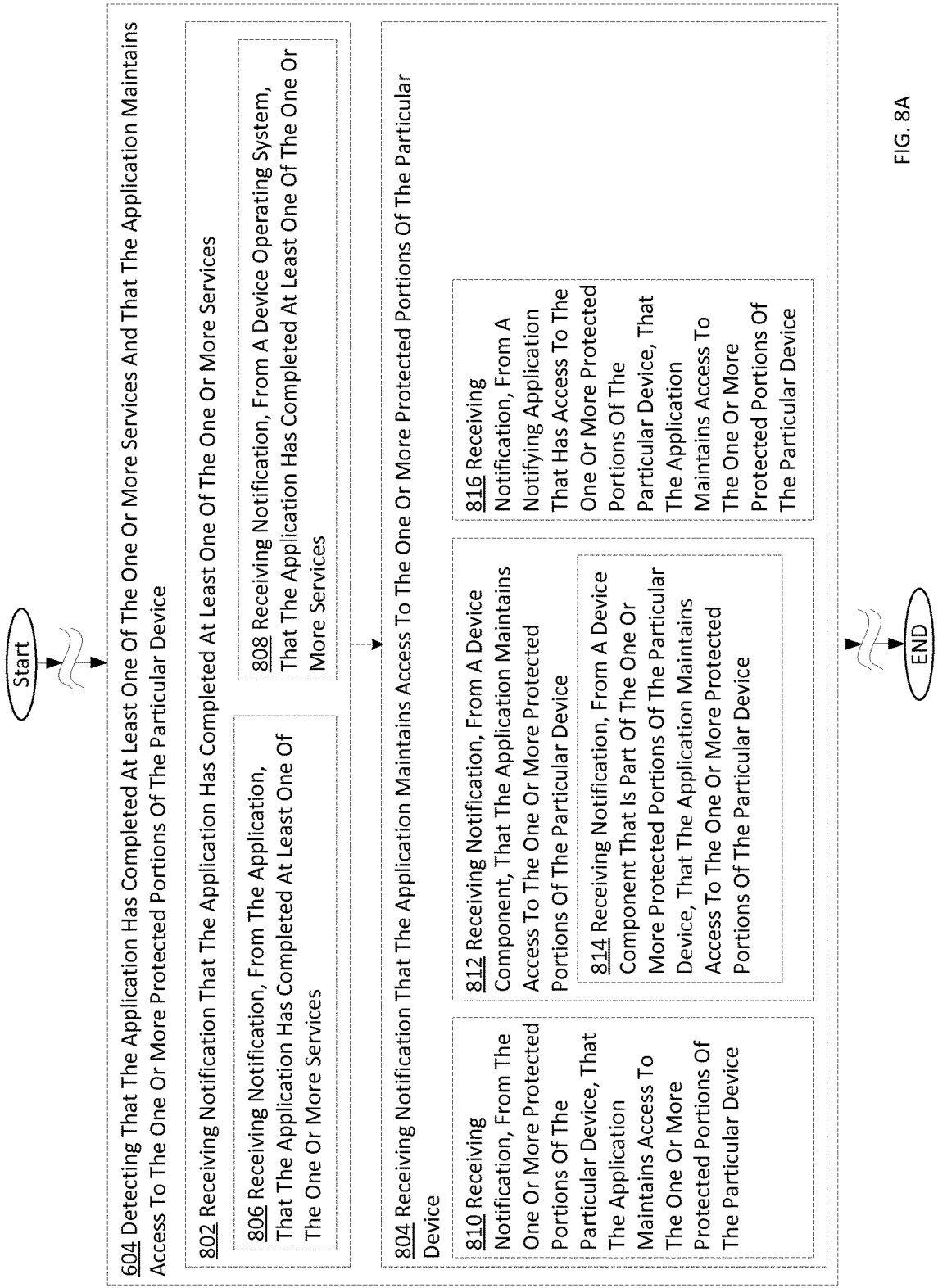
FIG. 8A is a high-level logic flow chart of a process depicting alternate implementations of a detecting completion and continued access operation 604, according to one or more embodiments.

FIGS. 8A-8D depict various implementations of operation 604, depicting detecting that the application has completed at least one of the one or more services and that the application maintains access to the one or more protected portions of the particular device, according to embodiments. Referring now to FIG. 8A, operation 604 may include operation 802 depicting receiving notification that the application has completed at least one of the one or more services. For example, FIG. 3, e.g., FIG. 3A, shows notification of stoppage of the one or more services receiving module 302 receiving notification (e.g., receiving a packet of data that informs) that the application (e.g., a road trip planning application) has completed at least one of the one or more services (e.g., assisting in planning a road trip).

Referring again to FIG. 8A, operation 604 may include operation 804 depicting receiving notification that the application maintains access to the one or more protected portions of the particular device. For example, FIG. 3, e.g., FIG. 3A, shows notification of agent continuing access to the one or more particular device protected portions receiving module 304 receiving notification (e.g., an electrical impulse that causes a change of machine state) that the application (e.g., a video game enhancement application) maintains access to the one or more protected portions (e.g., a video card buffer memory) of the particular device (e.g., a video game system, e.g., a Nintendo Wii).

Referring again to FIG. 8A, operation 802 may include operation 806 depicting receiving notification, from the application, that the application has completed at least one of the one or more services. For example, FIG. 3, e.g., FIG. 3A, shows notification of stoppage of the one or more services receiving from agent module 306 receiving notification (e.g., receiving an indicator), from the application, that the application (e.g., a wireless network strength analyzer) has completed at least one of the one or more services (e.g., analyzing the available wireless networks for a user to connect to).

Referring again to FIG. 8A, operation 802 may include operation 808 depicting receiving notification, from a device operating system, that the application has completed at least one of the one or more services. For example, FIG. 3, e.g., FIG. 3A, shows notification of stoppage of the one or more services receiving from particular device operating system module 308 receiving notification, from a device operating system (e.g., a customized operating system modified by a device vendor), that the application (e.g., a voice processing application) has completed at least one of the one or more services (e.g., preprocessing of received voice commands from a user).

Referring again to FIG. 8A, operation 804 may include operation 810 depicting receiving notification, from the one or more protected portions of the particular device, that the application maintains access to the one or more protected portions of the particular device. For example, FIG. 3, e.g., FIG. 3A, shows notification of agent continuing access to the one or more particular device protected portions receiving from the one or more particular device protected portions module 310 receiving notification, from the one or more protected portions (e.g., an accelerometer of a device) of the particular device (e.g., a Windows phone, e.g., a Nokia Lumia), that the application (e.g., an impact-warning application that protects the device when it senses imminent impact) maintains access to the one or more protected portions (e.g., the accelerometer) of the particular device (e.g., the Windows phone).

Referring again to FIG. 8A, operation 804 may include operation 812 depicting receiving notification, from a device component, that the application maintains access to the one or more protected portions of the particular device. For example, FIG. 3, e.g., FIG. 3A, shows notification of agent continuing access to the one or more particular device protected portions receiving from a protected device component module 312 receiving notification, from a device component (e.g., from a hardware-implemented application monitoring component), that the application maintains access to the one or more protected portions of the particular device (e.g., a vendor-specific smartphone).

Referring again to FIG. 8A, operation 812 may include operation 814 depicting receiving notification, from a device component that is part of the one or more protected portions of the particular device, that the application maintains access to the one or more protected portions of the particular device. For example, FIG. 3, e.g., FIG. 3A, shows notification of agent continuing access to the one or more particular device protected portions receiving from a protected device component that is a part of the one or more particular device protected portions module 314 receiving notification, from a device component that is part of the one or more protected portions (e.g., a protected portion of the device includes a sensor and a monitor for that sensor that determines what entities are accessing the sensor, or, in another embodiment, a protected portion of the device includes a segment of memory, and an application designated to watch that segment of memory and identify one or more entities that are accessing or attempting to access that segment of memory) of the particular device (e.g., a laptop computer), that the application maintains access to the one or more protected portions of the particular device.

Referring again to FIG. 8A, operation 804 may include operation 816 depicting receiving notification, from a notifying application that has access to the one or more protected portions of the particular device, that the application maintains access to the one or more protected portions of the particular device. For example, FIG. 3, e.g., FIG. 3A, shows notification of agent continuing access to the one or more particular device protected portions receiving from a notification agent module 316 receiving notification, from a notifying application (e.g., an application which has at least one purpose that is to determine what entities are accessing which portions of the device, for at least one entity and at least one portion of the device) that has access to the one or more protected portions of the particular device (e.g., a tablet device), that the application (e.g., a picture facial recognition service) maintains access to the one or more protected portions of the particular device (e.g., the image capturing sensor).

Figure 8B:
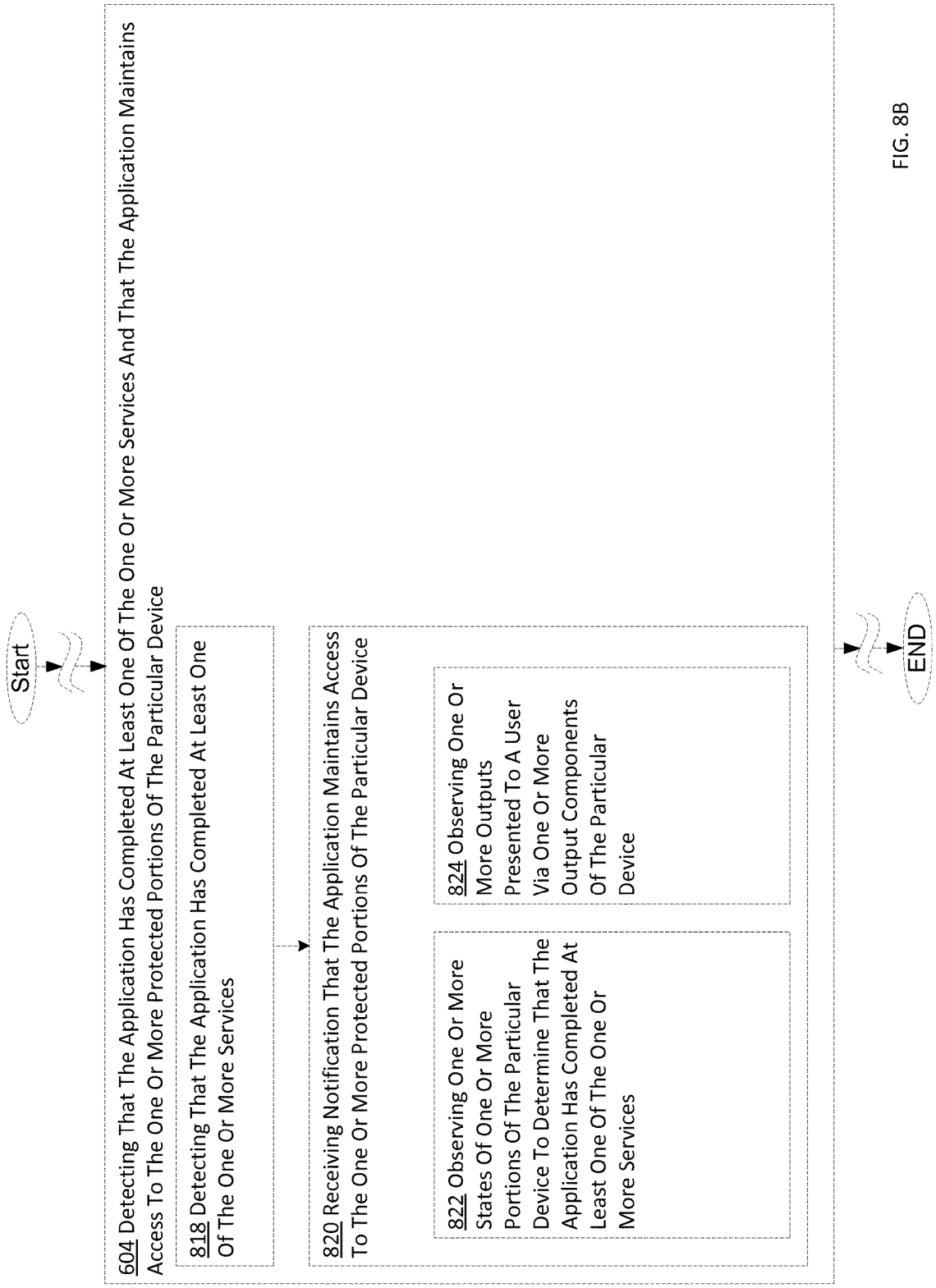
FIG. 8B is a high-level logic flow chart of a process depicting alternate implementations of a detecting completion and continued access operation 604, according to one or more embodiments.

Referring now to FIG. 8B, operation 604 may include operation 818 depicting detecting that the application has completed at least one of the one or more services. For example, FIG. 3, e.g., FIG. 3B, shows termination of one or more agent actions to carry out the one or more services detecting module 318 detecting that the application (e.g., a miles-run tracking application) has completed at least one of the one or more services (e.g., a service to track how many miles are run as part of a training program)

Referring again to FIG. 8B, operation 604 may include operation 820 depicting receiving notification that the application maintains access to the one or more protected portions of the particular device. For example, FIG. 3, e.g., FIG. 3B, shows agent prevention of stoppage of access to the one or more particular device protected portions detecting module 320 receiving notification that the application (e.g., the miles-run tracking application) maintains access (e.g., after the user has indicated that the run is over, the application is still accessing the positioning sensor) to the one or more protected portions (e.g., the positioning sensor) of the particular device (e.g., an exercise assisting device).

Referring again to FIG. 8B, operation 820 may include operation 822 depicting observing one or more states of one or more portions of the particular device to determine that the application has completed at least one of the one or more services. For example, FIG. 3, e.g., FIG. 3B, shows agent prevention of stoppage of access to the one or more particular device protected portions detection by particular device monitoring module 322 observing (e.g., receiving data regarding, or receiving a report regarding, or being inserted in a communication line between two components, or a virtual insertion between two applications, or acting as a liaison or as an interface between two or more components, sensors, interfaces, users, and the like) one or more states (e.g., status information, e.g., environment dependent, and/or environment independent information) of one or more portions of the particular device (e.g., a smartphone) to determine that the application (e.g., a processor utilization monitoring service) has completed at least one of the one or more services.

Referring again to FIG. 8B, operation 820 may include operation 824 depicting observing one or more outputs presented to a user via one or more output components of the particular device. For example, FIG. 3, e.g., FIG. 3B, shows agent prevention of stoppage of access to the one or more particular device protected portions detection by particular device outputs presented to a particular device user monitoring module 324 observing (e.g., receiving data regarding, or receiving a report regarding, or being inserted in a communication line between two components, or a virtual insertion between two applications, or acting as a liaison or as an interface between two or more components, sensors, interfaces, users, and the like) one or more outputs (e.g., visual, audio, tactile, or otherwise) presented to a user via one or more output components (e.g., an LED light, a touch screen, an LCD screen, a speaker, an earpiece, a tactile feedback button, and the like) of the particular device (e.g., a video game system and the associated peripherals, e.g., television and controller).

Figure 8C:
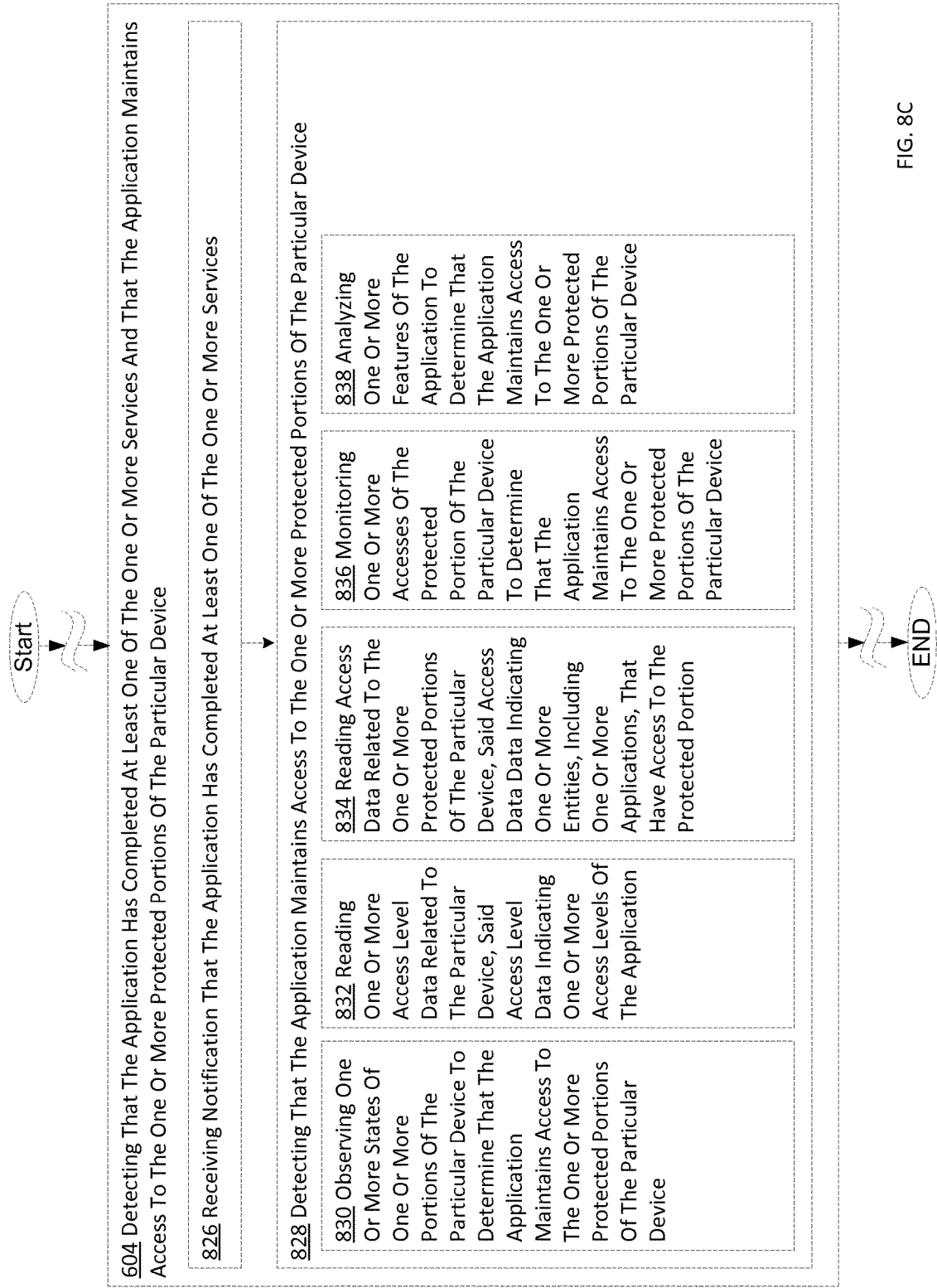
FIG. 8C is a high-level logic flow chart of a process depicting alternate implementations of a detecting completion and continued access operation 604, according to one or more embodiments.

Referring now to FIG. 8C, operation 604 may include operation 826 depicting receiving notification that the application has completed at least one of the one or more services. For example, FIG. 3, e.g., FIG. 3C, shows indicator of agent stoppage of the one or more services obtaining module 326 receiving notification that the application (e.g., has completed receiving notification that the application (e.g., a network connection management application) has completed at least one of the one or more services (e.g., has found an efficient network for a user who requested to download a movie).

Referring again to FIG. 8C, operation 604 may include operation 828 depicting detecting that the application maintains access to the one or more protected portions of the particular device. For example, FIG. 3, e.g., FIG. 3C, shows indicator of agent continuing access to one or more particular device protected portions obtaining module 328 detecting that the application (e.g., the network connection management application) maintains access to the one or more protected portions (e.g., the input/output stream of the network controller) of the particular device (e.g., smartphone, tablet, laptop, and the like).

Referring again to FIG. 8C, operation 828 may include operation 830 depicting observing one or more states of one or more portions of the particular device to determine that the application maintains access to the one or more protected portions of the particular device. For example, FIG. 3, e.g., FIG. 3C, shows indicator of agent continuing access to one or more particular device protected portions obtaining by particular device state monitoring module 330 observing one or more states of one or more portions of the particular device (e.g., a networked computer in a corporate network enterprise environment) to determine that the application maintains access to the one or more protected portions of the particular device (e.g., the personal folder for a network user and employee of the corporation).

Referring again to FIG. 8C, operation 828 may include operation 832 depicting reading one or more access level data related to the particular device, said access level data indicating one or more access levels of the application. For example, FIG. 3, e.g., FIG. 3C, shows indicator of agent continuing access to one or more particular device protected portions obtaining by monitoring agent access level data module 332 reading one or more access level data related to the particular device (e.g., a listing of the access levels allowed for various applications, or a listing of the access levels required for various sensors and/or segments, and the like), said access level data indicating one or more access levels of the application (e.g., whether from the application side or the protected portion side, and whether referring to the application specifically or as part of a group or classification of applications).

Referring again to FIG. 8C, operation 828 may include operation 834 depicting reading access data related to the one or more protected portions of the particular device, said access data indicating one or more entities, including one or more applications, that have access to the protected portion. For example, FIG. 3, e.g., FIG. 3C, shows indicator of agent continuing access to one or more particular device protected portions obtaining by monitoring particular device access data module 334 reading access data (e.g., data regarding access to one or more components, applications, segments of memory, sections, and the like) related to the one or more protected portions of the particular device (e.g., a desktop computer), said access data indicating one or more entities (e.g., persons, applications, application classes, developers, operating systems, and the like), including one or more applications, that have access to the protected portion.

Referring again to FIG. 8C, operation 828 may include operation 836 depicting monitoring one or more accesses of the one or more protected portions of the particular device to determine that the application maintains access to the one or more protected portions of the particular device. For example, FIG. 3, e.g., FIG. 3C, shows indicator of agent continuing access to one or more particular device protected portions obtaining by monitoring attempts to access the one or more particular device protected portions module 336 monitoring one or more accesses of the protected portion (e.g., a velocity sensor) of the particular device (e.g., a cellular communication device) to determine that the application (e.g., a location tracking device) maintains access to the one or more protected portions (e.g., the velocity sensor) of the particular device.

Referring again to FIG. 8C, operation 828 may include operation 838 depicting analyzing one or more features of the application to determine that the application maintains access to the one or more protected portions of the particular device. For example, FIG. 3, e.g., FIG. 3C, shows indicator of agent continuing access to one or more particular device protected portions obtaining by carrying out agent analysis module 338 analyzing one or more features of the application (e.g., at the source code level, the API level, the interface level, and the like, whether directly processing the application or processing related information about the application maintains access to the one or more protected portions of the particular device (e.g., a smartphone).

Figure 8D:
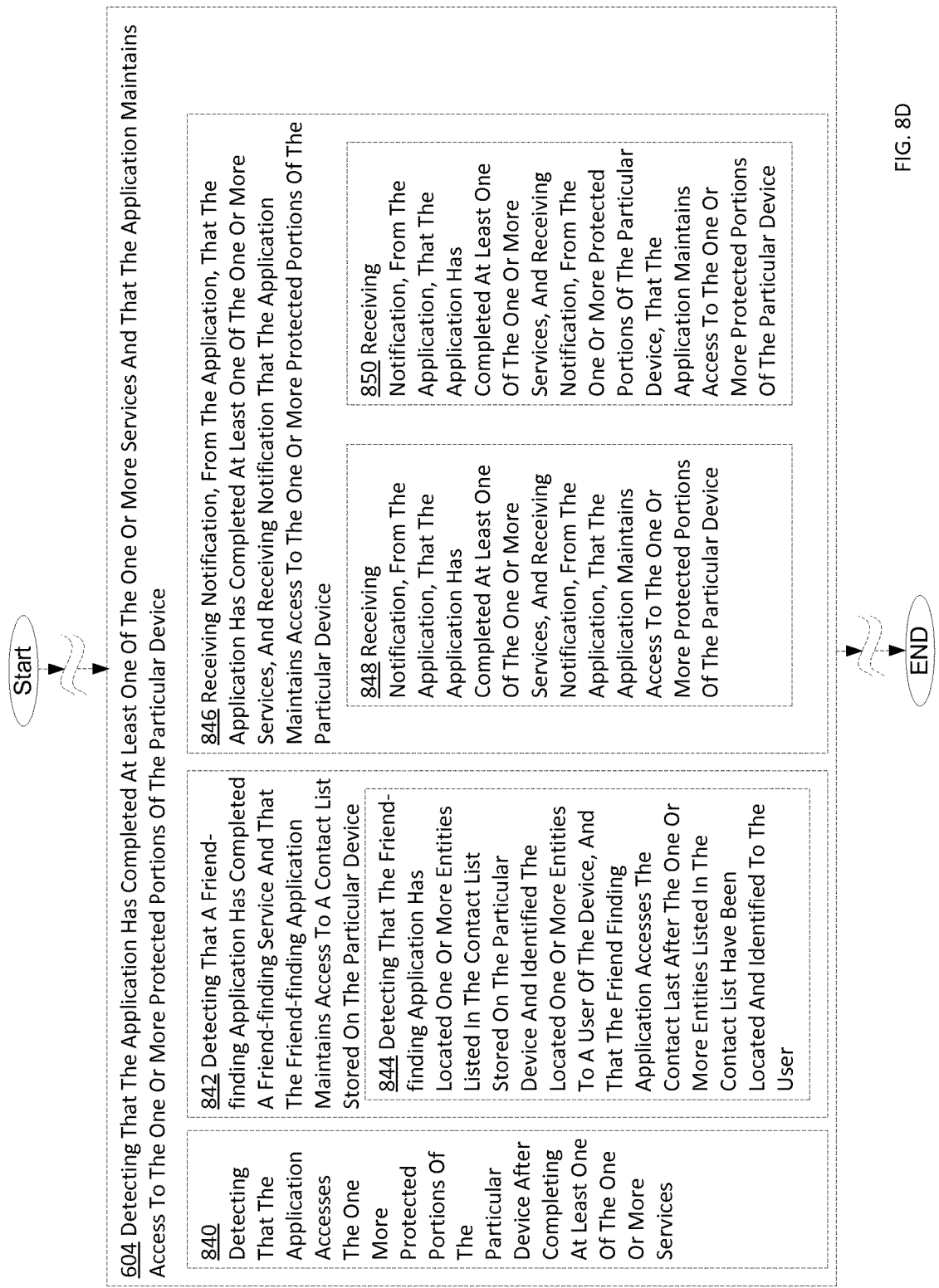
FIG. 8D is a high-level logic flow chart of a process depicting alternate implementations of a detecting completion and continued access operation 604, according to one or more embodiments.

Referring now to FIG. 8D, operation 604 may include operation 840 depicting detecting that the application accesses the one or more protected portions of the particular device after completing at least one of the one or more services. For example, FIG. 3, e.g., FIG. 3D, shows agent stoppage of the one or more services and agent particular access to one or more particular device protected portions detection module 340 detecting that the application (e.g., a soda pop vending machine locating service) accesses the one or more protected portions (e.g., the positioning sensor) of the particular device (e.g., a smartphone) after completing the one or more services (e.g., locating and/or providing directions to the user to the nearest soda pop vending machine with Sunkist Orange in stock).

Referring again to FIG. 8D, operation 604 may include operation 842 depicting detecting that a friend-finding application has completed a friend-finding service and that the friend-finding application maintains access to a contact list stored on the particular device. For example, FIG. 3, e.g., FIG. 3D, shows friend-finding agent stoppage of the one or more friend-finding services and friend-finding agent continuing access to a particular device contact list detection module 342 detecting that a friend-finding application has completed a friend-finding service and that the friend-finding application maintains access to a contact list stored on the particular device (e.g., a smartphone with a shared contact list shared across several devices, including a laptop, a desktop, a tablet device, and a smartphone).

Referring again to FIG. 8D, operation 842 may include operation 844 depicting detecting that the friend-finding application has located one or more entities listed in the contact list stored on the particular device and identified the located one or more entities to a user of the particular device, and that the friend finding application accesses the contact list after the one or more entities listed in the contact list have been located and identified to the user. For example, FIG. 3, e.g., FIG. 3D, shows friend-finding agent location of one or more entities listed in the particular device contact list completed and stoppage of the one or more friend-finding services and friend-finding agent continuing access to the particular device contact list after location and identification of the one or more entities detection module 344 detecting that the friend-finding application has located one or more entities listed in the contact list stored on the particular device and identified the located one or more entities to a user of the device, and that the friend-finding application accesses the contact list after the one or more entities listed in the contact list have been located and identified to the user.

Referring again to FIG. 8D, operation 604 may include operation 846 depicting receiving notification, from the application, that the application has completed at least one of the one or more services, and receiving notification that the application maintains access to the one or more protected portions of the particular device. For example, FIG. 3, e.g., FIG. 3D, shows agent-based notification of stoppage of the one or more services and notification of agent continuing access to one or more particular device protected portions receiving module 346 receiving notification, from the application (e.g., a music categorizing application), that the application has completed at least one of the one or more services (e.g., classifying a piece of music recorded by the device or downloaded from a website), and receiving notification (e.g., from the operating system, or from the protected portion, or from another application) that the application (e.g., the music categorizing application) maintains access to the one or more protected portions (e.g., the portion of memory where music is stored, or the microphone used to record the music) of the particular device.

Referring again to FIG. 8D, operation 846 may include operation 848 depicting receiving notification, from the application, that the application has completed at least one of the one or more services, and receiving notification, from the application, that the application maintains access to the one or more protected portions of the particular device. For example, FIG. 3, e.g., FIG. 3D, shows agent-based notification of stoppage of the one or more services and agent-based notification of continuing access to one or more particular device protected portions receiving module 348 receiving notification, from the application (e.g., a miles walked tracker), that the application has completed at least one of the one or more services (e.g., the application indicates that it is closing down, or that it has completed a discrete task), and receiving notification, from the application (e.g., the miles run tracker), that the application maintains access to the one or more protected portions (e.g., a pedometer) of the particular device (e.g., a portable pedometer device).

Referring again to FIG. 8D, operation 846 may include operation 850 depicting receiving notification, from the application, that the application has completed at least one of the one or more services, and receiving notification, from the one or more protected portions of the particular device, that the application maintains access to the one or more protected portions of the particular device. For example, FIG. 3, e.g., FIG. 3D, shows agent-based notification of stoppage of the one or more services and particular device protected portion-based notification of agent continuing access to one or more particular device protected portions receiving module 350 receiving notification, from the application (e.g., a hiking trail status tracking application that tracks a usability of a particular hiking trail in the current climate condition), that the application (e.g., the hiking trail status tracking application that tracks a usability of a particular hiking trail in the current climate condition) has completed at least one of the one or more services, and receiving notification, from the one or more protected portions of the particular device.

Figure 9A:
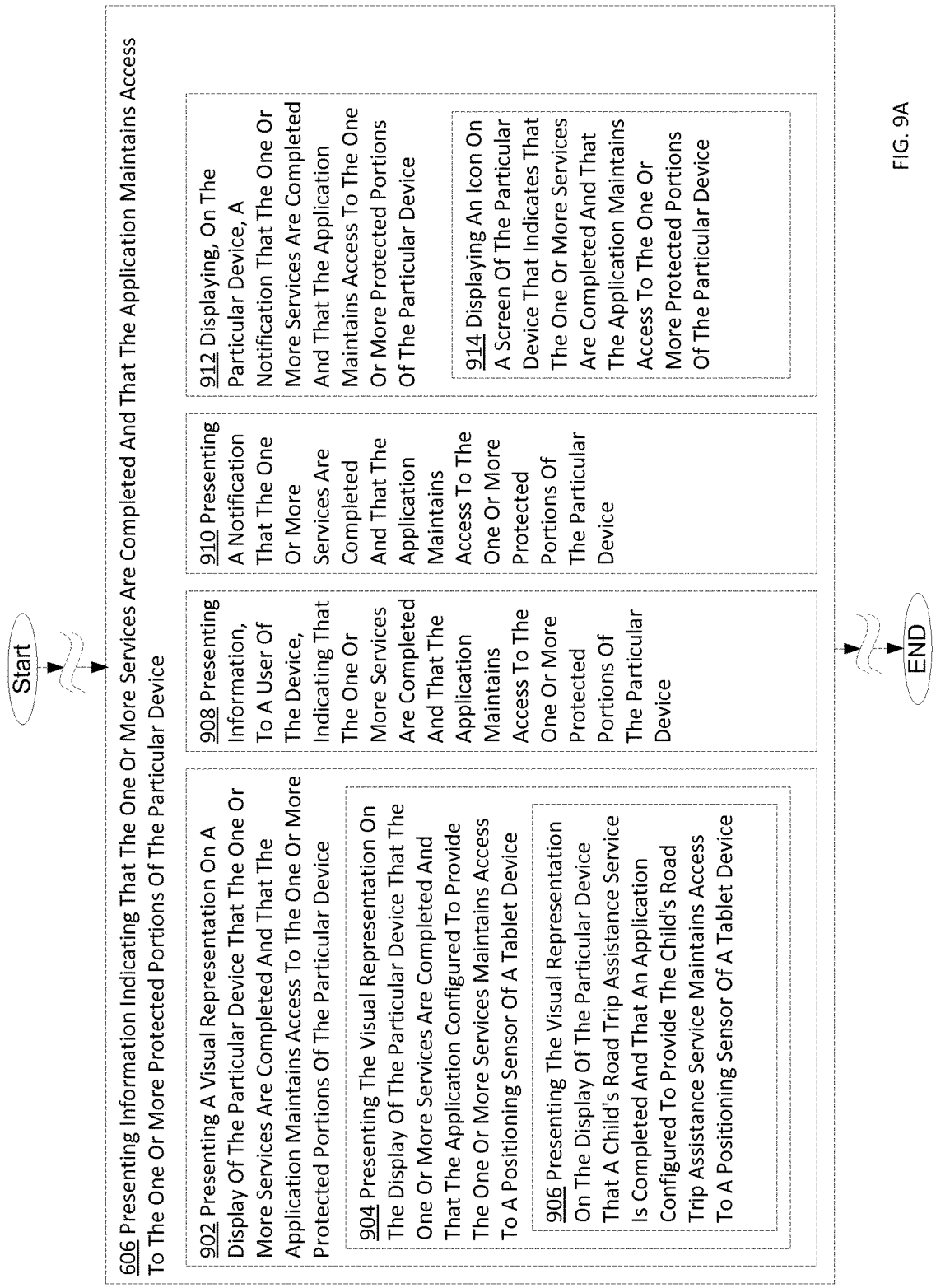
FIG. 9A is a high-level logic flow chart of a process depicting alternate implementations of a presenting information operation 606, according to one or more embodiments.
Figure 9B:
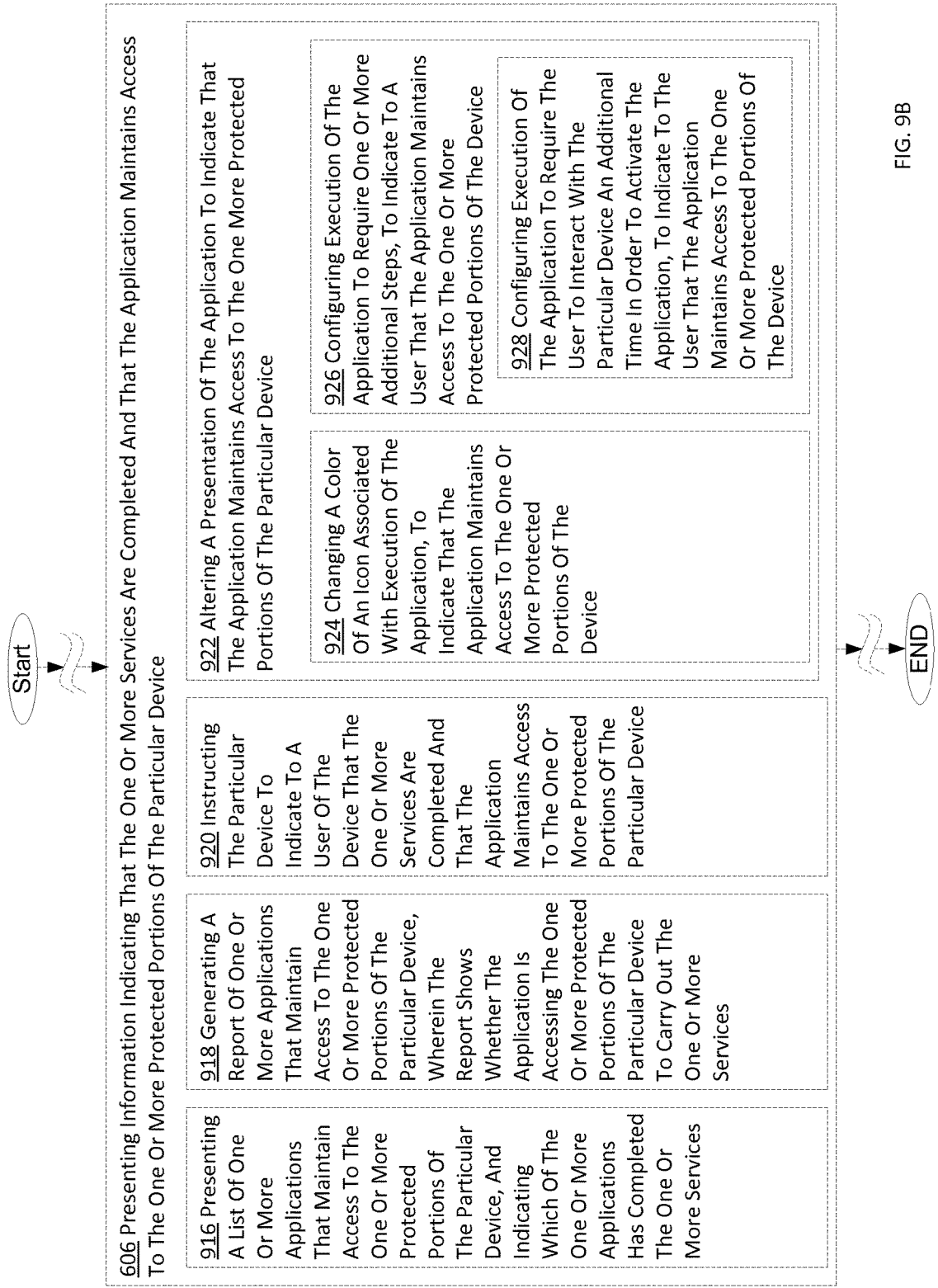
FIG. 9B is a high-level logic flow chart of a process depicting alternate implementations of a presenting information operation 606, according to one or more embodiments.

FIGS. 9A-9C depict various implementations of operation 606 depicting presenting information indicating that the one or more services are completed and that the application maintains access to the one or more protected portions of the particular device, according to embodiments. Referring now to FIG. 8A, operation 606 may include operation 902 depicting presenting a visual representation on a display of the particular device that the one or more services are completed and that the application maintains access to the one or more protected portions of the particular device. For example, FIG. 4, e.g., FIG. 4A, shows visual representation of continued agent access to one or more particular device protected portions and stoppage of the one or more services presenting on a particular device output component module 402 presenting a visual representation (e.g., a notification graphic icon) on a display (e.g., a screen) of the particular device that the one or more services are completed and that the application (e.g., the wireless network strength analyzer) maintains access to the one or more protected portions of the particular device (e.g., a tablet device).

Referring again to FIG. 9A, operation 902 may include operation 904 depicting presenting the visual representation on the display of the particular device that the one or more services are completed and that the application configured to provide the one or more services maintains access to a positioning sensor of a tablet device. For example, FIG. 4, e.g., FIG. 4A, shows visual representation of continued agent access to a tablet device positioning sensor and stoppage of the one or more services presenting on a particular device output component module 404 presenting the visual representation (e.g., a stop sign with a representation of the sensor, e.g., the letters "GPS" for a positioning sensor, inside the stop sign) on the display of the particular device (e.g., a smartphone) that the one or more services are completed and that the application configured to provide the one or more services maintains access to a positioning sensor of a tablet device Referring again to FIG. 9A, operation 904 may include operation 906 depicting presenting the visual representation on the display of the particular device that a child's road trip assistance service is completed and that an application configured to provide the child's road trip assistance service maintains access to a positioning sensor of a tablet device. For example, FIG. 4, e.g., FIG. 4A, shows visual representation of continued agent access to a tablet device positioning sensor and stoppage of a child's road trip assistance service presenting on a particular device output component module 406 presenting the visual representation on the display of the particular device that a child's road trip assistance service is completed and that an application configured to provide the child's road trip assistance service maintains access to a positioning sensor of a tablet device.

Referring again to FIG. 9A, operation 606 may include operation 908 depicting presenting information, to a user of the device, indicating that the one or more services are completed and that the application maintains access to the one or more protected portions of the particular device. For example, FIG. 4, e.g., FIG. 4A, shows indicator of continued agent access to one or more particular device protected portions and stoppage of the one or more services presenting, to an entity related to the particular device, module 408 presenting information, to a user of the device, indicating that the one or more services are completed and that the application maintains access to the one or more protected portions of the particular device.

Referring again to FIG. 9A, operation 606 may include operation 910 depicting presenting a notification that the one or more services are completed and that the application maintains access to the one or more protected portions of the particular device. For example, FIG. 4, e.g., FIG. 4A, shows notification of continued agent access to one or more particular device protected portions and stoppage of the one or more services presenting module 410 presenting a notification that the one or more services (e.g., a public restroom finder service) are completed and that the application maintains access to the one or more protected portions (e.g., the GPS location sensor) of the particular device (e.g., a smartphone).

Referring again to FIG. 9A, operation 606 may include operation 912 depicting displaying, on the particular device, a notification that the one or more services are completed and that the application maintains access to the one or more protected portions of the particular device. For example, FIG. 4, e.g., FIG. 4A, shows visual notification of continued agent access to one or more particular device protected portions and stoppage of the one or more services displaying via the particular device module 412 displaying, on the particular device (e.g., a tablet device), a notification that the one or more services (e.g., a picture sorting into directories service) are completed and that the application maintains access to the one or more protected portions (e.g., the image data of the pictures) of the particular device (e.g., the tablet device).

Referring again to FIG. 9A, operation 912 may include operation 914 depicting displaying an icon on a screen of the particular device that indicates that the one or more services are completed and that the application maintains access to the one or more protected portions of the particular device.

For example, FIG. 4, e.g., FIG. 4A, shows notification icon of continued agent access to one or more particular device protected portions and stoppage of the one or more services displaying via a particular device screen module 414 displaying an icon on a screen of the particular device (e.g., a laptop device) that indicates that the one or more services (e.g., a service designed to find concerts in a user's area based on the music played by the device and the device location) are completed and that the application maintains access to the one or more protected portions (e.g., titles of the songs stored on the user's device, and play frequency tracked by the device) of the particular device (e.g., the laptop computer).

Referring now to FIG. 9B, operation 606 may include operation 916 depicting presenting a list of one or more applications that maintain access to the one or more protected portions of the particular device, and indicating which of the one or more applications has completed the one or more services. For example, FIG. 4, e.g., FIG. 4B, shows list of one or more agents that have continued agent access to one or more particular device protected portions and one or more indicators of one or more of the one or more agents that have stopped the one or more services presenting module 416 presenting a list of one or more applications (e.g., a picture enhancement service (e.g., redeye removal) and a picture facial recognition service) that maintain access to the one or more protected portions (e.g., the picture database) of the particular device (e.g., a tablet device), and indicating which of the one or more applications has completed the one or more services (e.g., enhancing one or more pictures and performing facial recognition on one or more pictures).

Referring again to FIG. 9B, operation 606 may include operation 918 depicting generating a report of one or more applications that maintain access to the one or more protected portions of the particular device, wherein the report shows whether the application is accessing the one or more protected portions of the particular device to carry out the one or more services. For example, FIG. 4, e.g., FIG. 4B, shows report describing continued agent access to one or more particular device protected portions and the report indicating whether the one or more services have been stopped obtaining module 418 generating a report of one or more applications (e.g., a contact locating service) that maintain access to the one or more protected portions (e.g., the device contact list) of the particular device (e.g., a user's cellular phone), wherein the report shows whether the application is accessing the one or more protected portions (e.g., the device contact list) of the particular device (e.g., the user's cellular telephone) to carry out the one or more services (e.g., identify whether any of the user's contacts are at a particular location).

Referring again to FIG. 9B, operation 606 may include operation 920 depicting instructing the particular device to indicate to a user of the device that the one or more services are completed and that the application maintains access to the one or more protected portions of the particular device. For example, FIG. 4, e.g., FIG. 4B, shows instructing the particular device to present the indicator of continued agent access to one or more particular device protected portions and stoppage of the one or more services module 420 instructing (e.g., providing instructions, or setting a flag, or causing one or more subroutines or hardware components to activate and/or execute) the particular device to indicate to a user of the device that the one or more services (e.g., a music categorizer service) are completed and that the application maintains access to the one or more protected portions of the particular device.

Referring again to FIG. 9B, operation 606 may include operation 922 depicting altering a presentation of the application to indicate that the application maintains access to the one or more protected portions of the particular device. For example, FIG. 4, e.g., FIG. 4B, shows altering an agent presentation to indicate continued agent access to one or more particular device protected portions and stoppage of the one or more services module 422 altering a presentation (e.g., changing the appearance of, to the user) of the application (e.g., graying out the selection as an option, or changing a color of the text when the icon is hovered over, or on a touchscreen, giving tactile feedback when the application is selected) to indicate that the application maintains access to the one or more protected portions of the particular device (e.g., a tablet device).

Referring again to FIG. 9B, operation 922 may include operation 924 depicting changing a color of an icon associated with execution of the application, to indicate that the application maintains access to the one or more protected portions of the device. For example, FIG. 4, e.g., FIG. 4B, shows changing a color of a visual representation of the agent to indicate continued agent access to one or more particular device protected portions and stoppage of the one or more services module 424 changing a color of an icon associated with execution of the application (e.g., road trip planning service), to indicate that the application maintains access to the one or more protected portions of the device (e.g., the smartphone).

Referring again to FIG. 9B, operation 922 may include operation 926 depicting configuring execution of the application to require one or more additional steps, to indicate to a user that the application maintains access to the one or more protected portions of the device. For example, FIG. 4, e.g., FIG. 4B, shows altering one or more steps to be carried out for a user to select an agent to indicate continued agent access to one or more particular device protected portions and stoppage of the one or more services module 426 configuring execution of the application (e.g., an application that performs a picture facial recognition service) to require one or more additional steps (e.g., clicking through an additional "are you sure you want to run this application" dialog box), to indicate to a user that the application maintains access to the one or more protected portions of the particular device (e.g., a tablet device).

Referring again to FIG. 9B, operation 926 may include operation 928 depicting configuring execution of the application to require the user to interact with the particular device an additional time in order to activate the application, to indicate to the user that the application maintains access to the one or more protected portions of the particular device. For example, FIG. 4, e.g., FIG. 4B, shows adding one or more steps required to be carried out by the user to select an agent to indicate continued agent access to one or more particular device protected portions and stoppage of the one or more services module 428 configuring execution of the application to require the user to interact with the particular device an additional time (e.g., clicking again, or dragging a pattern with a finger across a touchscreen) in order to activate the application (e.g., an exercise tracker application), to indicate to the user that the application maintains access to the one or more protected portions of the device.

Referring again to FIG. 9B, operation 606 may include operation 930 depicting changing a relative location within an operating system of one or more icons that represent the application, indicating that the one or more services are completed and that the application maintains access to the one or more protected portions of the particular device. For example, FIG. 4, e.g., FIG. 4B, shows relative location within an operating system of an agent presentation altering to indicate continued agent access to one or more particular device protected portions and stoppage of the one or more services module 430 changing a relative location within an operating system (e.g., moving to a different window, or menu, or to a dedicated menu) of one or more icons that represent the application, indicating that the one or more services are completed and that the application maintains access to the one or more protected portions of the particular device (e.g., the tablet device).

Figure 10C:
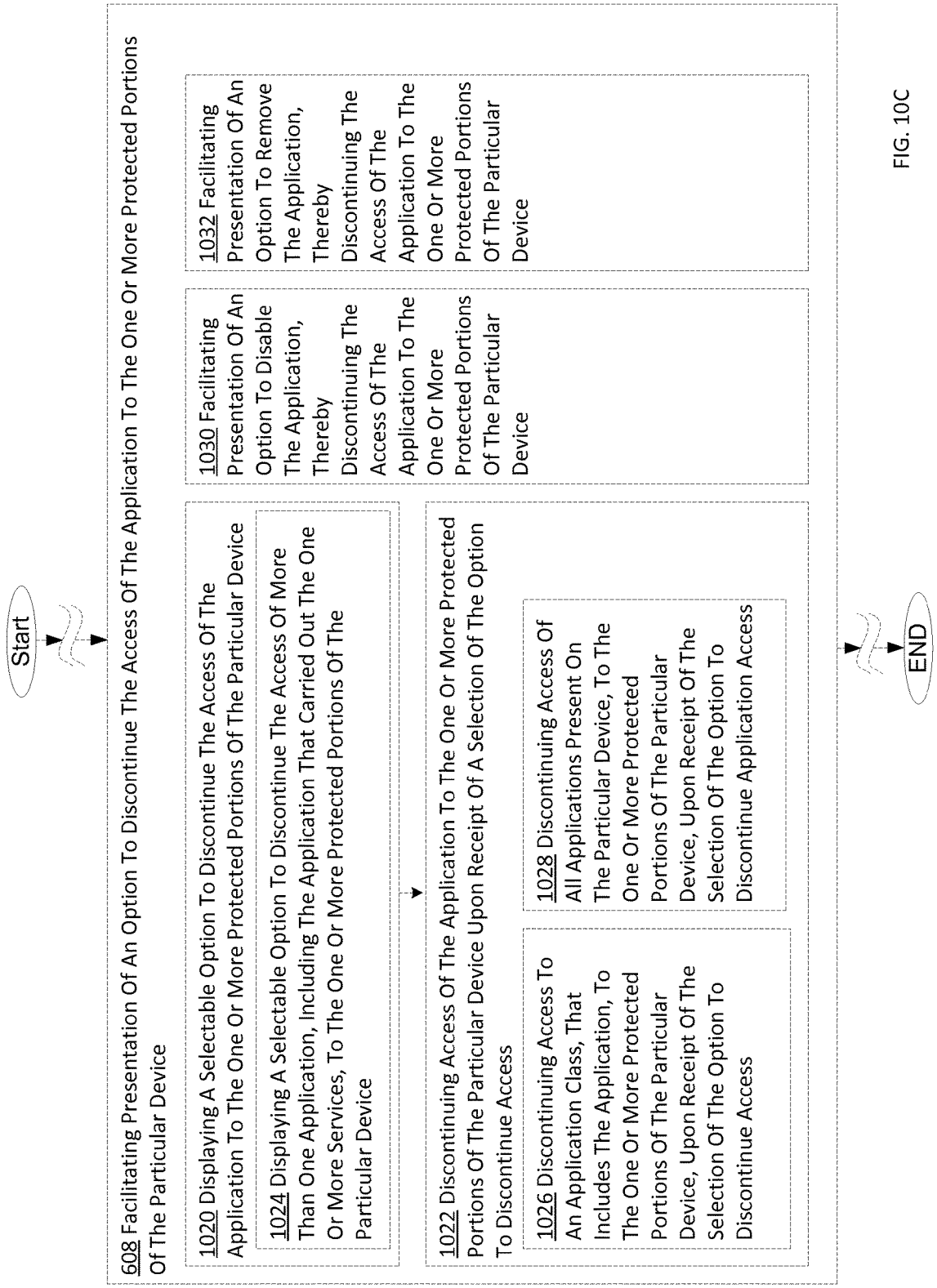
FIG. 10C is a high-level logic flow chart of a process depicting alternate implementations of facilitating presentation operation 608, according to one or more embodiments.

FIGS. 10A-10D depict various implementations of operation 608 depicting facilitating presentation of an option to discontinue the access of the application to the one or more protected portions of the particular device, according to embodiments. Referring now to FIG. 10A, operation 608 may include operation 1002 depicting instructing the particular device to present the option to discontinue the access of the application to the one or more protected portions of the particular device. For example, FIG. 5, e.g., FIG. 5A, shows presentation of an optional choice for discontinuation of agent access to the one or more particular device protected portions device instruction module 502 instructing the particular device (e.g., a smartphone device) to present the option to discontinue the access of the application (e.g., a friend location tracker) to the one or more protected portions (e.g., a Facebook friend list, either stored locally on the phone device or retrieved from a server) of the particular device (e.g., the smartphone device).

Referring again to FIG. 10A, operation 1002 may include operation 1004 depicting instructing the particular device to present the option to instruct the particular device to discontinue the access of the application to the one or more protected portions of the particular device. For example, FIG. 5, e.g., FIG. 5A, shows presentation of an optional choice for instructing a module of the particular device to discontinue agent access to the one or more particular device protected portions device instruction module 504 instructing the particular device (e.g., a laptop computing device) to present the option to instruct the particular device to discontinue the access of the application to the one or more protected portions (e.g., the web-cam) of the particular device (e.g., the laptop computing device).

Referring again to FIG. 10A, operation 1004 may include operation 1004 may include operation 1006 instructing the particular device to present the option, selectable by a user of the device, to instruct a portion of the particular device that controls access to the one or more protected portions of the particular device, to discontinue the access of the application to the one or more protected portions of the particular device. For example, FIG. 5, e.g., FIG. 5A, shows presentation of an optional user-selectable choice for instructing a module of the particular device to discontinue agent access to the one or more particular device protected portions device instruction module 506 instructing the particular device to present the option, selectable by a user of the device, to instruct a portion of the particular device that controls access to the one or more protected portions (e.g., the positioning sensor) of the particular device, to discontinue the access of the application to the one or more protected portions of the particular device (e.g., a smartphone).

Referring again to FIG. 10A, operation 608 may include operation 1008 depicting presenting an option to discontinue the access of the application to the one or more protected portions of the particular device. For example, FIG. 5, e.g., FIG. 5A, shows optional choice for discontinuation of agent access to the one or more particular device protected portions presenting module 508 presenting an option to discontinue the access of the application (e.g., the calorie tracker application) to the one or more protected portions of the particular device (e.g., a tablet device).

Referring again to FIG. 10A, operation 1008 may include operation 1010 depicting presenting the option, to a portion of the particular device that controls access to the one or more protected portions of the particular device, to discontinue the access of the application to the one or more protected portions of the particular device. For example, FIG. 5, e.g., FIG. 5A, shows optional choice for discontinuation of agent access to the one or more particular device protected portions presenting to a protected portion access control portion of the particular device module 510 presenting the option, to a portion of the particular device that controls access to the one or more protected portions of the particular device (e.g., the device operating system, or the device kernel layer, or to a device hardware interface layer), to discontinue the access of the application (e.g., a voice synthesizer) to the one or more protected portions of the particular device (e.g., a smartphone).

Referring now to FIG. 10B, operation 608 may include operation 1012 depicting facilitating presentation of a setting configurable by a user of the particular device that discontinues access of the application to the one or more protected portions of the particular device after completion of the one or more services. For example, FIG. 5, e.g., FIG. 5B, shows presentation of an optional choice for a user setting that instructs the device to discontinue agent access to the one or more particular device protected portions facilitating module 512 facilitating presentation of a setting (e.g., a menu setting facilitated by the operating system of the device) configurable by a user of the device that discontinues access of the application (e.g., a related-music finding service) to the one or more protected portions of the particular device (e.g., the homemade playlist section) after completion of the one or more services (e.g., after finding five related songs that it is calculated that the user might enjoy, based on the user's playlists.

Referring again to FIG. 10B, operation 608 may include operation 1014 depicting facilitating presentation of a setting configurable by a user of the particular device, prior to operating the application, that discontinues access of the application to the one or more protected portions of the particular device after completion of the one or more services. For example, FIG. 5, e.g., FIG. 5B, shows presentation, prior to agent operation, of an optional choice for a user setting that instructs the device to discontinue agent access to the one or more particular device protected portions facilitating module 514 facilitating presentation of a setting configurable by a user of the device (e.g., a physical switch, e.g., a soft key, or a hard-wired button, switch, key, knob, and the like) that controls access to a sensor, e.g., an image capturing sensor, or a positioning sensor), prior to operating the application (e.g., a picture facial recognition service) to the one or more protected portions (e.g., the image capturing sensor) of the particular device (e.g., a computer, smartphone, or tablet device) after completion of the one or more services.

Referring again to FIG. 10B, operation 608 may include operation 1016 depicting facilitating presentation of a setting configurable by a user of the particular device, prior to receiving the application on the particular device, that discontinues access of the application to the one or more protected portions of the particular device after completion of the one or more services. For example, FIG. 5, e.g., FIG. 5B, presentation, prior to agent acquisition, of an optional choice for a user setting that instructs the device to discontinue agent access to the one or more particular device protected portions facilitating module 516 facilitating presentation of a setting (e.g., a radio box that's checked in a "user options" screen of the device operating system) configurable by a user of the particular device (e.g., a tablet device), that discontinues access of the application to the one or more protected portions of the particular device after completion of the one or more services (e.g., a friend finder service).

Referring again to FIG. 10B, operation 608 may include operation 1018 facilitating presentation, to a user of the particular device, of an option to discontinue the access of the application to the one or more protected portions of the particular device. For example, FIG. 5, e.g., FIG. 5B, shows presentation, to an entity related to the particular device, of an optional choice for discontinuation of agent access to the one or more particular device protected portions facilitation module 518 facilitating (e.g., performing one or more actions that assist in the execution or completion of) presentation (e.g., show, through any combination of visual and non-visual interfaces), to a user of the particular device (e.g., a smartphone), of an option to discontinue the access of the application (e.g., a miles biked tracking application) to the one or more protected portions of the particular device (e.g., the smartphone).

Referring now to FIG. 10C, operation 608 may include operation 1020 depicting displaying a selectable option to discontinue the access of the application to the one or more protected portions of the particular device. For example, FIG. 5, e.g., FIG. 5C, shows selectable choice for discontinuation of agent access to the one or more particular device protected portions displaying module 520 displaying a selectable option (e.g., speaking a verbal "would you like to discontinue access" to the user through the speaker, and waiting for a response from the user through the microphone) to discontinue the access of the application (e.g., miles run tracker) to the one or more protected portions (e.g., a positioning sensor) of the particular device (e.g., wearable smart clothes, e.g., a pair of socks that can track mileage and/or detect blisters forming).

Referring again to FIG. 10C, operation 608 may include operation 1022 depicting discontinuing access of the application to the one or more protected portions of the particular device upon receipt of a selection of the option to discontinue access. For example, FIG. 5, e.g., FIG. 5C, shows agent access to the one or more particular device protected portions terminating module 522 discontinuing access of the application (e.g., a glucose level monitor application) to the one or more protected portions of the particular device (e.g., the blood/sweat sampler of a probe taped to the body and attached to a smartphone) upon receipt of a selection of the option to discontinue access.

Referring again to FIG. 10C, operation 1020 may include operation 1024 depicting displaying a selectable option to discontinue the access of more than one application, including the application that carried out the one or more services, to the one or more protected portions of the particular device. For example, FIG. 5, e.g., FIG. 5C, shows selectable choice for discontinuation of access of multiple agents, including the agent, to the one or more particular device protected portions displaying module 524 displaying a selectable option (e.g., displaying a dialog box with the text "would you like to discontinue access, Yes/No") of more than one application, including the application that carried out the one or more services (e.g., the ATM finding service), to the one or more protected portions (e.g., bank account information) of the particular device (e.g., an ATM interface device given out by the bank).

Referring again to FIG. 10C, operation 1022 may include operation 1026 depicting discontinuing access to an application class, that includes the application, to the one or more protected portions of the particular device, upon receipt of the selection of the option to discontinue access. For example, FIG. 5, e.g., FIG. 5C, shows class of one or more agents, including the agent, access to the one or more particular device protected portions terminating module 526 discontinuing access to an application class (e.g., "all applications made by Apple, Inc.," or "all weight-loss applications," or "all applications over fifty megabytes," or "all applications designated by a user as security level five," or "all applications designated by a device manufacturer as security level five," or "all applications that access the positioning sensor," or "all applications that access the device contact list," or "all applications that were acquired in the last fifty days," and the like), that includes the application, to the one or more protected portions of the particular device, upon receipt of the selection of the option to discontinue access.

Referring again to FIG. 10C, operation 1022 may include operation 1028 depicting discontinuing access of all applications present on the particular device, to the one or more protected portions of the particular device, upon receipt of the selection of the option to discontinue application access to the one or more protected portions of the particular device. For example, FIG. 5, e.g., FIG. 5C, shows each of one or more agents access to the one or more particular device protected portions terminating module 528 discontinuing access of all applications present on the particular device (e.g., a tablet device) to the one or more protected portions (e.g., positioning sensor) of the particular device (e.g., the tablet device), upon receipt of the selection of the option to discontinue application access (e.g., access to the protected portion, e.g., the positioning sensor).

Referring again to FIG. 10C, operation 608 may include operation 1030 depicting facilitating presentation of an option to disable the application, thereby discontinuing the access of the application to the one or more protected portions of the particular device. For example, FIG. 5, e.g., FIG. 5C, shows presentation of an optional choice for discontinuation of agent access to the one or more particular device protected portions by disabling the agent facilitation module 530 facilitating (e.g., performing one or more actions that assist in the execution or completion of) presentation (e.g., show, through any combination of visual and non-visual interfaces) of an option to disable (e.g., prevent a user or another application or component of the device from operating) the application (e.g., a 4G network speed measuring application) to the one or more protected portions (e.g., a 4G radio) of the particular device (e.g., a pair of augmented-reality glasses).

Referring again to FIG. 10C, operation 608 may include operation 1032 depicting facilitating presentation of an option to remove the application, thereby discontinuing the access of the application to the one or more protected portions of the particular device. For example, FIG. 5, e.g., FIG. 5C, shows presentation of an optional choice for discontinuation of agent access to the one or more particular device protected portions by removing the agent facilitation module 532 facilitating (e.g., performing one or more actions that assist in the execution or completion of) presentation (e.g., show, through any combination of visual and non-visual interfaces) of an option to remove the application (e.g., remove the application from memory, or remove one or more links and/or pointers to the application's place in memory), thereby discontinuing the access of the application to the one or more protected portions (e.g., the speaker output) of the particular device (e.g., a smartphone).

Referring now to FIG. 10D, operation 608 may include operation 1034 depicting facilitating presentation of an option to implement one or more limitations regarding access of the application to the one or more protected portions of the particular device. For example, FIG. 5, e.g., FIG. 5D, shows presentation of an optional choice for establishing limitations for agent access to the one or more particular device protected portions facilitation module 534 facilitating (e.g., performing one or more actions that assist in the execution or completion of) presentation (e.g., show, through any combination of visual and non-visual interfaces) of an option to implement one or more limitations (e.g., restrictions, conditions, reductions, regulations, and the like) regarding access of the application (e.g., a farm planning application) to the one or more protected portions (e.g., an image capturing sensor acting as a light sensor) of the particular device (e.g., a smartphone).

Referring again to FIG. 10D, operation 1034 may include operation 1036 depicting facilitating presentation of an option to require a grant of access to the one or more protected portions of the particular device when the application attempts to access the one or more protected portions of the particular device. For example, FIG. 5, e.g., FIG. 5D, shows presentation of an optional choice for requiring explicit grant of access for reestablishment of agent access to the one or more particular device protected portions facilitation module 536 facilitating (e.g., performing one or more actions that assist in the execution or completion of) presentation (e.g., show, through any combination of visual and non-visual interfaces) of an option to require a grant of access (e.g., an action that results in changing an access level to a level that permits access) to the one or more protected portions (e.g., a barometer) of the particular device (e.g., a home weather station) when the application (e.g., a garden planning application) attempts to access the one or more protected portions of the particular device (e.g., the home weather station).

Referring again to FIG. 10D, operation 1034 may include operation 1038 depicting facilitating presentation of an option to limit a number of times that the application is permitted to access the one or more protected portions of the particular device. For example, FIG. 5, e.g., FIG. 5D, shows presentation of an optional choice for setting a limit on a number of times the agent is permitted to reestablish access to the one or more particular device protected portions facilitation module 538 facilitating (e.g., performing one or more actions that assist in the execution or completion of) presentation (e.g., show, through any combination of visual and non-visual interfaces) of an option to limit a number of times that the application is permitted to access the one or more protected portions of the particular device (e.g., a tablet device).

Referring again to FIG. 10D, operation 1038 may include operation 1040 depicting facilitating presentation of an option to limit a number of times that the application is permitted to access the one or more protected portions of the particular device during a particular time period. For example, FIG. 5, e.g., FIG. 5D, shows presentation of an optional choice for setting a limit on a number of times during a particular time period that the agent is permitted to reestablish access to the one or more particular device protected portions facilitation module 540 facilitating (e.g., performing one or more actions that assist in the execution or completion of) presentation (e.g., show, through any combination of visual and non-visual interfaces) of an option to limit a number of times that the application (e.g., an exercise tracker) is permitted to access the one or more protected portions (e.g., stored calorie-burning data) of the particular device during a particular time period (e.g., during a time period that the user designates as workout time).

Referring again to FIG. 10D, operation 1034 may include operation 1042 depicting facilitating presentation of an option to set one or more conditions regarding when the application is permitted to access the one or more protected portions of the particular device. For example, FIG. 5, e.g., FIG. 5D, shows presentation of an optional choice for establishing prerequisite conditions for allowing reestablishment of agent access to the one or more particular device protected portions facilitation module 542 facilitating (e.g., performing one or more actions that assist in the execution or completion of) presentation (e.g., show, through any combination of visual and non-visual interfaces) of an option to set one or more conditions (e.g., position data can only be accessed when the device is traveling over 30 miles per hour, e.g., indicating that the device is in a motor vehicle) regarding when the application is permitted to access the one or more protected portions (e.g., position data) of the particular device (e.g., a cellular smartphone device).

Referring again to FIG. 10D, operation 1042 may include operation 1044 depicting facilitating presentation of an option to limit a number of times that the application is permitted to access the one or more protected portions of the particular device when the particular device is located at a particular location. For example, FIG. 5, e.g., FIG. 5D, shows presentation of an optional choice for establishing a particular location as a prerequisite condition for allowing reestablishment of agent access to the one or more particular device protected portions facilitation module 544 facilitating (e.g., performing one or more actions that assist in the execution or completion of) presentation (e.g., show, through any combination of visual and non-visual interfaces) of an option to limit a number of times that the application (e.g., an open wireless network detector) is permitted to access the one or more protected portions (e.g., a wireless radio) of the particular device (e.g., a portable hotspot device, or a cellular telephone device with a Wi-Fi radio) when the particular device is located at a particular location (e.g., Times Square).

Referring again to FIG. 10D, operation 608 may include operation 1046 depicting facilitating presentation of an option to require the application to anonymize data retrieved from the one or more protected portions of the particular device, in order to maintain access to the one or more protected portions of the particular device. For example, FIG. 5, e.g., FIG. 5D, shows presentation of an optional choice for requiring an anonymization of data used for continued agent access to the one or more particular device protected portions facilitation module 546 facilitating presentation (e.g., taking one or more steps (e.g., actions, subroutines, physical changes, and the like) to assist in the carrying out of) of an option to require the application to anonymize (e.g., obscure, remove, alter, and the like an origin of) data retrieved from the one or more protected portions (e.g., positioning sensor data) of the particular device (e.g., a smartphone), in order to maintain access (e.g., without anonymization, access would be cut off) to the one or more protected portions of the particular device).

In some embodiments, an operation may include one or more of performance of at least a portion of the one or more services facilitating in response to a grant of access to a protected sensor of the device module, performance of at least a portion of the one or more services facilitating in response to a grant of access to data acquired by the device and requiring specific permission to be released to an external service module, and performance of at least a portion of the one or more services facilitating in response to a grant of access to data acquired by the device and requiring user permission to be released to an external service module. In some embodiments, an operation may include one or more of performance of at least a portion of the one or more services facilitating in response to a grant of access to a protected sensor of the device to which a user must explicitly grant access module and performance of at least a portion of the one or more services facilitating in response to a grant of access to a protected sensor of the device to which a root-level program must explicitly grant access module.

In some embodiments, an operation may include facilitating carrying out at least a portion of the at least one service that is at least partly related to the device, in response to a grant of access to particular protected data collected by the device that requires permission from the user to be released externally to the device. For example, provision of at least a portion of the one or more services facilitating upon receipt of negotiated access to data acquired by the device and requiring user permission to be released to an external service module facilitating carrying out at least a portion of the at least one service (e.g., a fluid drinking guidance service for long bicycle rides) that is at least partly related to the device (e.g., the device already has a bicycle-riding assistance application installed in its memory), in response to a grant of access to particular protected data (e.g., heart rate data of the user) collected by the device (e.g., a bicycle-mounted rider monitoring device) that requires permission from the user to be released externally.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system, comprising:
    circuitry configured for implementing one or more protected portions of a user device, the one or more protected portions including at least some protected data not transmitted from the user device without a user grant of access by an application to the one or more protected portions;
    circuitry configured for facilitating presentation of an offer to provide at least one service accessible through at least one application on the user device in exchange for at least one user permission for the at least one application to transmit the at least some protected data from the user device while the at least one service is being carried out, including at least:
        circuitry configured for facilitating the presentation of the offer to provide at least one fitness tracker service accessible through at least one application available for installation on the user device in exchange for at least one user permission for the at least one application to transmit, from the user device and to at least one computing device associated with the at least one fitness tracker service, health-related data personal to the user of the user device while the at least one fitness tracker service is being carried out, wherein the health-related data personal to the user is restricted from being transmitted by the user device without the at least one user permission;
    circuitry configured for enabling the at least one application on the user device to have access to the one or more protected portions of the user device in response to receiving the at least one user permission for the at least one application to transmit the at least some protected data from the user device while the at least one service is being carried out;
    circuitry configured for detecting that the at least one application has finished carrying out the at least one service and that the at least one application maintains the access to the one or more protected portions of the user device;
    circuitry configured for facilitating presentation of an option to discontinue the access of the at least one application to the one or more protected portions of the user device; and
    circuitry configured for discontinuing the access of the at least one application to the one or more protected portions of the user device in response to receiving an indication of a selection of the option to discontinue the access of the at least one application to the one or more protected portions of the user device.

2. The system of claim 1, wherein circuitry configured for enabling the at least one application on the user device to have access to the one or more protected portions of the user device in response to receiving the at least one user permission for the at least one application to transmit the at least some protected data from the user device while the at least one service is being carried out comprises:
    circuitry configured for facilitating installation of the at least one application on the user device, the at least one application configured to transmit the at least some protected data from the user device to at least one other computing device associated with the at least one service while the at least one service is being carried out, in response to receiving the at least one user permission for the at least one application to transmit the at least some protected data from the user device while the at least one service is being carried out.

3. The system of claim 1, wherein circuitry configured for facilitating presentation of an offer to provide at least one service accessible through at least one application on the user device in exchange for at least one user permission for the at least one application to transmit the at least some protected data from the user device while the at least one service is being carried out comprises:
    circuitry configured for scanning the user device to determine presence and accessibility of health-related data personal to a user of the user device.

4. The system of claim 1, wherein circuitry configured for detecting that the at least one application has finished carrying out the at least one service and that the at least one application maintains the access to the one or more protected portions of the user device comprises:
    circuitry configured for detecting that the at least one application has terminated after carrying out at least a portion of the at least one service and that the at least one application maintains the access to the one or more protected portions of the user device after termination.

5. The system of claim 1, wherein circuitry configured for detecting that the at least one application has finished carrying out the at least one service and that the at least one application maintains the access to the one or more protected portions of the user device comprises:
    circuitry configured for detecting that the at least one application has finished carrying out the at least one service and that the at least one application maintains the access to the one or more protected portions of the user device at least partially based on at least one content of one or more usage logs of the user device.

6. The system of claim 1, wherein circuitry configured for detecting that the at least one application has finished carrying out the at least one service and that the at least one application maintains the access to the one or more protected portions of the user device comprises:

circuitry configured for detecting that the at least one application has finished carrying out the at least one service and that the at least one application maintains the access to the one or more protected portions of the user device by examining at least one portion of a memory of the user device.

7. The system of claim 1, wherein circuitry configured for detecting that the at least one application has finished carrying out the at least one service and that the at least one application maintains the access to the one or more protected portions of the user device comprises:
circuitry configured for detecting that the at least one application has finished carrying out the at least one service and that the at least one application maintains the access to the one or more protected portions of the user device by receiving a report from at least one of a memory monitoring application or a kernel-based monitoring agent of a device operating system installed on the user device.

8. The system of claim 1, wherein circuitry configured for detecting that the at least one application has finished carrying out the at least one service and that the at least one application maintains the access to the one or more protected portions of the user device comprises:
circuitry configured for detecting that the at least one application has finished carrying out the at least one service and that the at least one application maintains the access to the one or more protected portions of the user device by monitoring data flow at least one of to or from one or more protected hardware components of the user device.

9. The system of claim 1, wherein circuitry configured for detecting that the at least one application has finished carrying out the at least one service and that the at least one application maintains the access to the one or more protected portions of the user device comprises:
circuitry configured for detecting that the at least one application has terminated and that the at least one application maintains the access to the one or more protected portions of the user device by receiving a report from a protected portion monitoring application.

10. The system of claim 1, wherein circuitry configured for detecting that the at least one application has finished carrying out the at least one service and that the at least one application maintains the access to the one or more protected portions of the user device comprises:
circuitry configured for receiving at least one notification that the at least one application has finished carrying out the at least one service; and
circuitry configured for receiving at least one notification that the at least one application maintains the access to the one or more protected portions of the user device.

11. The system of claim 1, wherein circuitry configured for detecting that the at least one application has finished carrying out the at least one service and that the at least one application maintains the access to the one or more protected portions of the user device comprises:
circuitry configured for receiving at least one notification that the at least one application has finished carrying out the at least one service; and
circuitry configured for detecting that the at least one application maintains the access to the one or more protected portions of the user device.

12. The system of claim 11, wherein circuitry configured for detecting that the at least one application maintains the access to the one or more protected portions of the user device comprises:
circuitry configured for monitoring one or more accesses of the one or more protected portions of the user device to determine that the at least one application maintains the access to the one or more protected portions of the user device.

13. The system of claim 11, wherein circuitry configured for detecting that the at least one application maintains the access to the one or more protected portions of the user device comprises:
circuitry configured for analyzing one or more features of the at least one application to determine that the at least one application maintains the access to the one or more protected portions of the user device.

14. The system of claim 1, wherein circuitry configured for detecting that the at least one application has finished carrying out the at least one service and that the at least one application maintains the access to the one or more protected portions of the user device comprises:
circuitry configured for detecting that the at least one application accesses the one or more protected portions of the user device after completing at least a portion of the at least one service.

15. The system of claim 1, wherein circuitry configured for detecting that the at least one application has finished carrying out the at least one service and that the at least one application maintains the access to the one or more protected portions of the user device comprises:
circuitry configured for receiving at least one notification, from the at least one application, that the at least one application has finished carrying out the at least one service, and receiving at least one notification that the at least one application maintains access to the one or more protected portions of the user device.

16. The system of claim 15, wherein circuitry configured for receiving at least one notification, from the at least one application, that the at least one application has finished carrying out the at least one service, and receiving at least one notification that the at least one application maintains access to the one or more protected portions of the user device comprises:
circuitry configured for receiving at least one notification, from the at least one application, that the at least one application has finished carrying out the at least one service, and receiving at least one notification, from the one or more protected portions of the user device, that the at least one application maintains the access to the one or more protected portions of the user device.

17. The system of claim 1, wherein circuitry configured for facilitating presentation of an option to discontinue the access of the at least one application to the one or more protected portions of the user device comprises:
circuitry configured for presenting at least some information indicating that the at least one application has finished carrying out the at least one service and that the at least one application maintains the access to the one or more protected portions of the user device.

18. The system of claim 17, wherein circuitry configured for presenting at least some information indicating that the at least one application has finished carrying out the at least one service and that the at least one application maintains the access to the one or more protected portions of the user device comprises:
circuitry configured for presenting at least some information to a user of the user device that the at least one application has finished carrying out the at least one service and that the at least one application maintains the access to the one or more protected portions of the user device.

19. The system of claim 17, wherein circuitry configured for presenting at least some information indicating that the at least one application has finished carrying out the at least one service and that the at least one application maintains the access to the one or more protected portions of the user device comprises:
   circuitry configured for presenting at least one list of one or more applications that maintain access to the one or more protected portions of the user device and indicating which of the one or more applications has finished carrying out the at least one service.

20. The system of claim 17, wherein circuitry configured for presenting at least some information indicating that the at least one application has finished carrying out the at least one service and that the at least one application maintains the access to the one or more protected portions of the user device comprises:
   circuitry configured for generating a report of one or more applications that maintain access to the one or more portions of the user device, wherein the report shows whether the at least one application is accessing the one or more portions of the user device to carry out the at least one service.

21. The system of claim 17, wherein circuitry configured for presenting at least some information indicating that the at least one application has finished carrying out the at least one service and that the at least one application maintains the access to the one or more protected portions of the user device comprises:
   circuitry configured for instructing the user device to indicate to a user of the user device that the at least one application has finished carrying out the at least one service and that the at least one application maintains the access to the one or more protected portions of the user device.

22. The system of claim 17, wherein circuitry configured for presenting at least some information indicating that the at least one application has finished carrying out the at least one service and that the at least one application maintains the access to the one or more protected portions of the user device comprises:
   circuitry configured for configuring execution of the at least one application to require one or more additional steps to indicate to a user that the at least one application maintains the access to the one or more protected portions of the user device.

23. The system of claim 22, wherein circuitry configured for configuring execution of the at least one application to require one or more additional steps to indicate to a user that the at least one application maintains the access to the one or more protected portions of the user device comprises:
   circuitry configured for configuring execution of the at least one application to require at least one additional user interaction with the user device in order to activate the at least one application to indicate to the user that the at least one application maintains the access to the one or more protected portions of the user device.

24. The system of claim 1, wherein circuitry configured for facilitating presentation of an option to discontinue the access of the at least one application to the one or more protected portions of the user device comprises:
   circuitry configured for facilitating presentation of a setting configurable by a user of the user device that discontinues the access of the at least one application to the one or more protected portions of the user device after the at least one service has finished being carried out by the at least one application.

25. The system of claim 24, wherein circuitry configured for facilitating presentation of a setting configurable by a user of the user device that discontinues the access of the at least one application to the one or more protected portions of the user device after the at least one service has finished being carried out by the at least one application comprises:
   circuitry configured for facilitating presentation of a setting configurable by a user of the user device prior to interacting with the at least one application that discontinues the access of the at least one application to the one or more protected portions of the user device after the at least one service has finished being carried out by the at least one application.

26. The system of claim 1, wherein circuitry configured for facilitating presentation of an option to discontinue the access of the at least one application to the one or more protected portions of the user device comprises:
   circuitry configured for facilitating presentation, to a user of the user device, of an option to discontinue the access of the at least one application to the one or more protected portions of the user device.

27. The system of claim 1, wherein circuitry configured for facilitating presentation of an option to discontinue the access of the at least one application to the one or more protected portions of the user device comprises:
   circuitry configured for displaying a selectable option to discontinue the access of the at least one application to the one or more protected portions of the user device; and
   circuitry configured for discontinuing the access of the at least one application to the one or more protected portions of the user device upon receipt of a selection of the option to discontinue the access of the at least one application to the one or more protected portions of the user device.

28. The system of claim 1, wherein circuitry configured for discontinuing the access of the at least one application to the one or more protected portions of the user device in response to receiving an indication of a selection of the option to discontinue the access of the at least one application to the one or more protected portions of the user device comprises:
   circuitry configured for revoking permission for access of the at least one application to the one or more protected portions of the user device during any subsequent instance of the at least one service being carried out.

29. The system of claim 1, wherein circuitry configured for discontinuing the access of the at least one application to the one or more protected portions of the user device in response to receiving an indication of a selection of the option to discontinue the access of the at least one application to the one or more protected portions of the user device comprises:
   circuitry configured for revoking permission for access of the at least one application to the one or more protected portions of the user device until at least one subsequent instance of the at least one service being carried out.

30. The system of claim 1, wherein circuitry configured for facilitating presentation of an offer to provide at least one service accessible through at least one application on the user device in exchange for at least one user permission for the at least one application to transmit the at least some protected data from the user device while the at least one service is being carried out comprises:

circuitry configured for facilitating presentation of an offer to make installation available of the at least one application on the user device, the at least one application providing the at least one service and requiring access to the one or more protected portions of the user device, in exchange for at least one user permission for the at least one application to transmit the at least some protected data from the user device while the at least one service is being carried out.

31. The system of claim 30, wherein circuitry configured for facilitating presentation of an offer to make installation available of the at least one application on the user device, the at least one application providing the at least one service and requiring access to the one or more protected portions of the user device, in exchange for at least one user permission for the at least one application to transmit the at least some protected data from the user device while the at least one service is being carried out comprises:
- circuitry configured for instructing the user device to display an offer to make installation available of the at least one application on the user device, the at least one application providing the at least one service and requiring access to the one or more protected portions of the user device, in exchange for at least one user permission for the at least one application to transmit the at least some protected data from the user device while the at least one service is being carried out.

32. The system of claim 1, wherein circuitry configured for facilitating the presentation of the offer to provide at least one fitness tracker service accessible through at least one application available for installation on the user device in exchange for at least one user permission for the at least one application to transmit, from the user device and to at least one computing device associated with the at least one fitness tracker service, health-related data personal to the user of the user device while the at least one fitness tracker service is being carried out, wherein the health-related data personal to the user is restricted from being transmitted by the user device without the at least one user permission comprises:
- circuitry configured for facilitating the presentation of the offer to provide the at least one fitness tracker service in exchange for at least one user permission for the at least one application to transmit at least one of at least some heart rate data, at least one calendar reminder relating to at least one fitness appointment of the user, or at least one number of steps taken by the user from the user device while the at least one fitness tracker service is being carried out.

33. The system of claim 1, wherein circuitry configured for facilitating presentation of an offer to provide at least one service accessible through at least one application on the user device in exchange for at least one user permission for the at least one application to transmit the at least some protected data from the user device while the at least one service is being carried out comprises:
- circuitry configured for facilitating presentation of an offer to provide a download location for the at least one application in exchange for at least one user permission for the at least one application to transmit the at least some protected data from the user device while the at least one service is being carried out.

34. The system of claim 1, wherein circuitry configured for facilitating presentation of an offer to provide at least one service accessible through at least one application on the user device in exchange for at least one user permission for the at least one application to transmit the at least some protected data from the user device while the at least one service is being carried out comprises:
- circuitry configured for facilitating presentation of an offer to provide at least one service accessible through at least one application on the user device in exchange for at least one user permission for the at least one application to transmit data that is part of the one or more protected portions of the user device while the at least one service is being carried out.

35. The system of claim 1, wherein circuitry configured for implementing one or more protected portions of a user device, the one or more protected portions including at least some protected data not transmitted from the user device without a user grant of access by an application to the one or more protected portions comprises:
- circuitry configured for implementing one or more protected portions of a user device, the one or more protected portions including at least some protected data for which an application must be authenticated to access the at least some protected data.

36. The system of claim 35, wherein circuitry configured for implementing one or more protected portions of a user device, the one or more protected portions including at least some protected data for which an application must be authenticated to access the at least some protected data comprises:
- circuitry configured for implementing one or more protected portions of a user device, the one or more protected portions including at least some protected data for which an application must have operating system certification to access the at least some protected data.

37. The system of claim 35, wherein circuitry configured for implementing one or more protected portions of a user device, the one or more protected portions including at least some protected data for which an application must be authenticated to access the at least some protected data comprises:
- circuitry configured for implementing one or more protected portions of a user device, the one or more protected portions including at least some protected data for which a user flag associated with access to the at least some protected data must be set to true for access to the at least some protected data to be available to one or more applications.

38. The system of claim 1, wherein circuitry configured for implementing one or more protected portions of a user device, the one or more protected portions including at least some protected data not transmitted from the user device without a user grant of access by an application to the one or more protected portions comprises:
- circuitry configured for implementing one or more protected portions of a user device, the one or more protected portions including at least some protected data not transmitted to any other system without a user grant of access by an application to the one or more protected portions.

39. The system of claim 38, wherein circuitry configured for implementing one or more protected portions of a user device, the one or more protected portions including at least some protected data not transmitted to any other system without a user grant of access by an application to the one or more protected portions comprises:
- circuitry configured for implementing one or more protected portions of a user device, the one or more protected portions including at least some protected data not transmitted to any other system not under direct control of the user device without a user grant of access by an application to the one or more protected portions.

40. The system of claim 1, wherein circuitry configured for implementing one or more protected portions of a user device, the one or more protected portions including at least some protected data not transmitted from the user device without a user grant of access by an application to the one or more protected portions comprises:
    circuitry configured for implementing one or more protected portions of a user device, the one or more protected portions including at least some protected data only accessible to one or more applications originating at the user device.

41. A method, comprising:
    implementing one or more protected portions of a user device, the one or more protected portions including at least some protected data not transmitted from the user device without a user grant of access by an application to the one or more protected portions;
    facilitating presentation of an offer to provide at least one service accessible through at least one application on the user device in exchange for at least one user permission for the at least one application to transmit the at least some protected data from the user device while the at least one service is being carried out including at least:
        facilitating the presentation of the offer to provide at least one fitness tracker service accessible through at least one application available for installation on the user device in exchange for at least one user permission for the at least one application to transmit, from the user device and to at least one computing device associated with the at least one fitness tracker service, health-related data personal to the user of the user device while the at least one fitness tracker service is being carried out, wherein the health-related data personal to the user is restricted from being transmitted by the user device without the at least one user permission;
    enabling the at least one application on the user device to have access to the one or more protected portions of the user device in response to receiving the at least one user permission for the at least one application to transmit the at least some protected data from the user device while the at least one service is being carried out;
    detecting that the at least one application has finished carrying out the at least one service and that the at least one application maintains the access to the one or more protected portions of the user device;
    facilitating presentation of an option to discontinue the access of the at least one application to the one or more protected portions of the user device; and
    discontinuing the access of the at least one application to the one or more protected portions of the user device in response to receiving an indication of a selection of the option to discontinue the access of the at least one application to the one or more protected portions of the user device,
    wherein at least one of the implementing, facilitating, enabling, detecting, or discontinuing is at least partially implemented using at least one processing device of the user device.

42. A system, comprising:
at least one computing device; and
one or more instructions which, when executed by the at least one computing device, cause the at least one computing device to perform one or more operations including at least:
    implementing one or more protected portions of a user device, the one or more protected portions including at least some protected data not transmitted from the user device without a user grant of access by an application to the one or more protected portions;
    facilitating presentation of an offer to provide at least one service accessible through at least one application on the user device in exchange for at least one user permission for the at least one application to transmit the at least some protected data from the user device while the at least one service is being carried out, including at least:
        facilitating the presentation of the offer to provide at least one fitness tracker service accessible through at least one application available for installation on the user device in exchange for at least one user permission for the at least one application to transmit, from the user device and to at least one computing device associated with the at least one fitness tracker service, health-related data personal to the user of the user device while the at least one fitness tracker service is being carried out, wherein the health-related data personal to the user is restricted from being transmitted by the user device without the at least one user permission;
    enabling the at least one application on the user device to have access to the one or more protected portions of the user device in response to receiving the at least one user permission for the at least one application to transmit the at least some protected data from the user device while the at least one service is being carried out;
    detecting that the at least one application has finished carrying out the at least one service and that the at least one application maintains the access to the one or more protected portions of the user device;
    facilitating presentation of an option to discontinue the access of the at least one application to the one or more protected portions of the user device; and
    discontinuing the access of the at least one application to the one or more protected portions of the user device in response to receiving an indication of a selection of the option to discontinue the access of the at least one application to the one or more protected portions of the user device.

* * * * *